(12) United States Patent
Mahajan et al.

(10) Patent No.: US 12,486,528 B2
(45) Date of Patent: Dec. 2, 2025

(54) COMPOSITIONS AND METHODS FOR MEASURING AND INHIBITING CALPAIN-5 ACTIVITY

(71) Applicants: The Board of Trustees of the Leland Stanford Junior University, Stanford, CA (US); The United States Government as represented by the Department of Veterans Affairs, Washington, DC (US)

(72) Inventors: Vinit Mahajan, Redwood City, CA (US); Gabriel Velez, Palo Alto, CA (US); Young Joo Sun, Redwood City, CA (US); Kellie A Schaefer, Redwood City, CA (US); Alexander G Bassuk, Iowa City, IA (US)

(73) Assignees: The Board of Trustees of the Leland Stanford Junior University, Stanford, CA (US); University of Iowa Research Foundation, Iowa City, IA (US); The United States Government as represented by the Department of Veterans Affairs, Washington, DC (US)

(*) Notice: Subject to any disclaimer, the term of this patent is extended or adjusted under 35 U.S.C. 154(b) by 550 days.

(21) Appl. No.: 17/767,280

(22) PCT Filed: Oct. 9, 2020

(86) PCT No.: PCT/US2020/054989
§ 371 (c)(1),
(2) Date: Apr. 7, 2022

(87) PCT Pub. No.: WO2021/072196
PCT Pub. Date: Apr. 15, 2021

(65) Prior Publication Data
US 2022/0364142 A1    Nov. 17, 2022

Related U.S. Application Data

(60) Provisional application No. 62/914,253, filed on Oct. 11, 2019.

(51) Int. Cl.
*C12Q 1/37* (2006.01)
*A61K 45/06* (2006.01)
*A61K 49/00* (2006.01)

(52) U.S. Cl.
CPC ............ *C12Q 1/37* (2013.01); *A61K 45/06* (2013.01); *A61K 49/0008* (2013.01);
(Continued)

(58) Field of Classification Search
CPC ...... C12Q 1/37; A61K 45/06; A61K 49/0008; A61K 38/00; C12Y 304/22;
(Continued)

(56) References Cited

U.S. PATENT DOCUMENTS 5,717,064 A * 2/1998 Julian .................... A61K 38/17
530/324
5,952,304 A * 9/1999 Jehanli ................... C07K 14/49
530/399

(Continued)

FOREIGN PATENT DOCUMENTS

WO    WO-9428921 A1 * 12/1994 ............. C07K 14/46
WO    WO-2015009701 A1 * 1/2015 ........... C07K 16/065
WO    WO-2018071216 A1 * 4/2018 ............... A61K 9/08

OTHER PUBLICATIONS

Johnsson A, Heldin CH, Wasteson A, Westermark B, Deuel TF, Huang JS, Seeburg PH, Gray A, Ullrich A, Scrace G, et al. The c-sis gene encodes a precursor of the B chain of platelet-derived growth factor. EMBO J. May 1984;3(5):921-8. doi: 10.1002/j.1460-2075. 1984.tb01908.x. (Year: 1984).*

(Continued)

*Primary Examiner* — Thomas J. Visone
(74) *Attorney, Agent, or Firm* — Jenny L. Buchbinder; Bozicevic, Field & Francis LLP

(57) ABSTRACT

Compositions, methods, and kits are provided for assaying calpain-5 activity and inhibition. In particular, novel peptide substrates are provided for detecting calpain-5, measuring calpain-5 activity, and screening for inhibitors of calpain-5 to identify potential therapeutic agents for treating retinal
(Continued)

diseases and other diseases associated with calpain-5 hyperactivity. Additionally, novel inhibitors of calpain-5 are also provided.

5 Claims, 29 Drawing Sheets

Specification includes a Sequence Listing.

(52) U.S. Cl.
CPC .. *C12Y 304/22* (2013.01); *G01N 2333/96466* (2013.01); *G01N 2500/02* (2013.01)

(58) Field of Classification Search
CPC ..... G01N 2333/96466; G01N 2500/02; G01N 2500/04; A61P 27/02; C07K 14/8139; C07K 7/06; C07K 7/08
See application file for complete search history.

(56) References Cited

U.S. PATENT DOCUMENTS

| | | |
|---|---|---|
| 6,569,665 B1 | 5/2003 | Boehm et al. |
| 2019/0284544 A1* | 9/2019 | Mahajan ............... G01N 33/573 |

OTHER PUBLICATIONS

GenBank: 1335310. "B chain carboxyl terminal region (aa 72-109)" Johnsson, A.; et al. The c-sis gene encodes a precursor of the B chain of platelet-derived growth factor. EMBO J. May 1984. Sequence submitted: Sep. 20, 1995. https://www.ncbi.nlm.nih.gov/protein/1335310?sat=17&satkey=41413121 (Year: 1995).*

Chang et al., Adding a lysine mimic in the design of potent inhibitors of histone lysine methyltransferases. J Mol Biol. Jul. 2, 2010;400 (1):1-7. doi: 10.1016/j.jmb.2010.04.048. Epub Apr. 29, 2010. PMID: 20434463; PMCID: PMC2895764. (Year: 2010).*

Randazzo et al. (2017) "Two novel CAPN5 variants associated with mild and severe Autosomal Dominant Neovascular Inflammatory Vitreoretinopathy (ADNIV) phenotypes.", Ocular Immunology and Inflammation, 27(5):693-698.

* cited by examiner

|  | Rat CAPN1-PC | | Human CAPN5-PC | | |
| --- | --- | --- | --- | --- | --- |
| Substrate | Vmax (RFU/sec) | $K_m$ (µM) | Vmax (RFU/sec) | $K_m$ (µM) | $K_i$ (µM) |
| RQNRGGGCINH | - | - | 2.1 ± 0.4 | 16 ± 4.9 | 43 ± 14 |
| PLFAER | 17 ± 1.1 | 34 ± 5.1 | 0.9 ± 0.1 | 79 ± 18 | - |

FIG. 1C

PR1476 (99.9%): (Dabcyl)-RQNRGGGCINHE$_{NH3}$
                                      |
                                   (EDANS)

PR1478 (99.7%): (Dabcyl)-WRQNRGGGCINHE$_{NH3}$
                                       |
                                    (EDANS)

FIG. 2A

| PR1476 Parameter | [CAPN5-PC] (µM) | | |
| --- | --- | --- | --- |
| | 0.16 µM | 0.49 µM | 1.6 µM |
| $k_{cat}$ (s$^{-1}$) x 10$^{-3}$ | 1.10 | 0.37 | 0.16 |
| $K_m$ (µM) | 48.8 | 29.2 | 37.4 |
| $V_{max}$ (nM/sec) | 0.18 | 0.18 | 0.25 |

FIG. 4C

| PR1478 Parameter | [CAPN5-PC] (µM) | | |
| --- | --- | --- | --- |
| | 0.16 µM | 0.49 µM | 1.6 µM |
| $k_{cat}$ (s$^{-1}$) x 10$^{-3}$ | 0.8 | 0.3 | 0.6 |
| $K_m$ (µM) | 21.4 | 47.3 | 82.2 |
| $V_{max}$ (nM/sec) | 0.12 | 0.39 | 0.92 |

FIG. 6C

COMPOSITIONS AND METHODS FOR MEASURING AND INHIBITING CALPAIN-5 ACTIVITY

STATEMENT REGARDING FEDERALLY SPONSORED RESEARCH OR DEVELOPMENT

This invention was made with Government support under contracts EY024665 and EY026682 awarded by the National Institutes of Health. The Government has certain rights in the invention.

INCORPORATION BY REFERENCE OF A SEQUENCE LISTING

A Sequence Listing is provided herewith in a text file, STAN-1676WO_S19-358_ST25, created on Sep. 1, 2021 and having a size of 77,344 bytes. The contents of the text file are incorporated herein by reference in their entirety.

BACKGROUND OF THE INVENTION

Autosomal dominant neovascular inflammatory vitreoretinopathy (ADNIV) is an inherited disease characterized by retinal synaptic signaling defects, retinal and iris neovascularization, abnormal retinal pigmentation, anterior chamber and vitreous inflammation, cystoid macular edema, vitreous hemorrhage, and retinal detachment. The disease progresses sequentially through a series of pathological stages, each sharing characteristics with common eye diseases (e.g., retinitis pigmentosa, proliferative diabetic retinopathy, and proliferative vitreoretinopathy), ultimately culminating in blindness in the fifth decade. Mutations in the CAPN5 gene cause ADNIV. CAPN5 is the first non-syndromic gene identified as being associated with autoimmune uveitis. CAPN5 encodes a calcium-activated cysteine protease expressed in many tissues, including the central nervous system (CNS) and retinal photoreceptors.

There remains a need for new therapies for treating intraocular inflammation, including ADNIV.

SUMMARY OF THE INVENTION

Compositions, methods, and kits are provided for assaying calpain-5 activity and inhibition. In particular, novel peptide substrates are provided for measuring calpain-5 activity and inhibition. Methods are also provided for screening candidate agents for inhibition of calpain-5 to identify potential therapeutic agents for treating retinal diseases and other diseases associated with calpain-5 hyperactivity. Screening assays may further include determining the effectiveness of candidate inhibitors in reducing calpain-5-mediated inflammation. Additionally, novel inhibitors of calpain-5 are also provided.

In one aspect, a calpain-5 peptide substrate is provided, wherein the peptide substrate comprises an amino acid sequence selected from the group consisting of SEQ ID NO:1, SEQ ID NO:2, and SEQ ID NOS:290-315, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the peptide serves as a substrate and is capable of undergoing proteolytic cleavage by calpain-5.

In certain embodiments, the peptide substrate further comprises a detectable label. Exemplary detectable labels include, without limitation, a fluorescent label, a chemiluminescent label, and an isotopic label. In some embodiments, the peptide substrate is labeled with a fluorescent donor and acceptor pair (e.g., with spacing suitable for a fluorescence resonance energy transfer (FRET) assay).

In another aspect, a composition comprising a calpain-5 peptide substrate, described herein, is provided. In certain embodiments, the composition further comprises calpain-5. In certain embodiments, the composition further comprises a calcium dication ($Ca^{2+}$). In some embodiments, the composition further comprises a buffer suitable for maintaining pH of the composition in a range wherein calpain-5 retains enzymatic activity. In some embodiments, the composition further comprises an inhibitor of calpain-5 enzymatic activity such as a competitive inhibitor or a noncompetitive inhibitor.

In another aspect, a kit is provided comprising a calpain-5 peptide substrate, described herein, and instructions for performing an assay for measuring calpain-5 enzymatic activity or inhibition. In certain embodiments, the kit further comprises calpain-5. In certain embodiments, the kit further comprises a calcium dication. In some embodiments, the kit further comprises a buffer suitable for maintaining pH of an assay composition in a range wherein calpain-5 retains enzymatic activity. In some embodiments, the composition further comprises an inhibitor of calpain-5 enzymatic activity such as a competitive inhibitor or a noncompetitive inhibitor.

In another aspect, a method of assaying calpain-5 enzymatic activity is provided, the method comprising contacting calpain-5 with a calcium dication ($Ca^{2+}$) and a peptide substrate described herein; and measuring proteolytic cleavage of the peptide substrate. In some embodiments, the method further comprises contacting the calpain-5 with an inhibitor; and measuring inhibition of the calpain-5 enzymatic activity. The inhibitor can be, for example, a competitive inhibitor or a noncompetitive inhibitor.

In another aspect, a calpain-5 inhibitor is provided, wherein the calpain-5 inhibitor comprises or consists of an amino acid sequence selected from the group consisting of SEQ ID NO:288 and SEQ ID NO:289, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the inhibitor is capable of inhibiting calpain-5 activity.

In certain embodiments, the calpain-5 inhibitor further comprises a detectable label. Exemplary detectable labels include, without limitation, a fluorescent label, a chemiluminescent label, and an isotopic label.

In another aspect, a composition comprising a calpain-5 inhibitor, described herein, is provided. In some embodiments, the composition further comprises a pharmaceutically acceptable excipient. In some embodiments, the composition further comprising a pharmaceutically acceptable carrier such as, but not limited to, a cream, emulsion, gel, liposome, nanoparticle, or ointment.

In another aspect, a kit comprising a composition comprising a calpain-5 inhibitor, described herein, is provided. In some embodiments, the kit further comprises instructions for treating a disease associated with calpain-5 hyperactivity. In some embodiments, the kit further comprises means for delivering said composition to a subject.

In another aspect, a method of treating a subject for a retinal disease associated with calpain-5 hyperactivity is provided, the method comprising administering a therapeutically effective amount of a calpain-5 inhibitor, described herein, to the subject.

In another aspect, a calpain-5 inhibitor for treatment of a retinal disease associated with calpain-5 hyperactivity is provided, wherein the calpain-5 inhibitor comprises or consists of the amino acid sequence of SEQ ID NO:288 or SEQ ID NO:289, or an amino acid sequence having at least 95% identity to the sequence of SEQ ID NO:288 or SEQ ID NO:289.

In another aspect, a method of screening for a calpain-5 inhibitor for treating a disease associated with calpain-5 hyperactivity is provided, the method comprising: a) contacting calpain-5 with a candidate agent, a calcium dication ($Ca^2$), and a peptide substrate described herein; and b) measuring inhibition of calpain-5 activity by the candidate agent.

In certain embodiments, the calpain-5 comprises or consists of a CAPN5-G267S protease core domain.

In certain embodiments, the method further comprises: administering the candidate agent locally to the eye of a non-human animal model of a disease associated with calpain-5 hyperactivity if the candidate agent inhibits calpain-5 activity; and measuring eye inflammation in the non-human animal model, wherein reduced eye inflammation in presence of the candidate agent compared to that in a negative control animal model that is not treated with the candidate agent indicates that the candidate agent has anti-inflammatory activity in the eye.

In certain embodiments, the candidate agent is a small molecule, a peptide, a protein, an aptamer, or an antibody that specifically binds to calpain-5.

In certain embodiments, the disease associated with calpain-5 hyperactivity is autosomal neovascular inflammatory vitreoretinopathy.

BRIEF DESCRIPTION OF THE DRAWINGS

FIGS. 1A-1C show kinetic analysis of human CAPN5 and rat CAPN1 with the peptide substrates, RQNRGGGCINH (SEQ ID NO:1, FIG. 1A) and PLFAER (SEQ ID NO:2, FIG. 1B). FIG. 1C shows kinetics parameters, including $K_m$ and $V_{max}$ determined for human CAPN5 and rat CAPN1 with the peptide substrates, RQNRGGGCINH (SEQ ID NO:1) and PLFAER (SEQ ID NO:2).

FIGS. 2A-2D show that the PR1478 peptide is more soluble and sensitive to test CAPNS-PC activity than PR1476. FIG. 2A. Peptide design of PR1476 and PR1478. Purity of each peptide was determined by mass-spectrometry (shown in percentile scale). Each peptide has N-terminal Dabcyl, the amino acid sequence of SEQ ID NO:1 (PR1476) or SEQ ID NO:2 (PR1478) connected to a glutamate side chain-linked EDANS, and C-terminal capping. FIG. 2B. 400 M working stock of each peptide. The PR1478 stock showed more transparent color than PR1476. This indicates that the PR1478 is more soluble than PR1476. FIG. 2C. 10 mM PR1476 master stock was prepared in 100% DMSO. The sample preparation, activity buffer (10 mM Ca) and experimental setups are identical to Stanford original protocol. FIG. 2D. 3.69 mM PR1478 master stock was prepared in 50% DMSO/50% activity buffer. We initially tried to resuspend the peptide using 100% DMSO (50 μl to approximately 1 mg of peptide), but the peptide did not dissolve well. Thus, we have added equivalent amount of activity buffer and the peptide got dissolved. We determined the master stock concentration using Nanodrop by reading Tryptophan absorbency.

FIGS. 4A-4C show kinetics results with the PR1476 peptide showing it has activity with CAPN5. FIG. 4A shows steady-state kinetics with CAPN5 at 1.6 μm, 0.49 μm, and 0.16 μm using the PR1476 peptide (SEQ ID NO:1) as a substrate. FIG. 4B shows the enzyme dose response to the PR1476 peptide at concentrations ranging from 0 μM to 160 μM of the PR1476 peptide. FIG. 4C shows the kinetics parameters, including $k_{cat}$, $K_m$, and $V_{max}$ determined for CAPN5.

FIGS. 6A-6C show kinetics results with the PR1478 peptide showing it has activity with CAPN5. FIG. 6A shows steady-state kinetics with CAPN5 at 1.6 μm, 0.49 μm, and 0.16 μm. FIG. 6B shows the enzyme dose response to the PR1478 peptide at concentrations ranging from 0 μM to 160 μM of the PR1478 peptide. FIG. 6C shows the kinetics parameters, including $k_{cat}$, $K_m$, and $V_{max}$ determined for CAPN5.

FIG. 7A shows chemical structure of 1-methylated PDGFB peptide (SEQ ID NO:288). FIG. 7B shows chemical structure of 2-methylated PDGFB peptide (SEQ ID NO:289). Methylated lysines are labeled. FIGS. 7C, 7D show DABCYL-TPLKSPPPSPR (SEQ ID NO:3)-EDANS (Calpain Substrate III; Calbiochem; 40 μM) hydrolysis by 50 nM CAPN5-G267S protease core domain in the presence of $10^{-10}$-$10^{-4}$ M methylated PDGFB peptides and generic calpain inhibitors. The initial velocity (rate of reaction: AFU/sec.) for each condition was plotted against the inhibitor concentration. Data represent the mean±SEM of three technical replicates. FIG. 7E shows that adding methyl groups to the side chains of the lysines near the PDGFB cut site inhibits both wildtype and mutant CAPN5. Both of these inhibitors inhibit mutant CAPN5 at a lower concentration. FIG. 7F shows that calpeptin and leupeptin inhibit the wildtype but not the mutant CAPN5.

FIG. 9A shows position-specific scoring matrix (PSSM) of the P4-P4' cleavage sites from the retinal proteomics screen. Amino acids are colored by their respective log odds-score $[p_a \cdot \log_2(p_a/q_a)]$ from the PSSM. FIG. 9B shows consensus peptides designed around the PSSM were synthesized and tested in our in vitro CAPN5 activity assay. Consensus peptide (P4'A, P4'P, P2R, and P3GP1'V) hydrolysis by 1.6 μM CAPN5-PC p.G267S in the presence of 10 mM $Ca^{2+}$. Data are fit to the substrate inhibition equation and are displayed as mean±SEM (n=3). FIG. 9C shows substrate turnover ($k_{cat}$) of consensus peptides indicate that peptide P2R is preferred by CAPN5-PC. FIG. 9D shows catalytic efficiency ($k_{cat}/K_m$) of consensus peptides. Results indicate a preference for arginine in the P2 subsite.

DETAILED DESCRIPTION OF THE INVENTION

Figure 1A:
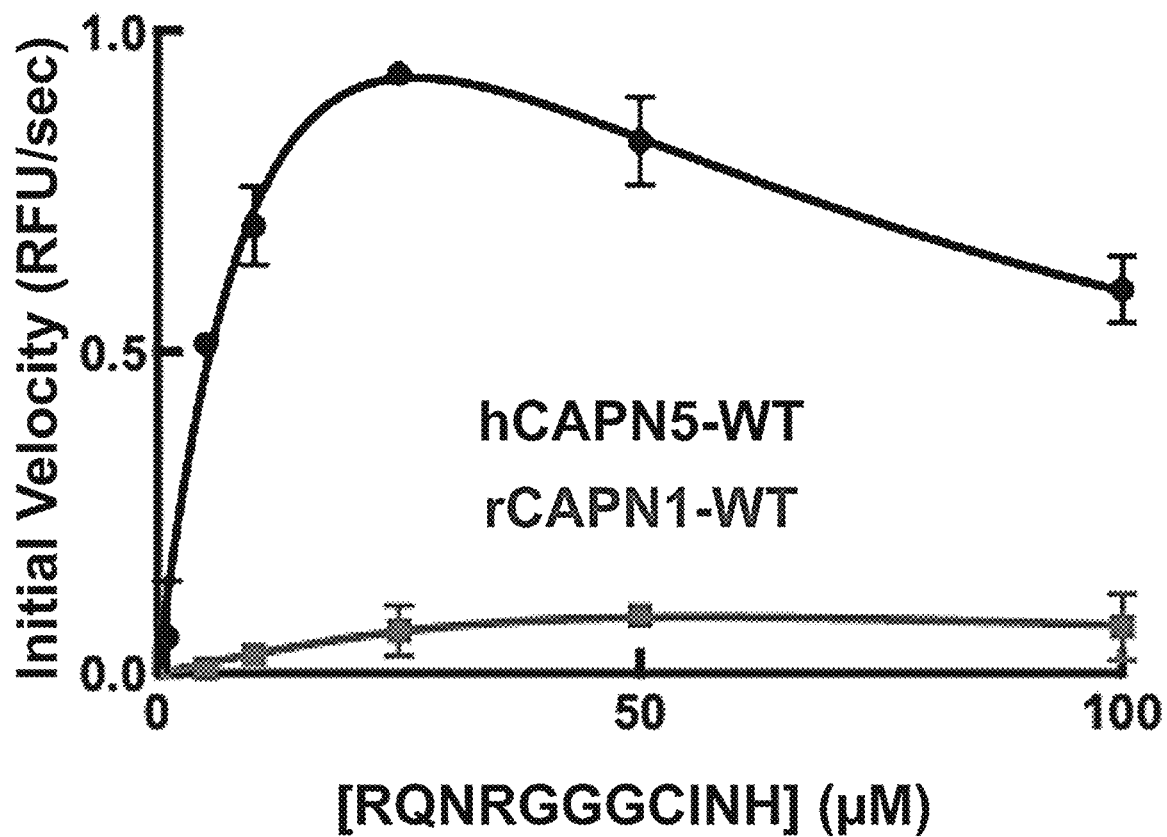

Compositions, methods, and kits are provided for assaying calpain-5 activity and inhibition. In particular, novel peptide substrates are provided for detecting calpain-5, measuring calpain-5 activity, and screening for inhibitors of calpain-5 to identify potential therapeutic agents for treating diseases associated with calpain-5 hyperactivity. Additionally, novel inhibitors of calpain-5 are also provided.

Before the present compositions, methods, and kits are described, it is to be understood that this invention is not limited to particular methods or compositions described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "an inhibitor" includes a plurality of such inhibitors and reference to "the peptide" includes reference to one or more peptides and equivalents thereof, e.g. oligopeptides or polypeptides known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "about", particularly in reference to a given quantity, is meant to encompass deviations of plus or minus five percent.

The terms "peptide", "oligopeptide", "polypeptide", and "protein" are used interchangeably herein to refer to a polymer of amino acid residues. The terms refer to any compound comprising naturally occurring or synthetic amino acid polymers or amino acid-like molecules including but not limited to compounds comprising amino and/or imino molecules. No particular size is implied by use of the terms "peptide," "oligopeptide", "polypeptide", or "protein" and these terms are used interchangeably. Included within the definition are, for example, peptides containing one or more analogs of an amino acid (including, for example, unnatural amino acids, etc.), peptides with substituted linkages, as well as other modifications known in the art, both naturally occurring and non-naturally occurring (e.g., synthetic). Thus, synthetic oligopeptides, dimers, multimers (e.g., tandem repeats, linearly-linked peptides), cyclized, branched molecules and the like, are included within the definition. The terms also include molecules comprising one or more peptoids (e.g., N-substituted glycine residues) and other synthetic amino acids or peptides. (See, e.g., U.S. Pat. Nos. 5,831,005; 5,877,278; and U.S. Pat. No. 5,977,301; Nguyen et al. (2000) Chem Biol. 7(7):463-473; and Simon et al. (1992) Proc. Natl. Acad. Sci. USA 89(20):9367-9371 for descriptions of peptoids). Non-limiting lengths of peptides suitable for use in the present invention includes peptides of 5 to 10 residues in length, 11 to 20 residues in length (or any integer therebetween), 21 to 30 residues in length (or any integer therebetween), 31 to 50 residues in length (or any integer therebetween), 51 to 100 (or any integer therebetween), or of greater than 100 residues in length. In certain embodiments, the polypeptide is between about 10 and 50 residues in length, including any length within this range such as, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 residues in length. Further, peptides, as described herein, for example synthetic peptides, may include additional molecules such as labels or other chemical moieties. Such moieties may further enhance interaction of the peptides with calpain-5 and/or further detection of the peptides. The terms also include modifications of the peptide, for example, methylation, PEGylation, phosphorylation, glycosylation, acetylation, hydroxylation, oxidation, and the like.

Thus, references to peptides also include derivatives of the amino acid sequences disclosed herein, including one or more non-naturally occurring amino acids. A first peptide is "derived from" a second peptide if it is (i) encoded by a first polynucleotide derived from a second polynucleotide encoding the second peptide, or (ii) displays sequence identity to the second peptide as described herein. Sequence (or percent) identity can be determined as described below. Preferably, derivatives exhibit at least about 50% percent identity, more preferably at least about 80%, and even more preferably between about 85% and 99% (or any value therebetween) to the sequence from which they were derived. Such derivatives can include postexpression modifications of the peptide, for example, glycosylation, acetylation, phosphorylation, and the like.

Amino acid derivatives can also include modifications to the native sequence, such as deletions, additions and substitutions (generally conservative in nature), so long as the peptide maintains the desired activity (e.g., functions as a substrate or inhibitor of calpain-5). These modifications may be deliberate, as through site-directed mutagenesis, or may be accidental, such as through mutations of hosts that produce the proteins or errors due to PCR amplification. Furthermore, modifications may be made that have one or more of the following effects: increasing affinity and/or specificity for calpain-5 and facilitating cell processing. Peptides described herein can be made recombinantly, synthetically, or in tissue culture.

By "fragment" is intended a molecule consisting of only a part of the intact full-length sequence and structure. The fragment can include a C-terminal deletion an N-terminal deletion, and/or an internal deletion of a protein or peptide. Active fragments of a particular protein or peptide will generally include at least about 5-10 contiguous amino acid residues of the full length molecule, but may include at least about 11-25 contiguous amino acid residues of the full length molecule, and can include at least about 20-50 or more contiguous amino acid residues of the full length molecule, or any integer between 5 amino acids and the full length sequence, provided that the fragment in question retains biological activity, such as substrate activity or inhibitory activity (e.g., the ability to function as a substrate or inhibitor of calpain-5).

The terms "polynucleotide," "oligonucleotide," "nucleic acid" and "nucleic acid molecule" are used herein to include a polymeric form of nucleotides of any length, either ribonucleotides or deoxyribonucleotides. This term refers only to the primary structure of the molecule. Thus, the term includes triple-, double- and single-stranded DNA, as well as triple-, double- and single-stranded RNA. It also includes modifications, such as by methylation and/or by capping, and unmodified forms of the polynucleotide. More particularly, the terms "polynucleotide," "oligonucleotide," "nucleic acid" and "nucleic acid molecule" include polydeoxyribonucleotides (containing 2-deoxy-D-ribose), polyribonucleotides (containing D-ribose), and any other type of polynucleotide which is an N- or C-glycoside of a purine or pyrimidine base. There is no intended distinction in length between the terms "polynucleotide," "oligonucleotide," "nucleic acid" and "nucleic acid molecule," and these terms are used interchangeably.

By "isolated" is meant, when referring to a protein, polypeptide, or peptide, that the indicated molecule is separate and discrete from the whole organism with which the molecule is found in nature or is present in the substantial absence of other biological macro molecules of the same type. The term "isolated" with respect to a polynucleotide is a nucleic acid molecule devoid, in whole or part, of sequences normally associated with it in nature; or a sequence, as it exists in nature, but having heterologous sequences in association therewith; or a molecule disassociated from the chromosome.

"Substantially purified" generally refers to isolation of a substance (compound, polynucleotide, protein, polypeptide, peptide composition) such that the substance comprises the majority percent of the sample in which it resides. Typically in a sample, a substantially purified component comprises 50%, preferably 80%-85%, more preferably 90-95% of the sample. Techniques for purifying polynucleotides and polypeptides of interest are well-known in the art and include, for example, ion-exchange chromatography, affinity chromatography and sedimentation according to density.

A peptide is said to "interact" with a protein if it binds specifically (e.g., in a lock-and-key type mechanism), non-specifically, or in some combination of specific and non-specific binding. A peptide "interacts preferentially" with a protein if it binds (non-specifically and/or specifically) to the protein with greater affinity and/or greater specificity than it binds to other proteins (e.g., binds to calpain-5 to a greater degree than to other proteins).

The term "affinity" refers to the strength of binding and can be expressed quantitatively as a dissociation constant (Kd). It is to be understood that specific binding does not necessarily require interaction between specific amino acid residues and/or motifs of each peptide. For example, in certain embodiments, the peptides described herein (e.g., peptide substrates and inhibitors) interact preferentially with calpain-5 but, nonetheless, may be capable of binding other proteins at a weak, yet detectable, level (e.g., 10% or less of the binding shown to the protein of interest). Typically, weak binding, or background binding, is readily discernible from the preferential interaction with a peptide of interest, e.g., by use of appropriate controls.

The term "calpain-5 inhibitor" as used herein refers to any molecule (e.g., small molecule inhibitor, protein, polypeptide, peptide, fusion protein, antibody or fragment thereof, antibody mimetic, or aptamer) that inhibits calpain-5 activity. Inhibition may be complete or partial (i.e., all activity, some activity, or most activity is blocked by an inhibitor). For example, an inhibitor may reduce the activity of calpain-5 by 10%, 20%, 30%, 40%, 50%, 60%, 70%, 80%, 90%, 100%, or any amount in between as compared to native or control levels.

The term "antibody" encompasses polyclonal antibodies, monoclonal antibodies as well as hybrid antibodies, altered antibodies, chimeric antibodies, and humanized antibodies. The term antibody includes: hybrid (chimeric) antibody molecules (see, for example, Winter et al. (1991) *Nature* 349:293-299; and U.S. Pat. No. 4,816,567); F(ab')$_2$ and F(ab) fragments; F$_v$ molecules (noncovalent heterodimers, see, for example, Inbar et al. (1972) *Proc Natl Acad Sci USA* 69:2659-2662; and Ehrlich et al. (1980) *Biochem* 19:4091-4096); single-chain Fv molecules (scFv) (see, e.g., Huston et al. (1988) *Proc Natl Acad Sci USA* 85:5879-5883); nanobodies or single-domain antibodies (sdAb) (see, e.g., Wang et al. (2016) *Int J Nanomedicine* 11:3287-3303, Vincke et al. (2012) *Methods Mol Biol* 911:15-26; dimeric and trimeric antibody fragment constructs; minibodies (see, e.g., Pack et al. (1992) *Biochem* 31:1579-1584; Cumber et al. (1992) *J Immunology* 149B:120-126); humanized antibody molecules (see, e.g., Riechmann et al. (1988) *Nature* 332:323-327; Verhoeyan et al. (1988) *Science* 239:1534-1536; and U.K. Patent Publication No. GB 2,276,169, published 21 Sep. 1994); and, any functional fragments obtained from such molecules, wherein such fragments retain specific-binding properties of the parent antibody molecule.

"Diseases associated with calpain-5 hyperactivity" include any disease associated with pathological calpain-5 hyperactivity including, without limitation, retinal diseases such as, but not limited to, autosomal neovascular inflammatory vitreoretinopathy (ADNIV), uveitis, retinitis pigmentosa, proliferative diabetic retinopathy, proliferative vitreoretinopathy, and vitreoretinal degeneration.

As used herein, the term "determining" refers to both quantitative and qualitative determinations and as such, the term "determining" is used interchangeably herein with "assaying," "measuring," and the like.

"Pharmaceutically acceptable excipient or carrier" refers to an excipient that may optionally be included in the compositions of the invention and that causes no significant adverse toxicological effects to the patient.

"Pharmaceutically acceptable salt" includes, but is not limited to, amino acid salts, salts prepared with inorganic acids, such as chloride, sulfate, phosphate, diphosphate, bromide, and nitrate salts, or salts prepared from the corresponding inorganic acid form of any of the preceding, e.g., hydrochloride, etc., or salts prepared with an organic acid, such as malate, maleate, fumarate, tartrate, succinate, ethylsuccinate, citrate, acetate, lactate, methanesulfonate, benzoate, ascorbate, para-toluenesulfonate, palmoate, salicylate and stearate, as well as estolate, gluceptate and lactobionate salts. Similarly, salts containing pharmaceutically acceptable cations include, but are not limited to, sodium, potassium, calcium, aluminum, lithium, and ammonium (including substituted ammonium).

An "effective amount" of a calpain-5 inhibitor is an amount sufficient to effect beneficial or desired results, such as an amount that inhibits calpain-5 activity.

By "therapeutically effective dose or amount" of a calpain-5 inhibitor is intended an amount that, when administered as described herein, brings about a positive therapeutic response in treatment of a retinal disease associated with calpain-5 hyperactivity. A positive therapeutic response may include preventing, reducing, or delaying retinal degeneration, neuroinflammation, necrotic cell death, or blindness. Additionally, a therapeutically effective amount of a calpain-5 inhibitor may reduce proteolytic cleavage of target proteins by calpain-5. The exact amount required will vary from subject to subject, depending on the species, age, and general condition of the subject, the severity of the condition being treated, the particular drug or drugs employed, mode of administration, and the like. An appropriate "effective" amount in any individual case may be determined by one of ordinary skill in the art using routine experimentation, based upon the information provided herein.

By "subject" is meant any member of the subphylum chordata, including, without limitation, humans and other primates, including non-human primates such as chimpanzees and other apes and monkey species; farm animals such as cattle, sheep, pigs, goats and horses; domestic mammals such as dogs and cats; laboratory animals including rodents such as mice, rats and guinea pigs; birds, including domestic, wild and game birds such as chickens, turkeys and other gallinaceous birds, ducks, geese, and the like.

"Homology" refers to the percent identity between two polynucleotide or two polypeptide molecules. Two nucleic acid, or two polypeptide sequences are "substantially homologous" to each other when the sequences exhibit at least about 50% sequence identity, preferably at least about 75% sequence identity, more preferably at least about 80% 85% sequence identity, more preferably at least about 90% sequence identity, and most preferably at least about 95% 98% sequence identity over a defined length of the molecules. As used herein, substantially homologous also refers to sequences showing complete identity to the specified sequence.

In general, "identity" refers to an exact nucleotide to nucleotide or amino acid to amino acid correspondence of two polynucleotides or polypeptide sequences, respectively. Percent identity can be determined by a direct comparison of the sequence information between two molecules by aligning the sequences, counting the exact number of matches between the two aligned sequences, dividing by the length of the shorter sequence, and multiplying the result by 100. Readily available computer programs can be used to aid in the analysis, such as ALIGN, Dayhoff, M. O. in Atlas of Protein Sequence and Structure M.O. Dayhoff ed., 5 Suppl. 3:353 358, National biomedical Research Foundation, Washington, DC, which adapts the local homology algorithm of Smith and Waterman Advances in Appl. Math. 2:482 489, 1981 for peptide analysis. Programs for determining nucleotide sequence identity are available in the Wisconsin Sequence Analysis Package, Version 8 (available from Genetics Computer Group, Madison, WI) for example, the BESTFIT, FASTA and GAP programs, which also rely on the Smith and Waterman algorithm. These programs are readily utilized with the default parameters recommended by the manufacturer and described in the Wisconsin Sequence Analysis Package referred to above. For example, percent identity of a particular nucleotide sequence to a reference sequence can be determined using the homology algorithm of Smith and Waterman with a default scoring table and a gap penalty of six nucleotide positions.

Another method of establishing percent identity in the context of the present invention is to use the MPSRCH package of programs copyrighted by the University of Edinburgh, developed by John F. Collins and Shane S. Sturrok, and distributed by IntelliGenetics, Inc. (Mountain View, CA). From this suite of packages, the Smith Waterman algorithm can be employed where default parameters are used for the scoring table (for example, gap open penalty of 12, gap extension penalty of one, and a gap of six). From the data generated the "Match" value reflects "sequence identity." Other suitable programs for calculating the percent identity or similarity between sequences are generally known in the art, for example, another alignment program is BLAST, used with default parameters. For example, BLASTN and BLASTP can be used using the following default parameters: genetic code=standard; filter=none; strand=both; cutoff=60; expect=10; Matrix=BLOSUM62; Descriptions=50 sequences; sort by =HIGH SCORE; Databases=non redundant, GenBank+EMBL+DDBJ+PDB+ GenBank CDS translations+Swiss protein+Spupdate+PIR. Details of these programs are readily available.

Alternatively, homology can be determined by hybridization of polynucleotides under conditions which form stable duplexes between homologous regions, followed by digestion with single stranded specific nuclease(s), and size determination of the digested fragments. DNA sequences that are substantially homologous can be identified in a Southern hybridization experiment under, for example, stringent conditions, as defined for that particular system. Defining appropriate hybridization conditions is within the skill of the art. See, e.g., Sambrook et al., supra; DNA Cloning, supra; Nucleic Acid Hybridization, supra.

"Recombinant" as used herein to describe a nucleic acid molecule means a polynucleotide of genomic, cDNA, viral, semisynthetic, or synthetic origin which, by virtue of its origin or manipulation, is not associated with all or a portion of the polynucleotide with which it is associated in nature. The term "recombinant" as used with respect to a protein or polypeptide means a polypeptide produced by expression of a recombinant polynucleotide. In general, the gene of interest is cloned and then expressed in transformed organisms, as described further below. The host organism expresses the foreign gene to produce the protein under expression conditions.

The term "transformation" refers to the insertion of an exogenous polynucleotide into a host cell, irrespective of the method used for the insertion. For example, direct uptake, transduction or f-mating are included. The exogenous polynucleotide may be maintained as a non-integrated vector, for example, a plasmid, or alternatively, may be integrated into the host genome.

"Recombinant host cells," "host cells," "cells", "cell lines," "cell cultures," and other such terms denoting microorganisms or higher eukaryotic cell lines cultured as unicellular entities refer to cells which can be, or have been, used as recipients for recombinant vector or other transferred DNA, and include the original progeny of the original cell which has been transfected.

A "coding sequence" or a sequence which "encodes" a selected polypeptide, is a nucleic acid molecule which is transcribed (in the case of DNA) and translated (in the case of mRNA) into a polypeptide in vivo when placed under the control of appropriate regulatory sequences (or "control elements"). The boundaries of the coding sequence can be determined by a start codon at the 5' (amino) terminus and a translation stop codon at the 3' (carboxy) terminus. A coding sequence can include, but is not limited to, cDNA from viral, prokaryotic or eukaryotic mRNA, genomic DNA sequences from viral or prokaryotic DNA, and even synthetic DNA sequences. A transcription termination sequence may be located 3' to the coding sequence.

Typical "control elements," include, but are not limited to, transcription promoters, transcription enhancer elements, transcription termination signals, polyadenylation sequences (located 3' to the translation stop codon), sequences for optimization of initiation of translation (located 5' to the coding sequence), and translation termination sequences.

"Operably linked" refers to an arrangement of elements wherein the components so described are configured so as to perform their usual function. Thus, a given promoter operably linked to a coding sequence is capable of effecting the expression of the coding sequence when the proper enzymes are present. The promoter need not be contiguous with the coding sequence, so long as it functions to direct the expression thereof. Thus, for example, intervening untranslated yet transcribed sequences can be present between the promoter sequence and the coding sequence and the promoter sequence can still be considered "operably linked" to the coding sequence.

"Encoded by" refers to a nucleic acid sequence which codes for a polypeptide sequence, wherein the polypeptide sequence or a portion thereof contains an amino acid sequence of at least 3 to 5 amino acids, more preferably at least 8 to 10 amino acids, and even more preferably at least 15 to 20 amino acids from a polypeptide encoded by the nucleic acid sequence.

"Expression cassette" or "expression construct" refers to an assembly which is capable of directing the expression of the sequence(s) or gene(s) of interest. An expression cassette generally includes control elements, as described above, such as a promoter which is operably linked to (so as to direct transcription of) the sequence(s) or gene(s) of interest, and often includes a polyadenylation sequence as well. Within certain embodiments of the invention, the expression cassette described herein may be contained within a plasmid construct. In addition to the components of the expression cassette, the plasmid construct may also include, one or more selectable markers, a signal which allows the plasmid construct to exist as single stranded DNA (e.g., a M13 origin of replication), at least one multiple cloning site, and a "mammalian" origin of replication (e.g., a SV40 or adenovirus origin of replication).

"Purified polynucleotide" refers to a polynucleotide of interest or fragment thereof which is essentially free, e.g., contains less than about 50%, preferably less than about 70%, and more preferably less than about at least 90%, of the protein with which the polynucleotide is naturally associated. Techniques for purifying polynucleotides of interest are well-known in the art and include, for example, disruption of the cell containing the polynucleotide with a chaotropic agent and separation of the polynucleotide(s) and proteins by ion-exchange chromatography, affinity chromatography and sedimentation according to density.

The term "transfection" is used to refer to the uptake of foreign DNA by a cell. A cell has been "transfected" when exogenous DNA has been introduced inside the cell membrane. A number of transfection techniques are generally known in the art. See, e.g., Graham et al. (1973) Virology, 52:456, Sambrook et al. (2001) Molecular Cloning, a laboratory manual, 3rd edition, Cold Spring Harbor Laboratories, New York, Davis et al. (1995) Basic Methods in Molecular Biology, 2nd edition, McGraw-Hill, and Chu et al. (1981) Gene 13:197. Such techniques can be used to introduce one or more exogenous DNA moieties into suitable host cells. The term refers to both stable and transient uptake of the genetic material, and includes uptake of peptide- or antibody-linked DNAs.

A "vector" is capable of transferring nucleic acid sequences to target cells (e.g., viral vectors, non-viral vectors, particulate carriers, and liposomes). Typically, "vector construct," "expression vector," and "gene transfer vector," mean any nucleic acid construct capable of directing the expression of a nucleic acid of interest and which can transfer nucleic acid sequences to target cells. Thus, the term includes cloning and expression vehicles, as well as viral vectors.

The terms "variant," "analog" and "mutein" refer to biologically active derivatives of the reference molecule that retain desired activity, such as the ability to function as a substrate of calpain-5 or the ability to inhibit calpain-5 and/or reduce calpain-5-mediated inflammation. In general, the terms "variant" and "analog" refer to compounds having a native polypeptide sequence and structure with one or more amino acid additions, substitutions (generally conservative in nature) and/or deletions, relative to the native molecule, so long as the modifications do not destroy biological activity and which are "substantially homologous" to the reference molecule as defined below. In general, the amino acid sequences of such analogs will have a high degree of sequence homology to the reference sequence, e.g., amino acid sequence homology of more than 50%, generally more than 60%-70%, even more particularly 80%-85% or more, such as at least 90%-95% or more, when the two sequences are aligned. Often, the analogs will include the same number of amino acids but will include substitutions, as explained herein. The term "mutein" further includes peptides having one or more amino acid-like molecules including but not limited to compounds comprising only amino and/or imino molecules, peptides containing one or more analogs of an amino acid (including, for example, unnatural amino acids, etc.), peptides with substituted linkages, as well as other modifications known in the art, both naturally occurring and non-naturally occurring (e.g., synthetic), cyclized, branched molecules and the like. The term also includes molecules comprising one or more N-substituted glycine residues (a "peptoid") and other synthetic amino acids or peptides. (See, e.g., U.S. Pat. Nos. 5,831,005; 5,877,278; and U.S. Pat. No. 5,977,301; Nguyen et al., Chem. Biol. (2000) 7:463-473; and Simon et al., Proc. Natl. Acad. Sci. USA (1992) 89:9367-9371 for descriptions of peptoids). Methods for making peptide analogs and muteins are known in the art and are described further below.

As explained above, analogs generally include substitutions that are conservative in nature, i.e., those substitutions that take place within a family of amino acids that are related in their side chains. Specifically, amino acids are generally divided into four families: (1) acidic—aspartate and glutamate; (2) basic—lysine, arginine, histidine; (3) non-polar—alanine, valine, leucine, isoleucine, proline, phenylalanine, methionine, tryptophan; and (4) uncharged polar—glycine, asparagine, glutamine, cysteine, serine threonine, and tyrosine. Phenylalanine, tryptophan, and tyrosine are sometimes classified as aromatic amino acids. For example, it is reasonably predictable that an isolated replacement of leucine with isoleucine or valine, an aspartate with a glutamate, a threonine with a serine, or a similar conservative replacement of an amino acid with a structurally related amino acid, will not have a major effect on the biological activity. For example, the peptide of interest may include up to about 5-10 conservative or non-conservative amino acid substitutions, or even up to about 15-25 conservative or non-conservative amino acid substitutions, or any integer between 5-25, so long as the desired function of the molecule remains intact. One of skill in the art may readily determine regions of the molecule of interest that can tolerate change by reference to Hopp/Woods and Kyte-Doolittle plots, well known in the art.

"Gene transfer" or "gene delivery" refers to methods or systems for reliably inserting DNA or RNA of interest into a host cell. Such methods can result in transient expression of non-integrated transferred DNA, extrachromosomal replication and expression of transferred replicons (e.g., episomes), or integration of transferred genetic material into the genomic DNA of host cells. Gene delivery expression vectors include, but are not limited to, vectors derived from bacterial plasmid vectors, viral vectors, non-viral vectors, alphaviruses, pox viruses and vaccinia viruses.

The term "derived from" is used herein to identify the original source of a molecule but is not meant to limit the method by which the molecule is made which can be, for example, by chemical synthesis or recombinant means.

As used herein, the term "detectable label" refers to a molecule or substance capable of detection, including, but not limited to, fluorescers, chemiluminescers, chromophores, bioluminescent proteins, enzymes, enzyme substrates, enzyme cofactors, enzyme inhibitors, isotopic labels, semiconductor nanoparticles, dyes, metal ions, metal sols, ligands (e.g., biotin, streptavidin or haptens) and the like. The term "fluorescer" refers to a substance or a portion thereof which is capable of exhibiting fluorescence in the detectable range. Particular examples of labels which may be used in the practice of the invention include, but are not limited to, SYBR green, SYBR gold, a CAL Fluor dye such as CAL Fluor Gold 540, CAL Fluor Orange 560, CAL Fluor Red 590, CAL Fluor Red 610, and CAL Fluor Red 635, a Quasar dye such as Quasar 570, Quasar 670, and Quasar 705, an Alexa Fluor such as Alexa Fluor 350, Alexa Fluor 488, Alexa Fluor 546, Alexa Fluor 555, Alexa Fluor 594, Alexa Fluor 647,and Alexa Fluor 784, a cyanine dye such as Cy 3, Cy3.5, Cy5, Cy5.5, and Cy7, fluorescein, 2', 4', 5', 7'-tetrachloro-4-7-dichlorofluorescein (TET), carboxyfluorescein (FAM), 6-carboxy-4',5'-dichloro-2',7'-dimethoxyfluorescein (JOE), hexachlorofluorescein (HEX), rhodamine, carboxy-X-rhodamine (ROX), tetramethyl rhodamine (TAMRA), FITC, dansyl, umbelliferone, dimethyl acridinium ester (DMAE), Texas red, luminol, and quantum dots, enzymes such as alkaline phosphatase (AP), beta-lactamase, chloramphenicol acetyltransferase (CAT), adenosine deaminase (ADA), aminoglycoside phosphotransferase (neo$^r$, G418$^r$) dihydrofolate reductase (DHFR), hygromycin-B-phosphotransferase (HPH), thymidine kinase (TK), β-galactosidase (lacZ), and xanthine guanine phosphoribosyltransferase (XGPRT), beta-glucuronidase (gus), placental alkaline phosphatase (PLAP), and secreted embryonic alkaline phosphatase (SEAP). Enzyme tags are used with their cognate substrate. The term also includes chemiluminescent labels such as luminol, isoluminol, acridinium esters, and peroxyoxalate and bioluminescent proteins such as firefly luciferase, bacterial luciferase, Renilla luciferase, and aequorin. The term also includes isotopic labels, including radioactive and non-radioactive isotopes, such as, $^3$H, $^2$H, $^{120}$I, $^{123}$I, $^{124}$I, $^{125}$I, $^{131}$I, $^{35}$S, $^{11}$C, $^{13}$C, $^{14}$C, $^{32}$P $^{15}$N, $^{13}$N, $^{110}$In, $^{111}$In, $^{177}$Lu, $^{18}$F, $^{52}$Fe, $^{62}$Cu, $^{64}$Cu, $^{67}$Cu, $^{67}$Ga, $^{68}$Ga, $^{86}$Y, $^{90}$Y, $^{89}$Zr, $^{94m}$Tc, $^{94}$Tc, $^{99m}$TC, $^{154}$Gd, $^{155}$Gd, $^{156}$Gd, $^{157}$Gd, $^{158}$Gd, $^{15}$O, $^{186}$Re, $^{188}$Re, $^{51}$M, $^{52m}$Mn, $^{55}$Co, $^{72}$As, $^{75}$Br, $^{76}$Br, $^{82m}$Rb, and $^{83}$Sr. The term also includes color-coded microspheres of known fluorescent light intensities (see e.g., microspheres with xMAP technology produced by Luminex (Austin, TX); microspheres containing quantum dot nanocrystals, for example, containing different ratios and combinations of quantum dot colors (e.g., Qdot nanocrystals produced by Life Technologies (Carlsbad, CA); glass coated metal nanoparticles (see e.g., SERS nanotags produced by Nanoplex Technologies, Inc. (Mountain View, CA); barcode materials (see e.g., submicron sized striped metallic rods such as Nanobarcodes produced by Nanoplex Technologies, Inc.), encoded microparticles with colored bar codes (see e.g., CellCard produced by Vitra Bioscience, vitrabio.com), glass microparticles with digital holographic code images (see e.g., CyVera microbeads produced by Illumina (San Diego, CA), near infrared (NIR) probes, and nanoshells. The term also includes contrast agents such as ultrasound contrast agents (e.g. SonoVue microbubbles comprising sulfur hexafluoride, Optison microbubbles comprising an albumin shell and octafluoropropane gas core, Levovist microbubbles comprising a lipid/galactose shell and an air core, Perflexane lipid microspheres comprising perfluorocarbon microbubbles, and Perflutren lipid microspheres comprising octafluoropropane encapsulated in an outer lipid shell), magnetic resonance imaging (MRI) contrast agents (e.g., gadodiamide, gadobenic acid, gadopentetic acid, gadoteridol, gadofosveset, gadoversetamide, gadoxetic acid), and radiocontrast agents, such as for computed tomography (CT), radiography, or fluoroscopy (e.g., diatrizoic acid, metrizoic acid, iodamide, iotalamic acid, ioxitalamic acid, ioglicic acid, acetrizoic acid, iocarmic acid, methiodal, diodone, metrizamide, iohexol, ioxaglic acid, iopamidol, iopromide, iotrolan, ioversol, iopentol, iodixanol, iomeprol, iobitridol, ioxilan, iodoxamic acid, iotroxic acid, ioglycamic acid, adipiodone, iobenzamic acid, iopanoic acid, iocetamic acid, sodium iopodate, tyropanoic acid, and calcium iopodate). As with many of the standard procedures associated with the practice of the invention, skilled artisans will be aware of additional labels that can be used.

Peptide Substrates and Inhibitors of Calpain-5

Calpain-5 is a cysteine protease that catalyzes the proteolytic cleavage of peptide substrates in the presence of Ca$^{2+}$.

In one aspect, calpain-5 peptide substrates are provided. Peptide substrates preferably have the following residues at the cleavage site positions of the substrate: P4: E, L, or G; P3: V, G, or L; P2: K or R; P1: K, R, or A; P1': V, A, or L; P2': E, L, or A; P3': E, A, or L; P4': P, A, or L (with cleavage occurring between P1 and P1'). In certain embodiments, a peptide substrate comprises or consists of an amino acid sequence selected from the group consisting of SEQ ID NO:1, SEQ ID NO:2, and SEQ ID NOS:290-315, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the peptide serves as a substrate and is capable of undergoing proteolytic cleavage by calpain-5.

In another aspect, calpain-5 inhibitors are provided. In certain embodiments, a calpain-5 inhibitor comprises or consists of an amino acid sequence selected from the group consisting of SEQ ID NO:288 and SEQ ID NO:289, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the inhibitor is capable of inhibiting calpain-5 activity.

If desired, calpain-5 peptide substrates and inhibitors can contain other amino acid sequences, such as amino acid linkers or signal sequences, as well as ligands or tags useful in protein purification, or detectable labels.

In certain embodiments, tag sequences are located at the N-terminus or C-terminus of the calpain-5 peptide substrate or inhibitor. Exemplary tags that can be used include a His-tag, a Strep-tag, a TAP-tag, an S-tag, an SBP-tag, an Arg-tag, a calmodulin-binding peptide tag, a cellulose-binding domain tag, a DsbA tag, a c-myc tag, a glutathione S-transferase tag, a FLAG tag, a HAT-tag, a maltose-binding protein tag, a NusA tag, and a thioredoxin tag.

In certain embodiments, the calpain-5 peptide substrate or inhibitor further comprises one or more linkers. Linkers are typically short peptide sequences of 2-30 amino acid residues, often composed of glycine and/or serine residues. Linker amino acid sequences will typically be short, e.g., 20 or fewer amino acids (i.e., 20, 19, 18, 17, 16, 15, 14, 13, 12, 11, 10, 9, 8, 7, 6, 5, 4, 3, 2, or 1). Examples include short peptide sequences which facilitate cloning, poly-glycine linkers (Gly$_n$ where n=2, 3, 4, 5, 6, 7, 8, 9, 10 or more), histidine tags (His$_n$ where n=3, 4, 5, 6, 7, 8, 9, 10 or more), linkers composed of glycine and serine residues ([Gly-Ser]$_n$, wherein n=1, 2, 3, 4, 5, 6, 7, 8, 9, 10, 11, 12, 13, 14, 15 or more), GSAT, SEG, and Z-EGFR linkers. Linkers may include restriction sites, which aid cloning and manipulation. Other suitable linker amino acid sequences will be apparent to those skilled in the art. (See e.g., Argos (1990) J. Mol. Biol. 211(4):943-958; Crasto et al. (2000) Protein Eng. 13:309-312; George et al. (2002) Protein Eng. 15:871-879; Arai et al. (2001) Protein Eng. 14:529-532; and the Registry of Standard Biological Parts (partsregistry.org/Protein_domains/Linker).

In certain embodiments, the calpain-5 peptide substrate or inhibitor may comprise one or more detectable labels in order to facilitate detection. Detectable labels suitable for use in the subject methods include any composition detectable by spectroscopic, photochemical, biochemical, immunochemical, electrical, optical, or chemical means. Particular examples of labels which may be used in the practice of the invention include, but are not limited to, SYBR green, SYBR gold, a CAL Fluor dye such as CAL Fluor Gold 540, CAL Fluor Orange 560, CAL Fluor Red 590, CAL Fluor Red 610, and CAL Fluor Red 635, a Quasar dye such as Quasar 570, Quasar 670, and Quasar 705, an Alexa Fluor such as Alexa Fluor 350, Alexa Fluor 488, Alexa Fluor 546, Alexa Fluor 555, Alexa Fluor 594, Alexa Fluor 647,and Alexa Fluor 784, a cyanine dye such as Cy 3, Cy3.5, Cy5, Cy5.5, and Cy7, fluorescein, 2', 4', 5', 7'-tetrachloro-4-7-dichlorofluorescein (TET), carboxyfluorescein (FAM), 6-carboxy-4',5'-dichloro-2',7'-dimethoxyfluorescein (JOE), hexachlorofluorescein (HEX), rhodamine, carboxy-X-rhodamine (ROX), tetramethyl rhodamine (TAMRA), FITC, dansyl, umbelliferone, dimethyl acridinium ester (DMAE), Texas red, luminol, and quantum dots, enzymes such as alkaline phosphatase (AP), beta-lactamase, chloramphenicol acetyltransferase (CAT), adenosine deaminase (ADA), aminoglycoside phosphotransferase (neo$^r$, G418$^r$) dihydrofolate reductase (DHFR), hygromycin-B-phosphotransferase (HPH), thymidine kinase (TK), β-galactosidase (lacZ), and xanthine guanine phosphoribosyltransferase (XGPRT), beta-glucuronidase (gus), placental alkaline phosphatase (PLAP), and secreted embryonic alkaline phosphatase (SEAP). Enzyme tags are used with their cognate substrate. The term also includes chemiluminescent labels such as luminol, isoluminol, acridinium esters, and peroxyoxalate and bioluminescent proteins such as firefly luciferase, bacterial luciferase, *Renilla* luciferase, and aequorin. The term also includes isotopic labels, including radioactive and non-radioactive isotopes, such as, $^3$H, $^2$H, $^{120}$I, $^{123}$I, $^{124}$I, $^{125}$I, $^{131}$I, $^{35}$S, $^{11}$C, $^{13}$C, $^{14}$C, $^{32}$P, $^{15}$N, $^{13}$N, $^{110}$In, $^{111}$In, $^{177}$Lu, $^{18}$F, $^{52}$Fe, $^{62}$Cu, $^{64}$Cu, $^{67}$Cu, $^{67}$Ga $^{68}$Ga, $^{86}$Y, $^{90}$Y, $^{89}$Zr, $^{94m}$Tc, $^{94}$Tc, $^{99m}$Tc, $^{154}$Gd, $^{155}$Gd, $^{156}$Gd, $^{157}$Gd, $^{158}$Gd, 15O, $^{186}$Re, $^{188}$Re, $^{51}$M, $^{52m}$Mn, $^{55}$Co, $^{72}$As, $^{75}$Br, $^{76}$Br, $^{82m}$Rb, and $^{83}$Sr. The term also includes color-coded microspheres of known fluorescent light intensities (see e.g., microspheres with xMAP technology produced by Luminex (Austin, TX); microspheres containing quantum dot nanocrystals, for example, containing different ratios and combinations of quantum dot colors (e.g., Qdot nanocrystals produced by Life Technologies (Carlsbad, CA); glass coated metal nanoparticles (see e.g., SERS nanotags produced by Nanoplex Technologies, Inc. (Mountain View, CA); barcode materials (see e.g., sub-micron sized striped metallic rods such as Nanobarcodes produced by Nanoplex Technologies, Inc.), encoded microparticles with colored bar codes (see e.g., CellCard produced by Vitra Bioscience, vitrabio.com), glass microparticles with digital holographic code images (see e.g., CyVera microbeads produced by Illumina (San Diego, CA), near infrared (NIR) probes, and nanoshells. In some embodiments, the peptide substrate is labeled with a fluorescent donor and acceptor pair suitable for FRET assays of calpain-5 protease activity, as described further below.

In certain embodiments, the calpain-5 peptide substrate or inhibitor is linked to an internalization sequence, a protein transduction domain, or a cell-penetrating peptide to facilitate entry into a cell. Cell penetrating peptides that can be used include, but are not limited to, HIV-Tat, penetratin, transportan, octaarginine, nonaarginine, antennapedia, TP10, Buforin II, MAP (model amphipathic peptide), K-FGF, Ku70, mellittin, pVEC, Pep-1, SynBl, Pep-7, CADY, GALA, pHLIP, KALA, R7W, and HN-1, which can readily transport molecules and small peptides across plasma membranes (see, e.g., Jones et al. (2012) J. Control Release 161(2):582-591; Fonseca et al. (2009) Adv. Drug Deliv. Rev. 61(11):953-64; Schwarze et al. (1999) Science. 285(5433):1569-72; Derossi et al. (1996) J. Biol. Chem. 271(30):18188-18193; Fuchs et al. (2004) Biochemistry 43(9):2438-2444; and Yuan et al. (2002) Cancer Res. 62(15): 4186-4190; herein incorporated by reference).

Screening for Calpain-5 Inhibitors

Inhibitors of calpain-5 may be useful in treating diseases associated with calpain-5 hyperactivity including, without limitation, retinal diseases such as, but not limited to, autosomal neovascular inflammatory vitreoretinopathy (ADNIV), uveitis, retinitis pigmentosa, proliferative diabetic retinopathy, proliferative vitreoretinopathy, and vitreoretinal degeneration. Accordingly, screening methods for identifying candidate agents that inhibit calpain-5 protease activity and reduce calpain-5-mediated inflammation are provided.

A variety of outputs and assays may be measured for this purpose, and in many embodiments a candidate agent will be tested in different assays to confirm inhibitory capability and efficacy in treating diseases associated with calpain-5 hyperactivity. For example, biochemical assays may determine the ability of an agent to inhibit protease activity of calpain-5. Cell-based assays may include, for example, testing for proteolytic cleavage of calpain-5 target proteins in the absence or presence of a candidate agent.

A "calpain-5 inhibitor" can be any molecule (e.g., small molecule inhibitor, protein, polypeptide, peptide, mutein, peptidomimetic compound, fusion protein, antibody or fragment thereof, antibody mimetic, or aptamer) that inhibits calpain-5 protease activity. Inhibition may be complete or partial (i.e., all activity, some activity, or most activity is blocked by an inhibitor). For example, an inhibitor may reduce the activity of calpain-5 by 10%, 20%, 30%, 40%, 50%, 60%, 70%, 80%, 90%, 100%, or any amount in between as compared to native or control levels. For purposes of the assay methods, calpain-5 may be provided as an isolated protein. Alternatively, the calpain-5 protein can be present in the context of a cell. Any convenient format may be used for the assay, e.g. wells, plates, flasks, etc., preferably a high throughput format, such as multi-well plates. A test agent of interest is added to the reaction mixture with the calpain-5 protease, for example in the presence of a calcium dication ($Ca^{2+}$), and a peptide substrate described herein, and the effect of the agent on calpain-5 activity is determined.

For examples, inhibitors can be identified by contacting calpain-5 with a candidate agent, $Ca^{2+}$, and a peptide substrate; and measuring inhibition of calpain-5 activity by the candidate agent. For example, inhibition of protease activity can be assayed by detecting a decreased rate of calpain-5 proteolytic cleavage of the peptide substrate in the presence of the candidate agent compared to that in the absence of the candidate agent. The assay can be performed, for example, in a buffered solution containing calpain-5, $Ca^{2+}$, the candidate agent, and the peptide substrate at about pH 7.0. Proteolytic cleavage of the substrate can be detected by methods known in the art such as with a fluorescence resonance energy transfer (FRET) assay (see, e.g., Example 3).

For example, the peptide substrate can be labeled with a fluorescent donor and acceptor pair, wherein the fluorescent donor and acceptor are sufficiently close together (e.g., typically less than 10 nm apart) in the intact peptide substrate such that fluorescence from the donor is quenched by the acceptor (i.e., fluorescence energy is transferred from the fluorescent donor to the acceptor non-radiatively). The selection of a fluorescent donor and acceptor pair is a matter of choice, but the FRET assay depends on the overlap of the fluorescent donor-emission and acceptor-excitation spectra. The fluorescent donor and acceptor are separated when the peptide substrate is cleaved by calpain-5 to produce a detectable fluorescent signal. For a description of suitable fluorophores for labeling peptides, including FRET donors and acceptors and the use of FRET assays for measuring protease activity, see, e.g., Carmona et al. (2009) An Acad Bras Cienc 81(3):381-92, Liao et al. (2015) Acta Pharmacol Sin 36(12):1408-15, Neefjes et al. (2004) Nat Rev Drug Discov 3(1):58-69; herein incorporated by reference.

Assays may further include controls, where suitable controls (e.g., a sample comprising the calpain-5 protease in the absence of the test agent). Generally, a plurality of assay mixtures is run in parallel with different agent concentrations to obtain a differential response to the various concentrations. Typically, one of these concentrations serves as a negative control, i.e. at zero concentration or below the level of detection.

A variety of other reagents may be included in the screening assay. These include reagents like salts, neutral proteins, e.g. albumin, detergents, etc., including agents that are used to facilitate optimal binding activity and/or reduce non-specific or background activity. Reagents that improve the efficiency of the assay, such as nuclease inhibitors, anti-microbial agents, etc. may be used. The components of the assay mixture are added in any order that provides for the requisite activity. Incubations are performed at any suitable temperature, typically between 4° C. and 40° C. Incubation periods are selected for optimum activity, but may also be optimized to facilitate rapid high-throughput screening. In some embodiments, between 0.1 hour and 1 hour, between 1 hour and 2 hours, or between 2 hours and 4 hours, will be sufficient.

A variety of different test agents may be screened. Candidate agents encompass numerous chemical classes, e.g., small organic compounds having a molecular weight of more than 50 daltons and less than about 10,000 daltons, less than about 5,000 daltons, or less than about 2,500 daltons. Test agents can comprise functional groups necessary for structural interaction with proteins, e.g., hydrogen bonding, and can include at least an amine, carbonyl, hydroxyl or carboxyl group, or at least two of the functional chemical groups. The test agents can comprise cyclical carbon or heterocyclic structures and/or aromatic or polyaromatic structures substituted with one or more of the above functional groups. Test agents are also found among biomolecules including peptides, saccharides, fatty acids, steroids, purines, pyrimidines, derivatives, structural analogs or combinations thereof.

Test agents are obtained from a wide variety of sources including libraries of synthetic or natural compounds. For example, numerous means are available for random and directed synthesis of a wide variety of organic compounds and biomolecules, including expression of randomized oligonucleotides and oligopeptides. Alternatively, libraries of natural compounds in the form of bacterial, fungal, plant and animal extracts are available or readily produced. Additionally, natural or synthetically produced libraries and compounds are readily modified through conventional chemical, physical and biochemical means, and may be used to produce combinatorial libraries. Known pharmacological agents may be subjected to directed or random chemical modifications, such as acylation, alkylation, esterification, amidification, etc. to produce structural analogs. Moreover, screening may be directed to known pharmacologically active compounds and chemical analogs thereof, or to new agents with unknown properties such as those created through rational drug design.

In some embodiments, test agents are synthetic compounds. A number of techniques are available for the random and directed synthesis of a wide variety of organic compounds and biomolecules, including expression of randomized oligonucleotides. See for example WO 94/24314, hereby expressly incorporated by reference, which discusses methods for generating new compounds, including random chemistry methods as well as enzymatic methods.

In some embodiments, the test agents are peptides, muteins, or peptidomimetic compounds, which may be have altered backbones or non-natural amino acids. Peptidomimetic compounds may include, without limitation, peptoids (poly-N-substituted glycines with side chains attached to the nitrogen atom of the peptide backbone, rather than to the α-carbon), β-peptides (amino group has covalent bond to the β carbon rather than the α carbon), and D-peptides (contain D-amino acids).

In another embodiment, the test agents are provided as libraries of natural compounds in the form of bacterial, fungal, plant and animal extracts that are available or readily produced. Additionally, natural or synthetically produced libraries and compounds are readily modified through conventional chemical, physical and biochemical means. Known pharmacological agents may be subjected to directed or random chemical modifications, including enzymatic modifications, to produce structural analogs.

In some embodiments, the test agents are organic moieties. In this embodiment, test agents are synthesized from a series of substrates that can be chemically modified. "Chemically modified" herein includes traditional chemical reactions as well as enzymatic reactions. These substrates generally include, but are not limited to, alkyl groups (including alkanes, alkenes, alkynes and heteroalkyl), aryl groups (including arenes and heteroaryl), alcohols, ethers, amines, aldehydes, ketones, acids, esters, amides, cyclic compounds, heterocyclic compounds (including purines, pyrimidines, benzodiazepins, beta-lactams, tetracylines, cephalosporins, and carbohydrates), steroids (including estrogens, androgens, cortisone, ecodysone, etc.), alkaloids (including ergots, vinca, curare, pyrollizdine, and mitomycines), organometallic compounds, hetero-atom bearing compounds, amino acids, and nucleosides. Chemical (including enzymatic) reactions may be done on the moieties to form new substrates or candidate agents which can then be tested using the present invention.

In some embodiments test agents are assessed for any cytotoxic activity it may exhibit toward a living eukaryotic cell, using well-known assays, such as trypan blue dye exclusion, an MTT (3-(4,5-dimethylthiazol-2-yl)-2,5-diphenyl-2H-tetrazolium bromide) assay, and the like. Agents that do not exhibit significant cytotoxic activity are considered candidate agents.

In some embodiments, the inhibitor is an antibody that specifically binds to and inhibits biological activity of calpain-5. Any type of antibody may be screened for the ability to inhibit calpain-5 by the methods described herein, including polyclonal antibodies, monoclonal antibodies, hybrid antibodies, altered antibodies, chimeric antibodies and, humanized antibodies, as well as: hybrid (chimeric) antibody molecules (see, for example, Winter et al. (1991) *Nature* 349:293-299; and U.S. Pat. No. 4,816,567); F(ab')$_2$ and F(ab) fragments; F$_v$ molecules (noncovalent heterodimers, see, for example, Inbar et al. (1972) *Proc Natl Acad Sci USA* 69:2659-2662; and Ehrlich et al. (1980) *Biochem* 19:4091-4096); single-chain Fv molecules (sFv) (see, e.g., Huston et al. (1988) *Proc Natl Acad Sci USA* 85:5879-5883); nanobodies or single-domain antibodies (sdAb) (see, e.g., Wang et al. (2016) *Int J Nanomedicine* 11:3287-3303; Vincke et al. (2012) *Methods Mol Biol* 911:15-26; dimeric and trimeric antibody fragment constructs; minibodies (see, e.g., Pack et al. (1992) *Biochem* 31:1579-1584; Cumber et al. (1992) *J Immunology* 149B:120-126); humanized antibody molecules (see, e.g., Riechmann et al. (1988) *Nature* 332:323-327; Verhoeyan et al. (1988) *Science* 239:1534-1536; and U.K. Patent Publication No. GB 2,276,169, published 21 Sep. 1994); and, any functional fragments obtained from such molecules, wherein such fragments retain specific-binding properties of the parent antibody molecule.

In other embodiments, the inhibitor is an aptamer that specifically binds to and inhibits biological activity of calpain-5. Aptamers may be isolated from a combinatorial library and improved by directed mutation or repeated rounds of mutagenesis and selection. For a description of methods of producing aptamers, see, e.g., *Aptamers: Tools for Nanotherapy and Molecular Imaging* (R. N. Veedu ed., Pan Stanford, 2016), *Nucleic Acid and Peptide Aptamers: Methods and Protocols* (Methods in Molecular Biology, G. Mayer ed., Humana Press, 2009), *Aptamers Selected by Cell-SELEX for Theranostics* (W. Tan, X. Fang eds., Springer, 2015), Cox et al. (2001) Bioorg. Med. Chem. 9(10):2525-2531; Cox et al. (2002) Nucleic Acids Res. 30(20): e108, Kenan et al. (1999) Methods Mol. Biol. 118:217-231; Platella et al. (2016) Biochim. Biophys. Acta Nov 16 pii: S0304-4165(16)30447-0, and Lyu et al. (2016) Theranostics 6(9):1440-1452; herein incorporated by reference in their entireties.

In yet other embodiments, the inhibitor is an antibody mimetic that specifically binds to and inhibits biological activity of calpain-5. Any type of antibody mimetic may be used as an inhibitor, including, but not limited to, affibody molecules (Nygren (2008) FEBS J. 275 (11):2668-2676), affilins (Ebersbach et al. (2007) J. Mol. Biol. 372 (1):172-185), affimers (Johnson et al. (2012) Anal. Chem. 84 (15): 6553-6560), affitins (Krehenbrink et al. (2008) J. Mol. Biol. 383 (5):1058-1068), alphabodies (Desmet et al. (2014) Nature Communications 5:5237), anticalins (Skerra (2008) FEBS J. 275 (11):2677-2683), avimers (Silverman et al. (2005) Nat. Biotechnol. 23 (12):1556-1561), darpins (Stumpp et al. (2008) Drug Discov. Today 13 (15-16):695-701), fynomers (Grabulovski et al. (2007) J. Biol. Chem. 282 (5):3196-3204), and monobodies (Koide et al. (2007) Methods Mol. Biol. 352:95-109).

Screening Inhibitors for their Effects on Calpain-5-Induced Inflammation and Eye Damage In some embodiments, a test agent that inhibits calpain-5 protease activity is further tested for its ability to inhibit calpain-5-induced inflammation or eye damage in a cell-based assay or tissue assay. In these embodiments, a test agent of interest is contacted with retinal cells or tissue; and the effect, if any, of the test agent on the retinal cells or tissue is determined.

In some embodiments, a test compound identified as an inhibitor of calpain-5 in cell- or tissue-based or cell-free assays is further tested for its efficacy in treating a disease associated with calpain-5 hyperactivity in vivo, e.g., in an animal such as an animal model of a disease associated with calpain-5 hyperactivity. For example, an agent that inhibits calpain-5 protease activity, identified as described herein, can be used in an animal model to determine the efficacy, toxicity, or side effects of treatment with such an agent. Alternatively, an agent identified, as described herein, can be used in an animal model to determine the mechanism of action of such an agent. Monitoring the efficacy of agents (e.g., drugs) on diseases associated with calpain-5 hyperactivity can be applied not only in basic drug screening, but also in clinical trials. Furthermore, this disclosure pertains to uses of novel agents identified by the above-described screening assays for treatment of diseases associated with calpain-5 hyperactivity.

Production of Calpain-5 Peptide Substrates and Inhibitors

Calpain-5 peptide substrates and inhibitors can be prepared in any suitable manner (e.g., recombinant expression, purification from cell culture, chemical synthesis, etc.) and in various forms (e.g. native, fusions, labeled, methylated, amidated, acetylated, lipidated, PEGylated, etc.). The calpain-5 peptide substrates and inhibitors may include naturally-occurring peptides, recombinantly produced peptides, synthetically produced peptides, or peptides produced by a combination of these methods. Means for preparing peptides are well understood in the art. Peptides are preferably prepared in substantially pure form (i.e. substantially free from other host cell or non-host cell proteins).

In one embodiment, the peptide substrates or inhibitors are generated using recombinant techniques. One of skill in the art can readily determine nucleotide sequences that encode the desired peptides using standard methodology and the teachings herein. Oligonucleotide probes can be devised based on the known sequences and used to probe genomic or cDNA libraries. The sequences can then be further isolated using standard techniques and, e.g., restriction enzymes employed to truncate the gene at desired portions of the full-length sequence. Similarly, sequences of interest can be isolated directly from cells and tissues containing the same, using known techniques, such as phenol extraction and the sequence further manipulated to produce the desired truncations. See, e.g., Sambrook et al., supra, for a description of techniques used to obtain and isolate DNA.

The sequences encoding a peptide substrate or inhibitor can also be produced synthetically, for example, based on the known sequences. The nucleotide sequence can be designed with the appropriate codons for the particular amino acid sequence desired. The complete sequence is generally assembled from overlapping oligonucleotides prepared by standard methods and assembled into a complete coding sequence. See, e.g., Edge (1981) *Nature* 292:756; Nambair et al. (1984) *Science* 223:1299; Jay et al. (1984) *J. Biol. Chem.* 259:6311; Stemmer et al. (1995) *Gene* 164:49-53.

Recombinant techniques are readily used to clone sequences encoding peptide substrates or inhibitors that can then be mutagenized in vitro by the replacement of the appropriate base pair(s) to result in the codon for the desired amino acid. Such a change can include as little as one base pair, effecting a change in a single amino acid, or can encompass several base pair changes. Alternatively, the mutations can be effected using a mismatched primer that hybridizes to the parent nucleotide sequence (generally cDNA corresponding to the RNA sequence), at a temperature below the melting temperature of the mismatched duplex. The primer can be made specific by keeping primer length and base composition within relatively narrow limits and by keeping the mutant base centrally located. See, e.g., Innis et al, (1990) PCR Applications: Protocols for Functional Genomics; Zoller and Smith, *Methods Enzymol.* (1983) 100:468. Primer extension is effected using DNA polymerase, the product cloned and clones containing the mutated DNA, derived by segregation of the primer extended strand, selected. Selection can be accomplished using the mutant primer as a hybridization probe. The technique is also applicable for generating multiple point mutations. See, e.g., Dalbie-McFarland et al. *Proc. Natl. Acad. Sci USA* (1982) 79:6409.

Once coding sequences have been isolated and/or synthesized, they can be cloned into any suitable vector or replicon for expression. (See, also, Examples). As will be apparent from the teachings herein, a wide variety of vectors encoding modified peptides can be generated by creating expression constructs which operably link, in various combinations, polynucleotides encoding peptides having deletions or mutations therein.

Numerous cloning vectors are known to those of skill in the art, and the selection of an appropriate cloning vector is a matter of choice. Examples of recombinant DNA vectors for cloning and host cells which they can transform include the bacteriophage λ (*E. coli*), pBR322 (*E. coli*), pACYC177 (*E. coli*), pKT230 (gram-negative bacteria), pGV1106 (gram-negative bacteria), pLAFR1 (gram-negative bacteria), pME290 (non-*E. coli* gram-negative bacteria), pHV14 (*E. coli* and *Bacillus subtilis*), pBD9 (*Bacillus*), pIJ61 (*Streptomyces*), pUC6 (*Streptomyces*), YIp5 (*Saccharomyces*), YCp19 (*Saccharomyces*) and bovine papilloma virus (mammalian cells). See, generally, DNA Cloning: Vols. I & II, supra; Sambrook et al., supra; B. Perbal, supra.

Insect cell expression systems, such as baculovirus systems, can also be used and are known to those of skill in the art and described in, e.g., Summers and Smith, *Texas Agricultural Experiment Station Bulletin* No. 1555 (1987). Materials and methods for baculovirus/insect cell expression systems are commercially available in kit form from, inter alia, Invitrogen, San Diego CA ("MaxBac" kit).

Plant expression systems can also be used to produce the peptide substrates or inhibitors described herein. Generally, such systems use virus-based vectors to transfect plant cells with heterologous genes. For a description of such systems, see, e.g., Porta et al., *Mol. Biotech.* (1996) 5:209-221; and Hackland et al., *Arch. Virol.* (1994) 139:1-22.

Viral systems, such as a vaccinia-based infection/transfection system, as described in Tomei et al., *J. Virol.* (1993) 67:4017-4026 and Selby et al., *J. Gen. Virol.* (1993) 74:1103-1113, will also find use with the present invention. In this system, cells are first transfected in vitro with a vaccinia virus recombinant that encodes the bacteriophage T7 RNA polymerase. This polymerase displays exquisite specificity in that it only transcribes templates bearing T7 promoters. Following infection, cells are transfected with the DNA of interest, driven by a T7 promoter. The polymerase expressed in the cytoplasm from the vaccinia virus recombinant transcribes the transfected DNA into RNA that is then translated into protein by the host translational machinery. The method provides for high level, transient, cytoplasmic production of large quantities of RNA and its translation product(s).

The gene can be placed under the control of a promoter, ribosome binding site (for bacterial expression) and, optionally, an operator (collectively referred to herein as "control" elements), so that the DNA sequence encoding the desired peptide is transcribed into RNA in the host cell transformed by a vector containing this expression construction. The coding sequence may or may not contain a signal peptide or leader sequence. With the present invention, both the naturally occurring signal peptides or heterologous sequences can be used. Leader sequences can be removed by the host in post-translational processing. See, e.g., U.S. Pat. Nos. 4,431,739; 4,425,437; 4,338,397. Such sequences include, but are not limited to, the TPA leader, as well as the honey bee mellitin signal sequence.

Other regulatory sequences may also be desirable which allow for regulation of expression of the protein sequences relative to the growth of the host cell. Such regulatory sequences are known to those of skill in the art, and examples include those which cause the expression of a gene to be turned on or off in response to a chemical or physical stimulus, including the presence of a regulatory compound. Other types of regulatory elements may also be present in the vector, for example, enhancer sequences.

The control sequences and other regulatory sequences may be ligated to the coding sequence prior to insertion into a vector. Alternatively, the coding sequence can be cloned directly into an expression vector that already contains the control sequences and an appropriate restriction site.

In some cases, it may be necessary to modify the coding sequence so that it may be attached to the control sequences with the appropriate orientation; i.e., to maintain the proper reading frame. Mutants or analogs may be prepared by the deletion of a portion of the sequence encoding the protein, by insertion of a sequence, and/or by substitution of one or more nucleotides within the sequence. Techniques for modifying nucleotide sequences, such as site-directed mutagenesis, are well known to those skilled in the art. See, e.g., Sambrook et al., supra; DNA Cloning, Vols. I and II, supra; Nucleic Acid Hybridization, supra.

The expression vector is then used to transform an appropriate host cell. A number of mammalian cell lines are known in the art and include immortalized cell lines available from the American Type Culture Collection (ATCC), such as, but not limited to, Chinese hamster ovary (CHO) cells, HeLa cells, baby hamster kidney (BHK) cells, monkey kidney cells (COS), human hepatocellular carcinoma cells (e.g., Hep G2), Vero293 cells, as well as others. Similarly, bacterial hosts such as E. coli, Bacillus subtilis, and Streptococcus spp., will find use with the present expression constructs. Yeast hosts useful in the present invention include inter alia, Saccharomyces cerevisiae, Candida albicans, Candida maltosa, Hansenula polymorpha, Kluyveromyces fragilis, Kluyveromyces lactis, Pichia guillerimondii, Pichia pastoris, Schizosaccharomyces pombe and Yarrowia lipolytica. Insect cells for use with baculovirus expression vectors include, inter alia, Aedes aegypti, Autographa californica, Bombyx mori, Drosophila melanogaster, Spodoptera frugiperda, and Trichoplusia ni.

Depending on the expression system and host selected, the fusion proteins of the present invention are produced by growing host cells transformed by an expression vector described above under conditions whereby the protein of interest is expressed. The selection of the appropriate growth conditions is within the skill of the art.

In one embodiment, the transformed cells secrete the peptide or polypeptide product into the surrounding media. Certain regulatory sequences can be included in the vector to enhance secretion of the peptide product, for example using a tissue plasminogen activator (TPA) leader sequence, an interferon (y or a) signal sequence or other signal peptide sequences from known secretory proteins. The secreted peptide product can then be isolated by various techniques described herein, for example, using standard purification techniques such as but not limited to, hydroxyapatite resins, column chromatography, ion-exchange chromatography, size-exclusion chromatography, electrophoresis, HPLC, immunoadsorbent techniques, affinity chromatography, immunoprecipitation, and the like.

Alternatively, the transformed cells are disrupted, using chemical, physical or mechanical means, which lyse the cells yet keep the recombinant peptides substantially intact. Intracellular proteins can also be obtained by removing components from the cell wall or membrane, e.g., by the use of detergents or organic solvents, such that leakage of the peptides occurs. Such methods are known to those of skill in the art and are described in, e.g., Protein Purification Applications: A Practical Approach, (Simon Roe, Ed., 2001).

For example, methods of disrupting cells for use with the present invention include but are not limited to: sonication or ultrasonication; agitation; liquid or solid extrusion; heat treatment; freeze-thaw; desiccation; explosive decompression; osmotic shock; treatment with lytic enzymes including proteases such as trypsin, neuraminidase and lysozyme; alkali treatment; and the use of detergents and solvents such as bile salts, sodium dodecylsulphate, Triton, NP40 and CHAPS. The particular technique used to disrupt the cells is largely a matter of choice and will depend on the cell type in which the peptide is expressed, culture conditions and any pre-treatment used.

Following disruption of the cells, cellular debris is removed, generally by centrifugation, and the intracellularly produced peptides are further purified, using standard purification techniques such as but not limited to, column chromatography, ion-exchange chromatography, size-exclusion chromatography, electrophoresis, HPLC, immunoadsorbent techniques, affinity chromatography, immunoprecipitation, and the like.

For example, one method for obtaining the intracellular peptides of the present invention involves affinity purification, such as by immunoaffinity chromatography using antibodies (e.g., previously generated antibodies), or by lectin affinity chromatography. Particularly preferred lectin resins are those that recognize mannose moieties such as but not limited to resins derived from Galanthus nivalis agglutinin (GNA), Lens culinaris agglutinin (LCA or lentil lectin), Pisum sativum agglutinin (PSA or pea lectin), Narcissus pseudonarcissus agglutinin (NPA) and Allium ursinum agglutinin (AUA). The choice of a suitable affinity resin is within the skill in the art. After affinity purification, the peptides or polypeptides can be further purified using conventional techniques well known in the art, such as by any of the techniques described above.

Calpain-5 peptide substrates and inhibitors can be conveniently synthesized chemically, for example by any of several techniques that are known to those skilled in the peptide art. See, e.g., Fmoc Solid Phase Peptide Synthesis: A Practical Approach (W. C. Chan and Peter D. White eds., Oxford University Press, 1$^{st}$ edition, 2000); N. Leo Benoiton, Chemistry of Peptide Synthesis (CRC Press; 1$^{st}$ edition, 2005); Peptide Synthesis and Applications (Methods in Molecular Biology, John Howl ed., Humana Press, 1$^{st}$ ed., 2005); and Pharmaceutical Formulation Development of Peptides and Proteins (The Taylor & Francis Series in Pharmaceutical Sciences, Lars Hovgaard, Sven Frokjaer, and Marco van de Weert eds., CRC Press; 1$^{st}$ edition, 1999); herein incorporated by reference.

In general, these methods employ the sequential addition of one or more amino acids to a growing peptide chain. Normally, either the amino or carboxyl group of the first amino acid is protected by a suitable protecting group. The protected or derivatized amino acid can then be either attached to an inert solid support or utilized in solution by adding the next amino acid in the sequence having the complementary (amino or carboxyl) group suitably protected, under conditions that allow for the formation of an amide linkage. The protecting group is then removed from the newly added amino acid residue and the next amino acid (suitably protected) is then added, and so forth. After the desired amino acids have been linked in the proper sequence, any remaining protecting groups (and any solid support, if solid phase synthesis techniques are used) are removed sequentially or concurrently, to render the final peptide substrate or inhibitor. By simple modification of this general procedure, it is possible to add more than one amino acid at a time to a growing chain, for example, by coupling (under conditions which do not racemize chiral centers) a protected tripeptide with a properly protected dipeptide to form, after deprotection, a pentapeptide. See, e.g., J. M. Stewart and J. D. Young, Solid Phase Peptide Synthesis (Pierce Chemical Co., Rockford, IL 1984) and G. Barany and R. B. Merrifield, The Peptides: Analysis, Synthesis, Biology, editors E. Gross and J. Meienhofer, Vol. 2, (Academic Press, New York, 1980), pp. 3-254, for solid phase peptide synthesis techniques; and M. Bodansky, Principles of Peptide Synthesis, (Springer-Verlag, Berlin 1984) and E. Gross and J. Meienhofer, Eds., The Peptides: Analysis, Synthesis, Biology, Vol. 1, for classical solution synthesis. These methods are typically used for relatively small polypeptides, i.e., up to about 50-100 amino acids in length, but are also applicable to larger polypeptides.

Typical protecting groups include t-butyloxycarbonyl (Boc), 9-fluorenylmethoxycarbonyl (Fmoc) benzyloxycarbonyl (Cbz); p-toluenesulfonyl (Tx); 2,4-dinitrophenyl; benzyl (Bzl); biphenylisopropyloxycarboxy-carbonyl, t-amyloxycarbonyl, isobornyloxycarbonyl, o-bromobenzyloxycarbonyl, cyclohexyl, isopropyl, acetyl, o-nitrophenylsulfonyl and the like.

Typical solid supports are cross-linked polymeric supports. These can include divinylbenzene cross-linked-styrene-based polymers, for example, divinylbenzene-hydroxymethylstyrene copolymers, divinylbenzene-chloromethylstyrene copolymers and divinylbenzene-benzhydrylaminopolystyrene copolymers.

Calpain-5 peptide substrates or inhibitors can also be chemically prepared by other methods such as by the method of simultaneous multiple peptide synthesis. See, e.g., Houghten Proc. Natl. Acad. Sci. USA (1985) 82:5131-5135; U.S. Pat. No. 4,631,211.

Pharmaceutical Compositions

Calpain-5 inhibitors can be formulated into pharmaceutical compositions optionally comprising one or more pharmaceutically acceptable excipients. Exemplary excipients include, without limitation, carbohydrates, inorganic salts, antimicrobial agents, antioxidants, surfactants, buffers, acids, bases, and combinations thereof. Excipients suitable for injectable compositions include water, alcohols, polyols, glycerine, vegetable oils, phospholipids, and surfactants. A carbohydrate such as a sugar, a derivatized sugar such as an alditol, aldonic acid, an esterified sugar, and/or a sugar polymer may be present as an excipient. Specific carbohydrate excipients include, for example: monosaccharides, such as fructose, maltose, galactose, glucose, D-mannose, sorbose, and the like; disaccharides, such as lactose, sucrose, trehalose, cellobiose, and the like; polysaccharides, such as raffinose, melezitose, maltodextrins, dextrans, starches, and the like; and alditols, such as mannitol, xylitol, maltitol, lactitol, xylitol, sorbitol (glucitol), pyranosyl sorbitol, myo-inositol, and the like. The excipient can also include an inorganic salt or buffer such as citric acid, sodium chloride, potassium chloride, sodium sulfate, potassium nitrate, sodium phosphate monobasic, sodium phosphate dibasic, and combinations thereof.

A composition of the invention can also include an antimicrobial agent for preventing or deterring microbial growth. Nonlimiting examples of antimicrobial agents suitable for the present invention include benzalkonium chloride, benzethonium chloride, benzyl alcohol, cetylpyridinium chloride, chlorobutanol, phenol, phenylethyl alcohol, phenylmercuric nitrate, thimersol, and combinations thereof.

An antioxidant can be present in the composition as well. Antioxidants are used to prevent oxidation, thereby preventing the deterioration of the calpain-5 inhibitor, or other components of the preparation. Suitable antioxidants for use in the present invention include, for example, ascorbyl palmitate, butylated hydroxyanisole, butylated hydroxytoluene, hypophosphorous acid, monothioglycerol, propyl gallate, sodium bisulfite, sodium formaldehyde sulfoxylate, sodium metabisulfite, and combinations thereof.

A surfactant can be present as an excipient. Exemplary surfactants include: polysorbates, such as "Tween 20" and "Tween 80," and pluronics such as F68 and F88 (BASF, Mount Olive, New Jersey); sorbitan esters; lipids, such as phospholipids such as lecithin and other phosphatidylcholines, phosphatidylethanolamines (although preferably not in liposomal form), fatty acids and fatty esters; steroids, such as cholesterol; chelating agents, such as EDTA; and zinc and other such suitable cations.

Acids or bases can be present as an excipient in the composition. Nonlimiting examples of acids that can be used include those acids selected from the group consisting of hydrochloric acid, acetic acid, phosphoric acid, citric acid, malic acid, lactic acid, formic acid, trichloroacetic acid, nitric acid, perchloric acid, phosphoric acid, sulfuric acid, fumaric acid, and combinations thereof. Examples of suitable bases include, without limitation, bases selected from the group consisting of sodium hydroxide, sodium acetate, ammonium hydroxide, potassium hydroxide, ammonium acetate, potassium acetate, sodium phosphate, potassium phosphate, sodium citrate, sodium formate, sodium sulfate, potassium sulfate, potassium fumerate, and combinations thereof.

The amount of the calpain-5 inhibitor (e.g., when contained in a drug delivery system) in the composition will vary depending on a number of factors, but will optimally be a therapeutically effective dose when the composition is in a unit dosage form or container (e.g., a vial). A therapeutically effective dose can be determined experimentally by repeated administration of increasing amounts of the composition in order to determine which amount produces a clinically desired endpoint.

The amount of any individual excipient in the composition will vary depending on the nature and function of the excipient and particular needs of the composition. Typically, the optimal amount of any individual excipient is determined through routine experimentation, i.e., by preparing compositions containing varying amounts of the excipient (ranging from low to high), examining the stability and other parameters, and then determining the range at which optimal performance is attained with no significant adverse effects. Generally, however, the excipient(s) will be present in the composition in an amount of about 1% to about 99% by weight, preferably from about 5% to about 98% by weight, more preferably from about 15 to about 95% by weight of the excipient, with concentrations less than 30% by weight most preferred. These foregoing pharmaceutical excipients along with other excipients are described in "Remington: The Science & Practice of Pharmacy", 19th ed., Williams & Williams, (1995), the "Physician's Desk Reference", 52nd ed., Medical Economics, Montvale, NJ (1998), and Kibbe, A. H., Handbook of Pharmaceutical Excipients, 3rd Edition, American Pharmaceutical Association, Washington, D.C., 2000.

The compositions encompass all types of formulations and in particular those that are suited for injection, e.g., powders or lyophilates that can be reconstituted with a solvent prior to use, as well as ready for injection solutions or suspensions, dry insoluble compositions for combination with a vehicle prior to use, and emulsions and liquid concentrates for dilution prior to administration. Examples of suitable diluents for reconstituting solid compositions prior to injection include bacteriostatic water for injection, dextrose 5% in water, phosphate buffered saline, Ringer's solution, saline, sterile water, deionized water, and combinations thereof. With respect to liquid pharmaceutical compositions, solutions and suspensions are envisioned. Additional preferred compositions include those for oral, ocular, or localized delivery.

The pharmaceutical preparations herein can also be housed in a syringe, an implantation device, or the like, depending upon the intended mode of delivery and use. Preferably, the compositions comprising one or more calpain-5 inhibitors described herein are in unit dosage form, meaning an amount of a conjugate or composition of the invention appropriate for a single dose, in a premeasured or pre-packaged form.

The compositions herein may optionally include one or more additional agents, such as other drugs for treating a disease associated with calpain-5 hyperactivity, or other medications used to treat a subject for a condition or disease. Compounded preparations may include at least one calpain-5 inhibitor and one or more drugs for treating a disease associated with calpain-5 hyperactivity, such as corticosteroids. Alternatively, such agents can be contained in a separate composition from the composition comprising a calpain-5 inhibitor and co-administered concurrently, before, or after the composition comprising a calpain-5 inhibitor.

Administration

At least one therapeutically effective cycle of treatment with a calpain-5 inhibitor will be administered to a subject for treatment of a disease associated with calpain-5 hyperactivity. Diseases associated with calpain-5 hyperactivity include any disease associated with pathological calpain-5 hyperactivity including, without limitation, retinal diseases such as, but not limited to, autosomal neovascular inflammatory vitreoretinopathy (ADNIV), uveitis, retinitis pigmentosa, proliferative diabetic retinopathy, proliferative vitreoretinopathy, and vitreoretinal degeneration.

By "therapeutically effective cycle of treatment" is intended a cycle of treatment that when administered, brings about a positive therapeutic response with respect to treatment of an individual for a disease associated with calpain-5 hyperactivity. Of particular interest is a cycle of treatment with a calpain-5 inhibitor that prevents, reduces, or delays retinal degeneration, neuroinflammation, necrotic cell death, or blindness. Additionally, a therapeutically effective amount of a calpain-5 inhibitor may reduce proteolytic cleavage of target proteins by calpain-5.

In certain embodiments, multiple therapeutically effective doses of compositions comprising a calpain-5 inhibitor, and/or one or more other therapeutic agents, such as other drugs for treating a disease associated with calpain-5 hyperactivity will be administered. The compositions of the present invention are typically, although not necessarily, administered topically, orally, via injection (subcutaneously, intravenously, or intramuscularly), by infusion, or locally. Additional modes of administration are also contemplated, such as intraocular, intracerebral, intraneural, pulmonary, intra-arterial, and so forth.

The preparations according to the invention are also suitable for local treatment. In a particular embodiment, a composition of the invention is used for localized delivery of a calpain-5 inhibitor, for example, for the treatment of a retinal disease associated with calpain-5 hyperactivity. For example, compositions may be administered directly into the eye or retina. The particular preparation and appropriate method of administration are chosen to target the calpain-5 inhibitor to the site of aberrant calpain-5 activity.

The pharmaceutical preparation can be in the form of a liquid solution or suspension immediately prior to administration, but may also take another form such as a syrup, cream, ointment, tablet, capsule, powder, gel, matrix, suppository, or the like. The pharmaceutical compositions comprising a calpain-5 inhibitor and other agents may be administered using the same or different routes of administration in accordance with any medically acceptable method known in the art.

In another embodiment, the pharmaceutical compositions comprising a calpain-5 inhibitor and/or other agents are administered prophylactically, e.g., to prevent eye damage. Such prophylactic uses will be of particular value for subjects with a genetic predisposition to developing a disease associated with calpain-5 hyperactivity (e.g., autosomal neovascular inflammatory vitreoretinopathy (ADNIV).

In another embodiment, the pharmaceutical compositions comprising a calpain-5 inhibitor and/or other agents are in a sustained-release formulation, or a formulation that is administered using a sustained-release device. Such devices are well known in the art, and include, for example, transdermal patches, and miniature implantable pumps that can provide for drug delivery over time in a continuous, steady-state fashion at a variety of doses to achieve a sustained-release effect with a non-sustained-release pharmaceutical composition.

In some embodiments, a conjugate comprising a calpain-5 inhibitor is provided to a patient suffering from a condition that is responsive to treatment with a calpain-5 inhibitor contained in the conjugate or composition. The method comprises administering, via any of the herein described modes, a therapeutically effective amount of the conjugate or drug delivery system, preferably provided as part of a pharmaceutical composition. The method of administering may be used to treat any condition that is responsive to treatment with a calpain-5 inhibitor. More specifically, the compositions herein are effective in treating retinal diseases associated with calpain-5 hyperactivity.

Those of ordinary skill in the art will appreciate which conditions a specific calpain-5 inhibitor can effectively treat. The actual dose to be administered will vary depending upon the age, weight, and general condition of the subject as well as the severity of the condition being treated, the judgment of the health care professional, and conjugate being administered. Therapeutically effective amounts can be determined by those skilled in the art, and will be adjusted to the particular requirements of each particular case.

Generally, a therapeutically effective amount will range from about 0.50 mg to 5 grams of a calpain-5 inhibitor daily, more preferably from about 5 mg to 2 grams daily, even more preferably from about 7 mg to 1.5 grams daily. Preferably, such doses are in the range of 10-600 mg four times a day (QID), 200-500 mg QID, 25-600 mg three times a day (TID), 25-50 mg TID, 50-100 mg TID, 50-200 mg TID, 300-600 mg TID, 200-400 mg TID, 200-600 mg TID, 100 to 700 mg twice daily (BID), 100-600 mg BID, 200-500 mg BID, or 200-300 mg BID. The amount of compound administered will depend on the potency of the specific calpain-5 inhibitor and the magnitude or effect on calpain-5 inhibition desired and the route of administration.

A purified calpain-5 inhibitor (again, preferably provided as part of a pharmaceutical preparation) can be administered alone or in combination with one or more other therapeutic agents, such as corticosteroids, or other medications used to treat a particular condition or disease according to a variety of dosing schedules depending on the judgment of the clinician, needs of the patient, and so forth. The specific dosing schedule will be known by those of ordinary skill in the art or can be determined experimentally using routine methods. Exemplary dosing schedules include, without limitation, administration five times a day, four times a day, three times a day, twice daily, once daily, three times weekly, twice weekly, once weekly, twice monthly, once monthly, and any combination thereof. Preferred compositions are those requiring dosing no more than once a day.

A calpain-5 inhibitor can be administered prior to, concurrent with, or subsequent to other agents. If provided at the same time as other agents, one or more calpain-5 inhibitors can be provided in the same or in a different composition. Thus, a calpain-5 inhibitor and other agents can be presented to the individual by way of concurrent therapy. By "concurrent therapy" is intended administration to a subject such that the therapeutic effect of the combination of the substances is caused in the subject undergoing therapy. For example, concurrent therapy may be achieved by administering a dose of a pharmaceutical composition comprising a calpain-5 inhibitor and a dose of a pharmaceutical composition comprising at least one other agent, such as another drug for treating a disease associated with calpain-5 hyperactivity, which in combination comprise a therapeutically effective dose, according to a particular dosing regimen. Similarly, a calpain-5 inhibitor and one or more other therapeutic agents can be administered in at least one therapeutic dose. Administration of the separate pharmaceutical compositions can be performed simultaneously or at different times (i.e., sequentially, in either order, on the same day, or on different days), so long as the therapeutic effect of the combination of these substances is caused in the subject undergoing therapy.

Kits

Any of the compositions described herein may be provided as kits. Kits may comprise one or more containers holding compositions comprising at least one calpain-5 peptide inhibitor or substrate. Compositions can be in liquid form or can be lyophilized, as can individual peptides. Suitable containers for the compositions include, for example, bottles, vials, syringes, and test tubes. Containers can be formed from a variety of materials, including glass or plastic.

In addition to the above components, the subject kits may further include (in certain embodiments) instructions for practicing the subject methods. For peptide substrates, the kit may include instructions for performing an assay to measure calpain-5 enzymatic activity or inhibition. For peptide inhibitors, the kit may include instructions on how to treat a disease associated with calpain-5 hyperactivity. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), DVD, flash drive, and the like, on which the information has been recorded. Yet another form of these instructions that may be present is a website address which may be used via the internet to access the information at a removed site.

In certain embodiments, the kit further comprises reagents for assaying calpain-5 activity such as calpain-5, $Ca^{2+}$, and a buffer for maintaining pH in a range at which calpain-5 is active (e.g., about pH 7).

In certain embodiments, the kit comprises a calpain-5 peptide substrate comprising or consisting of an amino acid sequence selected from the group consisting of SEQ ID NO:1, SEQ ID NO:2, and SEQ ID NOS:290-315, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the peptide serves as a substrate and is capable of undergoing proteolytic cleavage by calpain-5.

In certain embodiments, the kit comprises a calpain-5 peptide inhibitor comprising or consisting of an amino acid sequence selected from the group consisting of SEQ ID NO:288 and SEQ ID NO:289, or a sequence displaying at least about 80-100% sequence identity thereto, including any percent identity within this range, such as 81, 82, 83, 84, 85, 86, 87, 88, 89, 90, 91, 92, 93, 94, 95, 96, 97, 98, 99% sequence identity thereto, wherein the inhibitor is capable of inhibiting calpain-5 activity.

Experimental

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. For example, due to codon redundancy, changes can be made in the underlying DNA sequence without affecting the protein sequence. Moreover, due to biological functional equivalency considerations, changes can be made in protein structure without affecting the biological action in kind or amount. All such modifications are intended to be included within the scope of the appended claims.

Example 1

Novel Peptide Substrates for CAPN5 Assay

Two CAPN5-PC-specific peptide substrates were identified, including PR1476, having the amino acid sequence of RQNRGGGCINH (SEQ ID NO:1), and PR1478 having the amino acid sequence of WRQNRGGGCINH (SEQ ID NO:2). PR1478 differs from PR1476 in that a tryptophan was added to the N-terminus of PR1476, which makes PR1478 a better substrate for CAPN5 and more soluble in assay buffers. Both peptides are more sensitive than other generic calpain substrates and will be useful for screening for CAPN5 inhibitors.

Figure 2B:
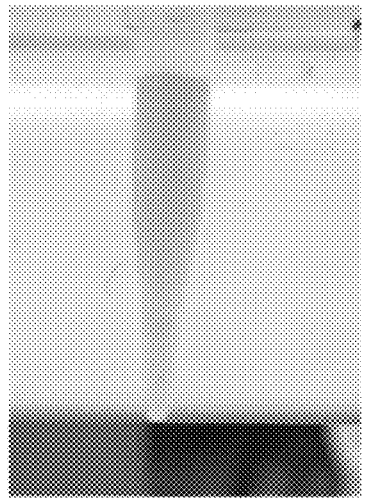
Figure 2B:
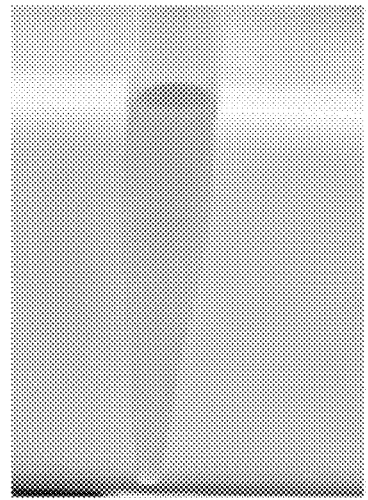
Figure 2C:
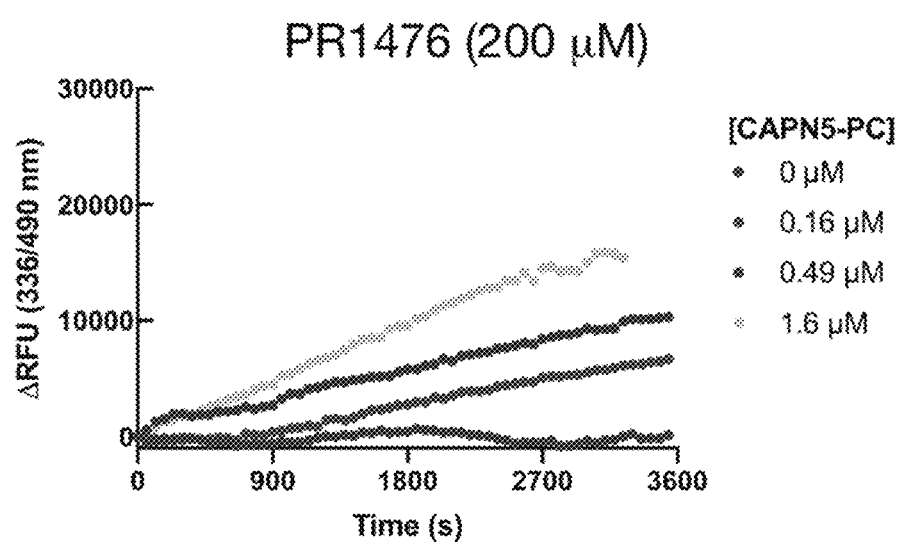
Figure 2D:
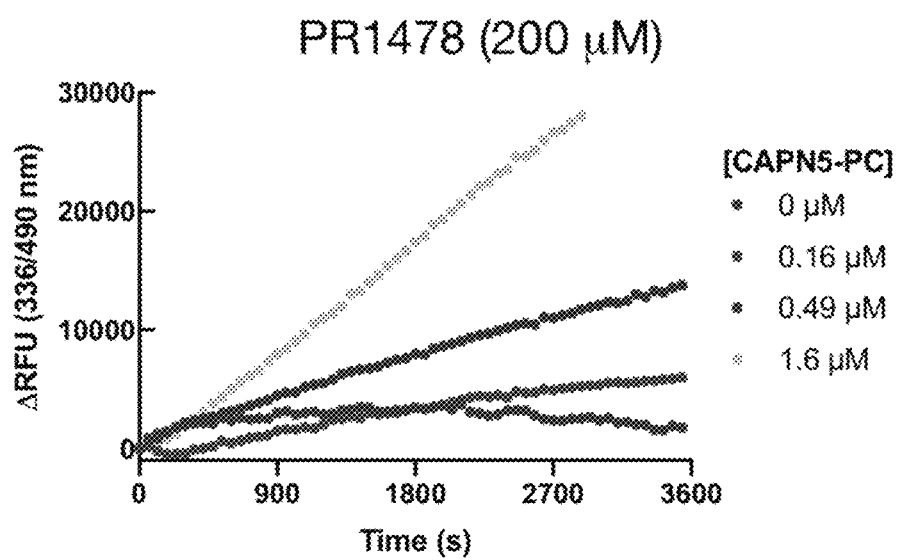

The purity of each peptide was determined by mass-spectrometry. Each peptide had an N-terminal Dabcyl, glutamate side chain-linked EDANS and C-terminal capping (FIG. 2A).

Example 2

CAPN5 Functional Assay Protocol
Reagents for the assay include:
Activity Buffer: 20 mM Tris (pH 7.5), 300 mM NaCl, 10 mM CaCl$_2$, 2 mM DTT.
Protein: Calpain-5 protease core domain (CAPN5-PC) (6.7 mg/ml stock).
Substrate(s): PR1476 and PR1478.
The assay was performed using a Greiner 96-well Black Small Volume plate according to the following protocol for measuring enzymatic activity of the calpain-5 protease:
Dilute CAPN5 in activity buffer to make a master mix at 3 concentrations.
Add 50 µL of substrate diluted with activity buffer (7 working concentrations at 2×).
Add 50 µL of CAPN5 to each well with multi-channel pipette.
Measure fluorescence activity (336/490 nm) on Tecan Spark at 37° C. for 2 hours with recordings taken every 2 minutes (with lid).
Convert RFU values to nM product using standard curve of EDANS concentrations (2 nM to 5 µM).
Calculate reaction velocity (slope) at each substrate concentration using linear regression.
Calculate Michaelis-Menten kinetic parameters in Graph-Pad Prism 8.

Figure 1B:
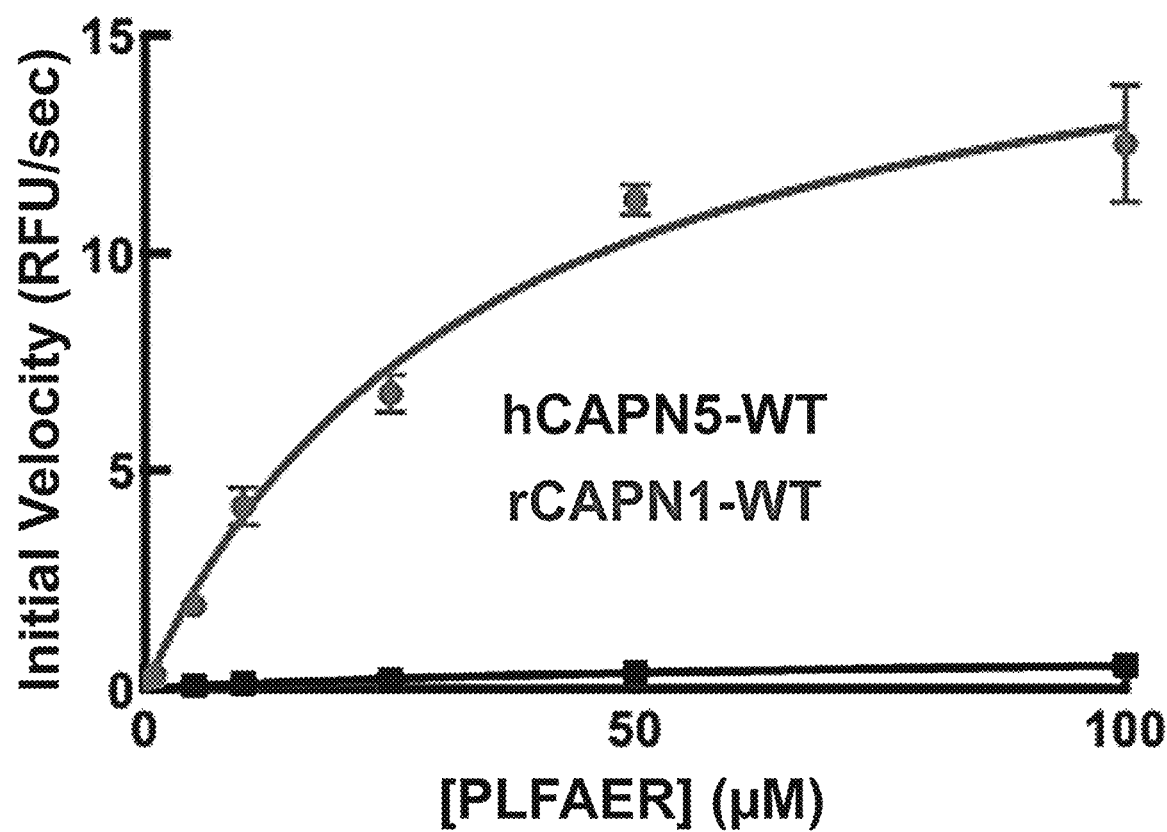

FIGS. 1A-1B show kinetic analysis of human CAPN5 and rat CAPN1 with the peptide substrates, RQNRGGGCINH (SEQ ID NO:1, FIG. 1A) and PLFAER (SEQ ID NO:2, FIG. 1B) using this protocol. The PR1478 peptide is more soluble and sensitive to CAPNS-PC activity than PR1476. A 10 mM PR1476 master stock was prepared in 100% DMSO. 3.69 mM PR1478 master stock was prepared in 50% DMSO/50% activity buffer. We initially tried to resuspend the peptide using 100% DMSO (50 µl to approximately 1 mg of peptide), but the peptide did not dissolve well. Thus, we added an equivalent amount of activity buffer and the peptide dissolved. We determined the master stock concentration using Nanodrop by reading tryptophan absorbency.

Figure 3A:
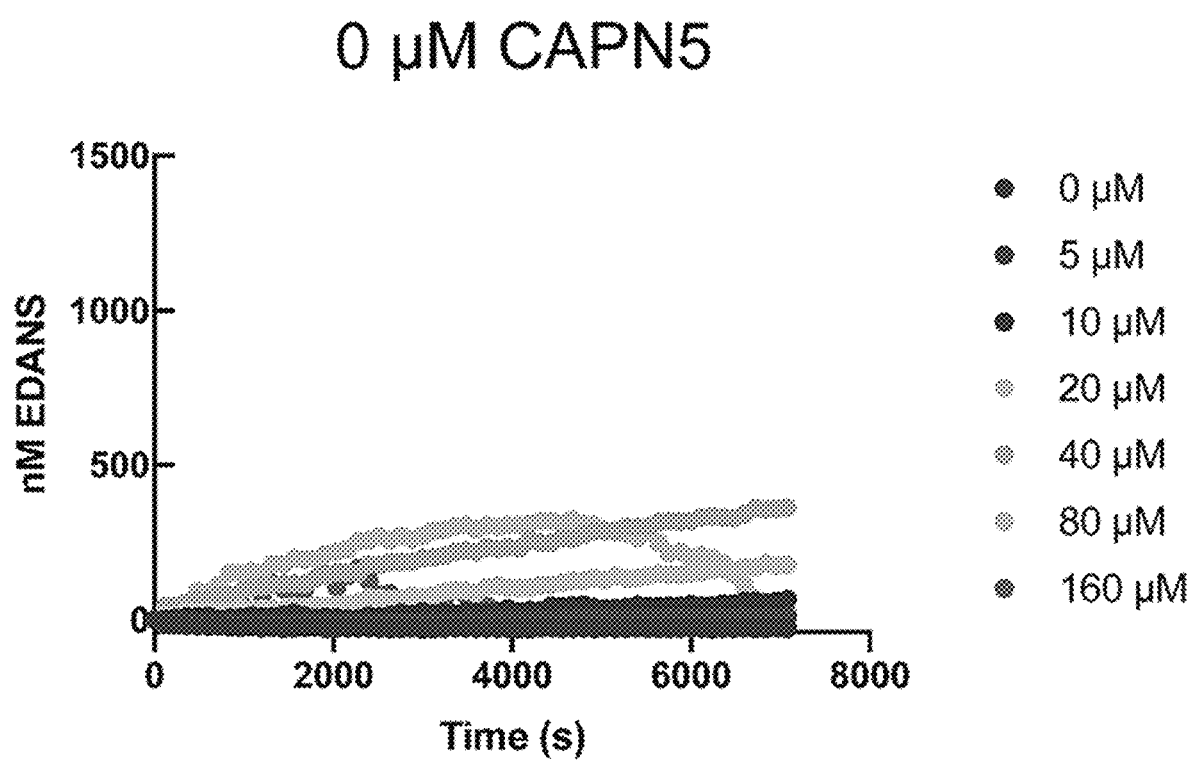
FIGS. 3A-3D show kinetics results using the PR1476 peptide as a substrate with CAPN5 at concentrations of 0 μm (FIG. 3A), 0.16 μm (FIG. 3B), 0.49 μm (FIG. 3C), and 1.6 μm (FIG. 3D). Assays were performed with the PR1476 peptide at concentrations ranging from 0 μM to 160 μM. PR1476 displays activity in a CAPN5 dose-dependent manner.
Figure 3B:
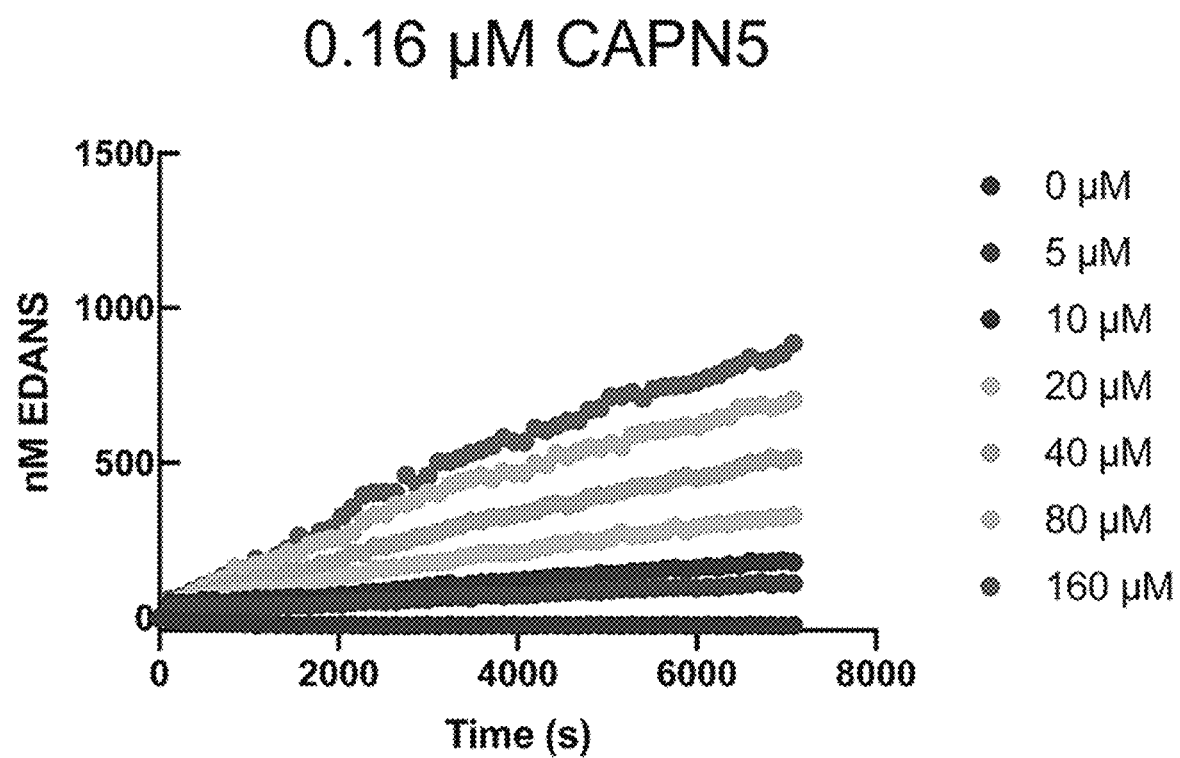
Figure 3C:
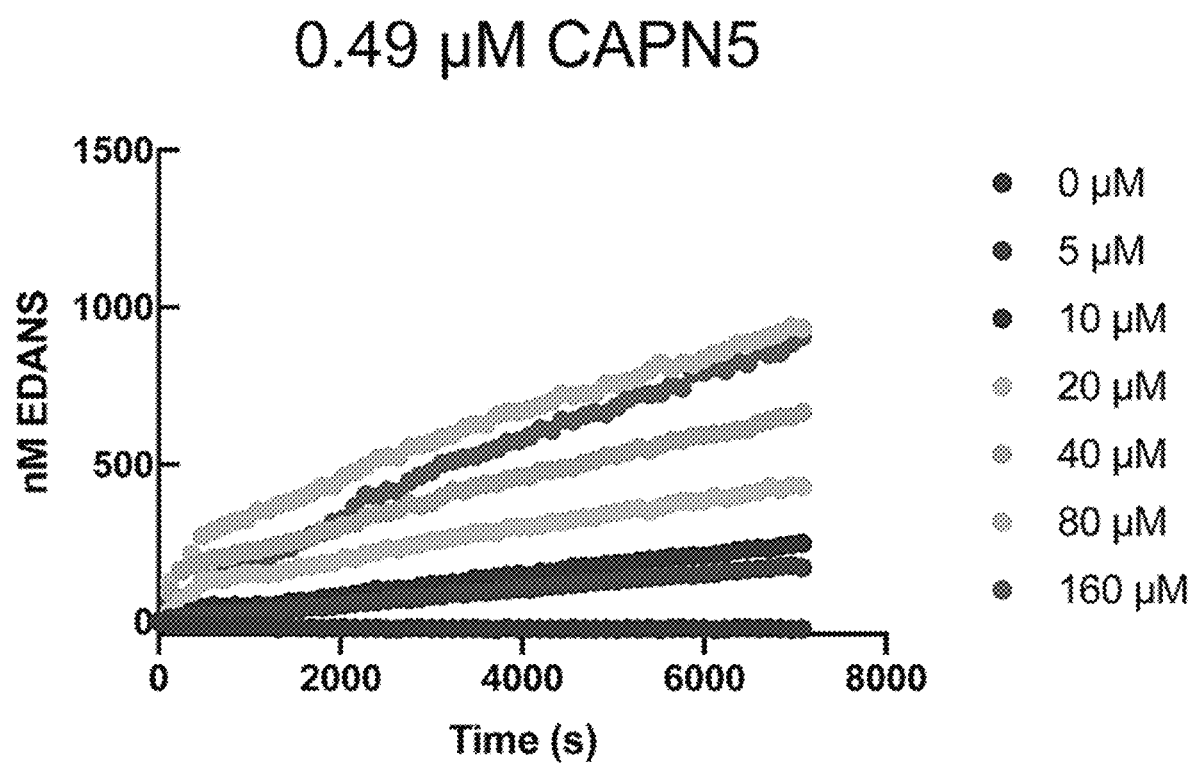
Figure 3D:
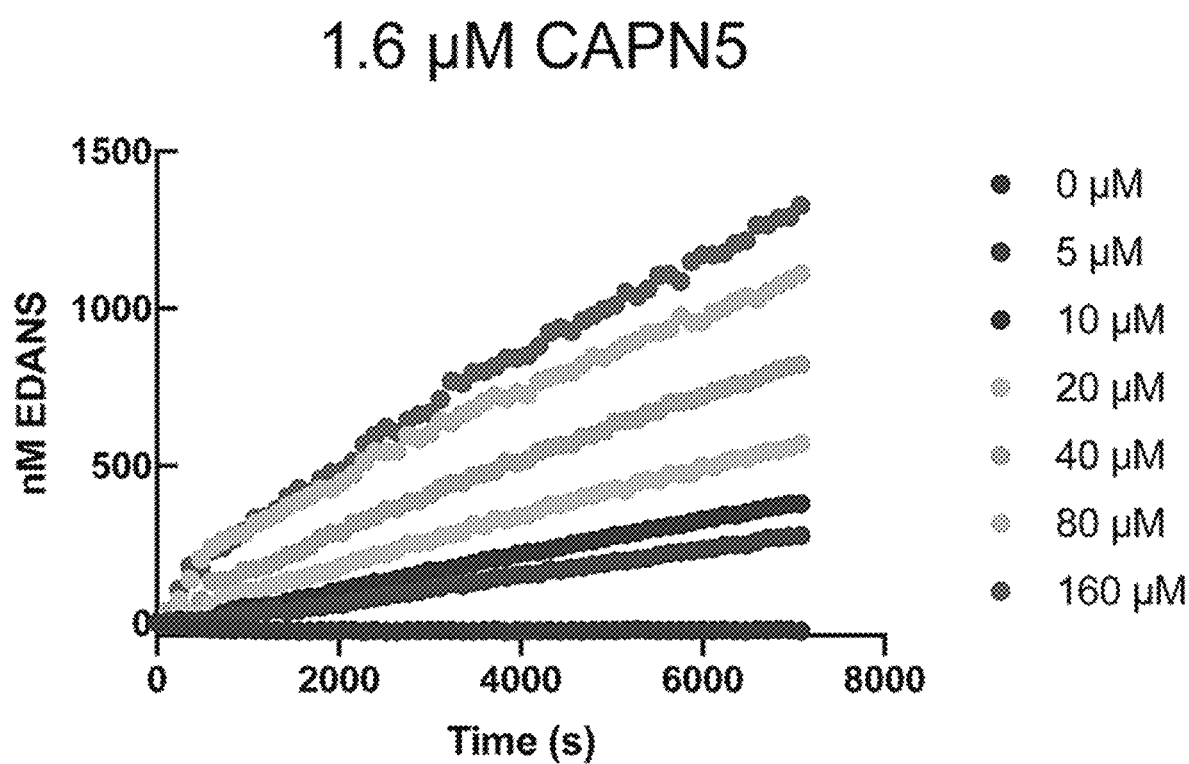
Figure 4A:
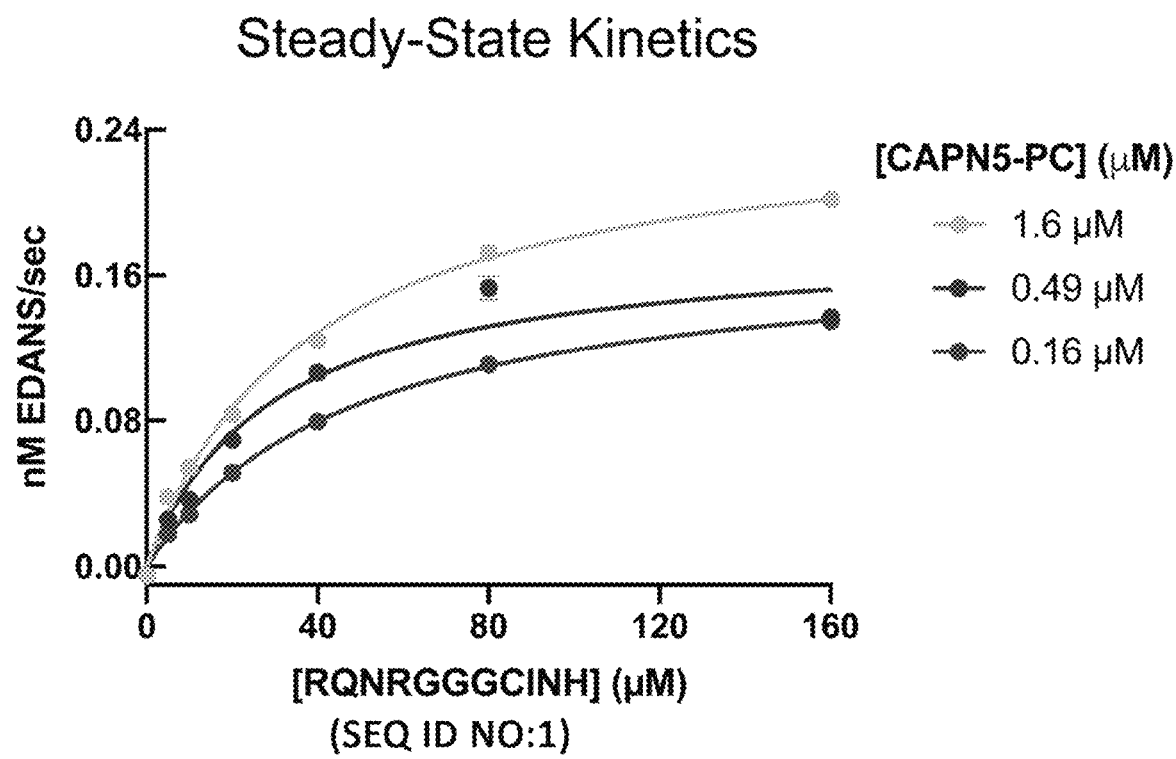
Figure 4B:
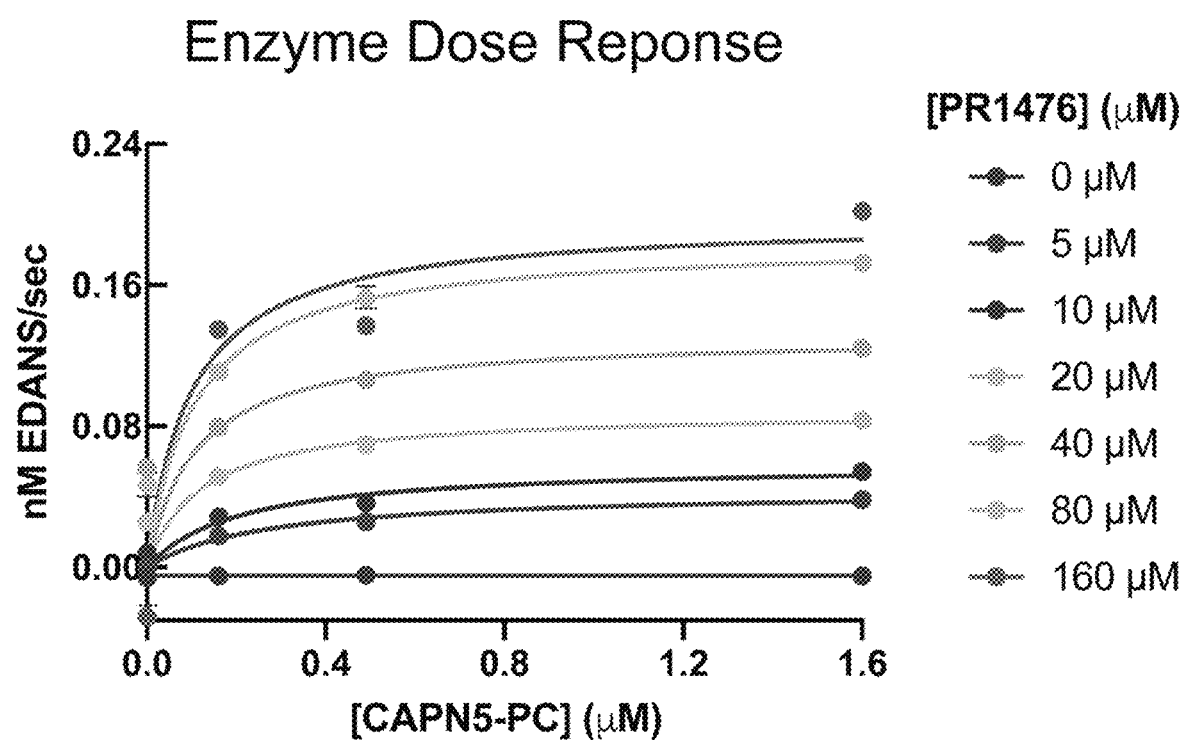

Kinetics were performed using the PR1476 peptide as a substrate with CAPN5 at concentrations of 0 m (FIG. 3A), 0.16 µm (FIG. 3B), 0.49 µm (FIG. 3C), and 1.6 µm (FIG. 3D). Assays were performed with the PR1476 peptide at concentrations ranging from 0 µM to 160 µM. PR1476 displays activity in a CAPN5 dose-dependent manner. FIG. 4A shows steady-state kinetics with CAPN5 at 1.6 µm, 0.49 µm, and 0.16 µm. FIG. 4B shows the enzyme dose response to the PR1476 peptide at concentrations ranging from 0 µM to 160 µM of the PR1476 peptide. FIG. 4C shows the kinetics parameters, including $k_{cat}$, $K_m$, and $V_{max}$ determined for CAPN5.

Figure 5A:
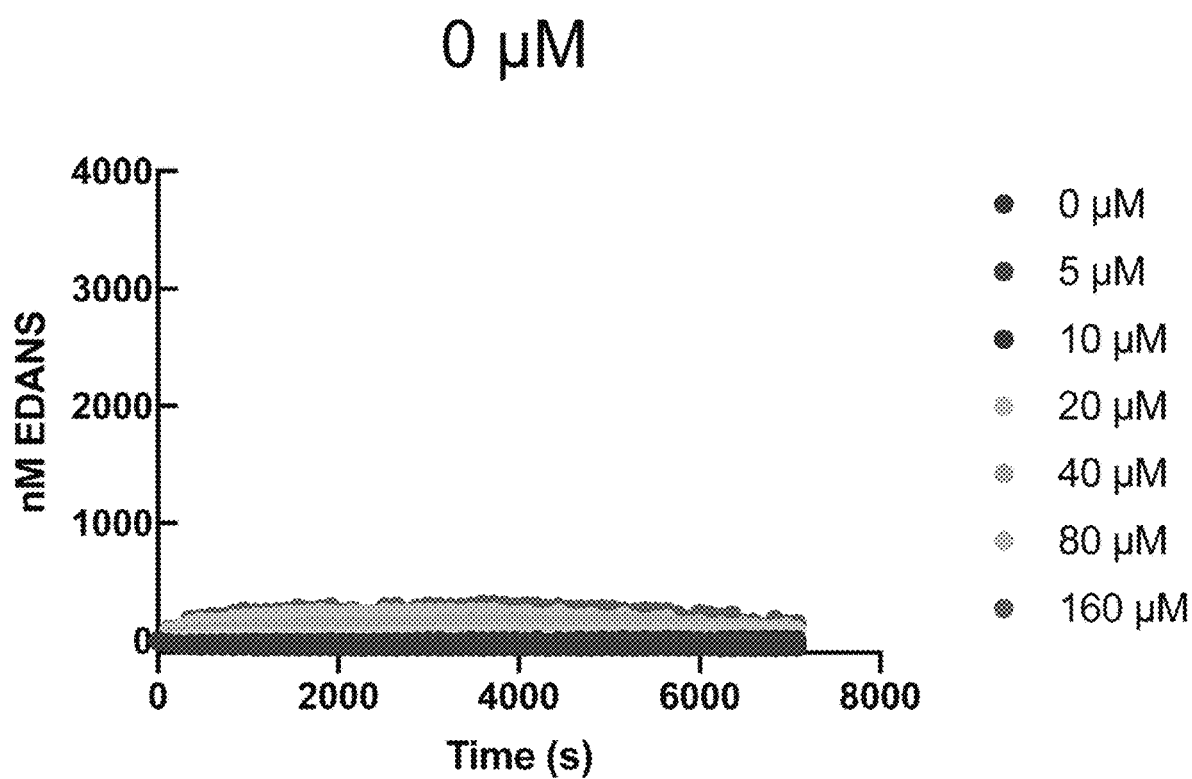
FIGS. 5A-5D show kinetics results using the PR1478 peptide as a substrate with CAPN5 at concentrations of 0 μm (FIG. 5A), 0.16 μm (FIG. 5B), 0.49 μm (FIG. 5C), and 1.6 μm (FIG. 5D). Assays were performed with the PR1478 peptide at concentrations ranging from 0 μM to 160 μM. PR1478 displays activity in a CAPN5 dose-dependent manner.
Figure 5B:
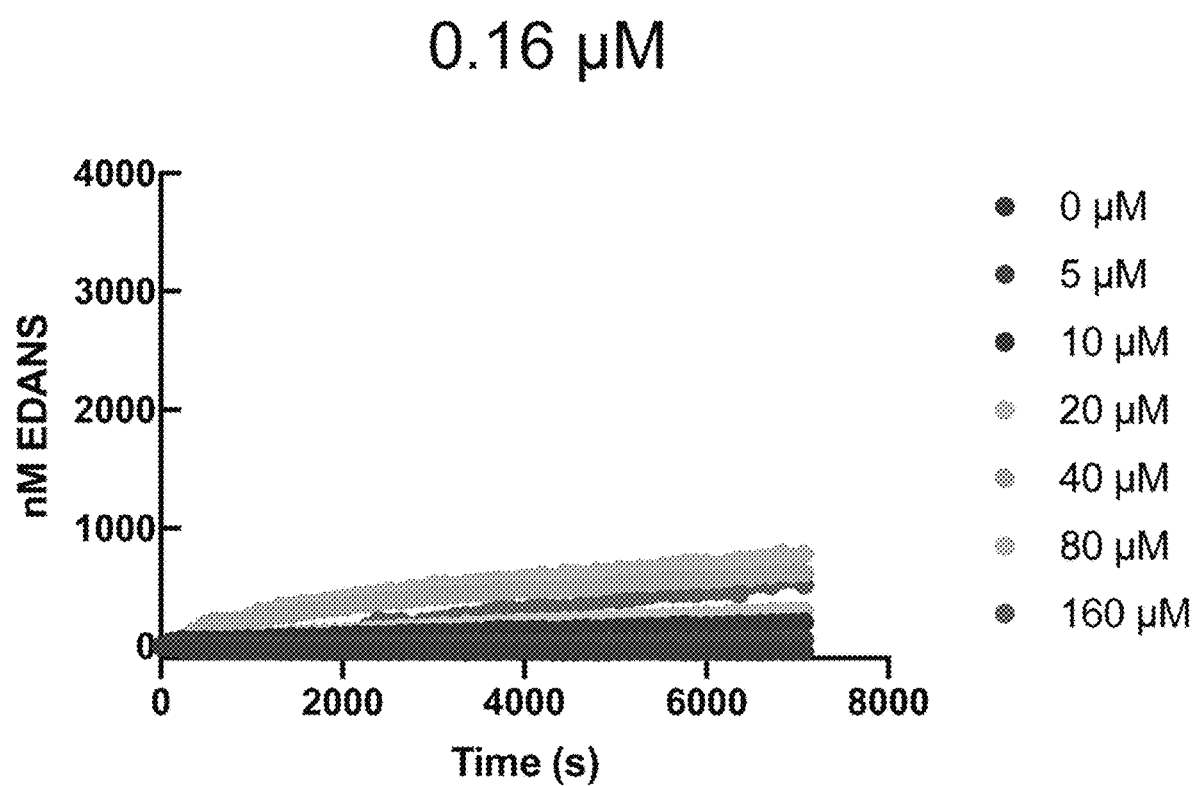
Figure 5C:
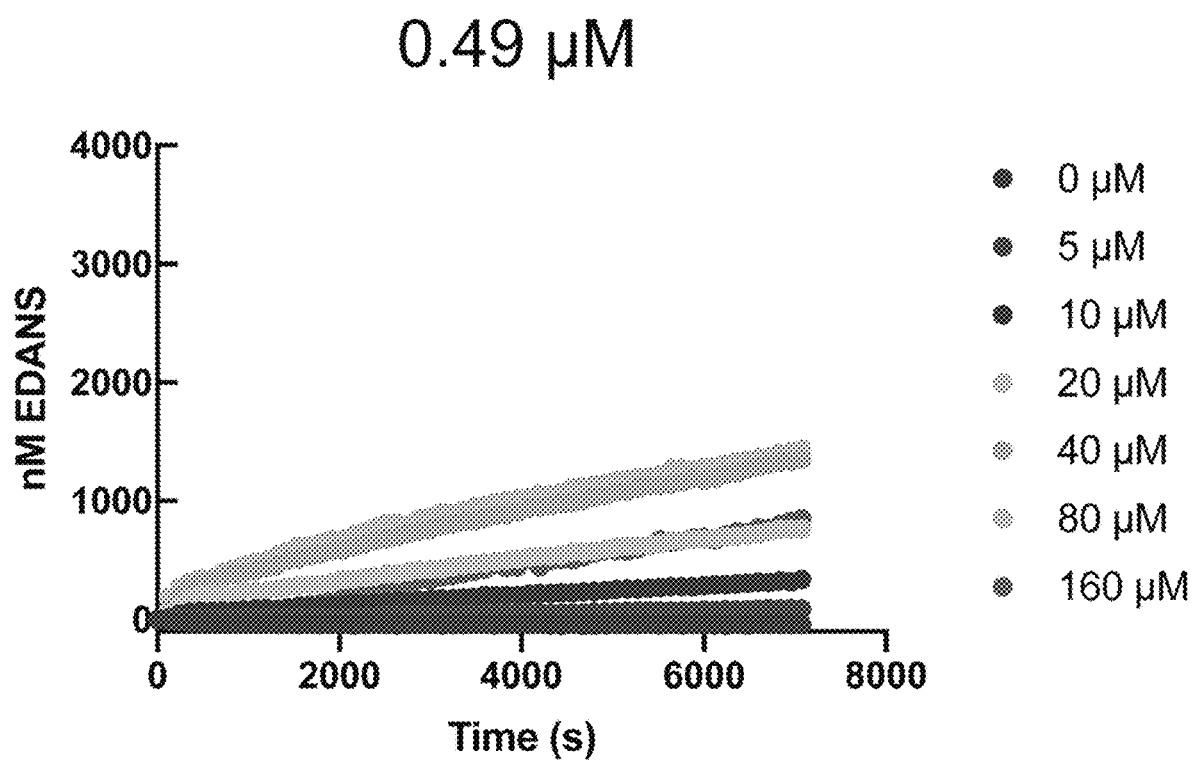
Figure 5D:
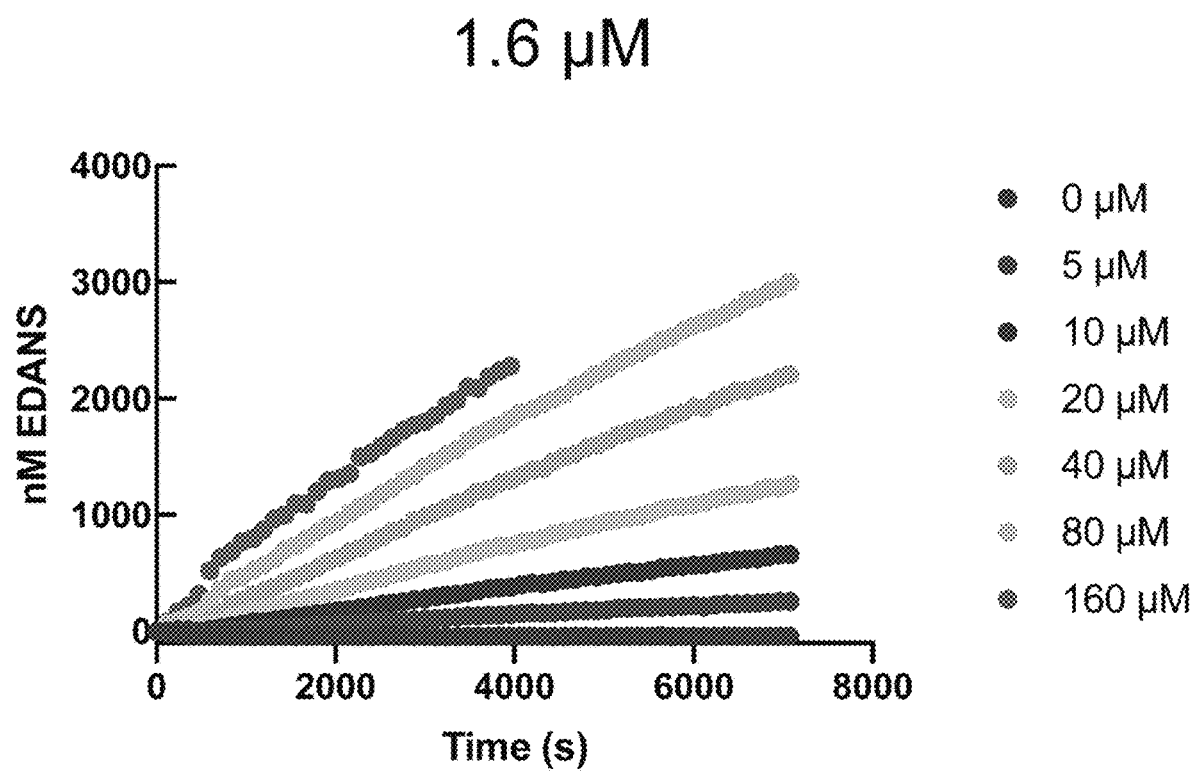
Figure 6A:
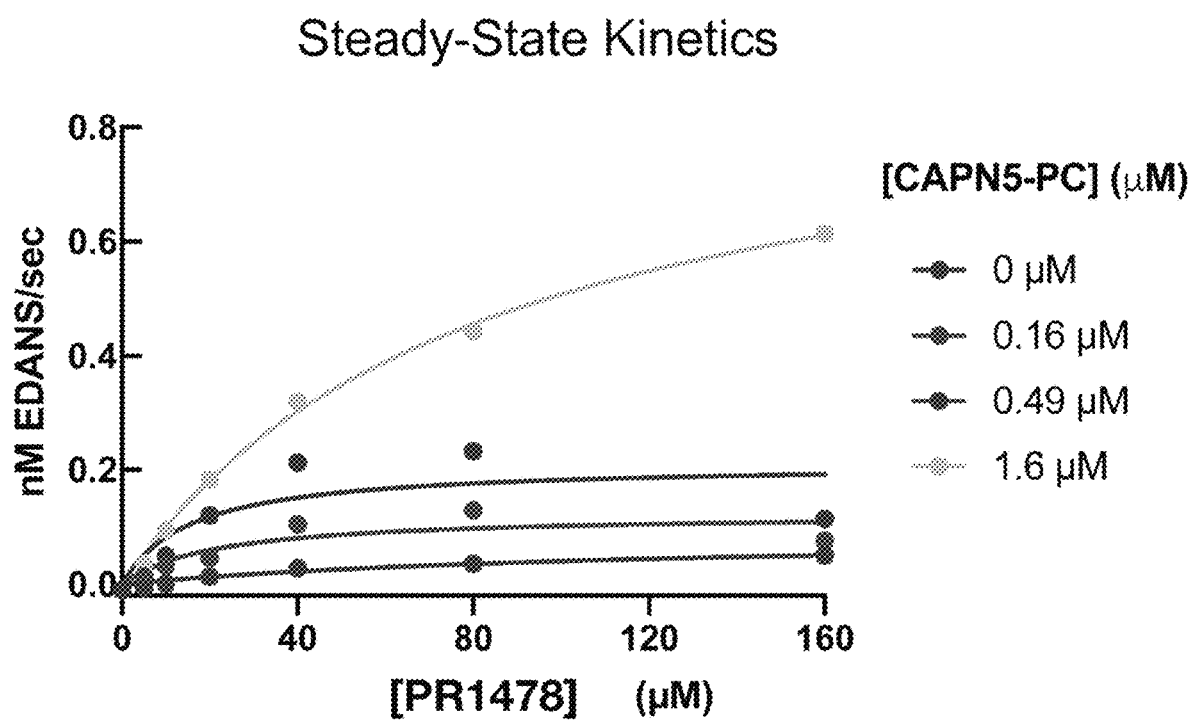
Figure 6B:
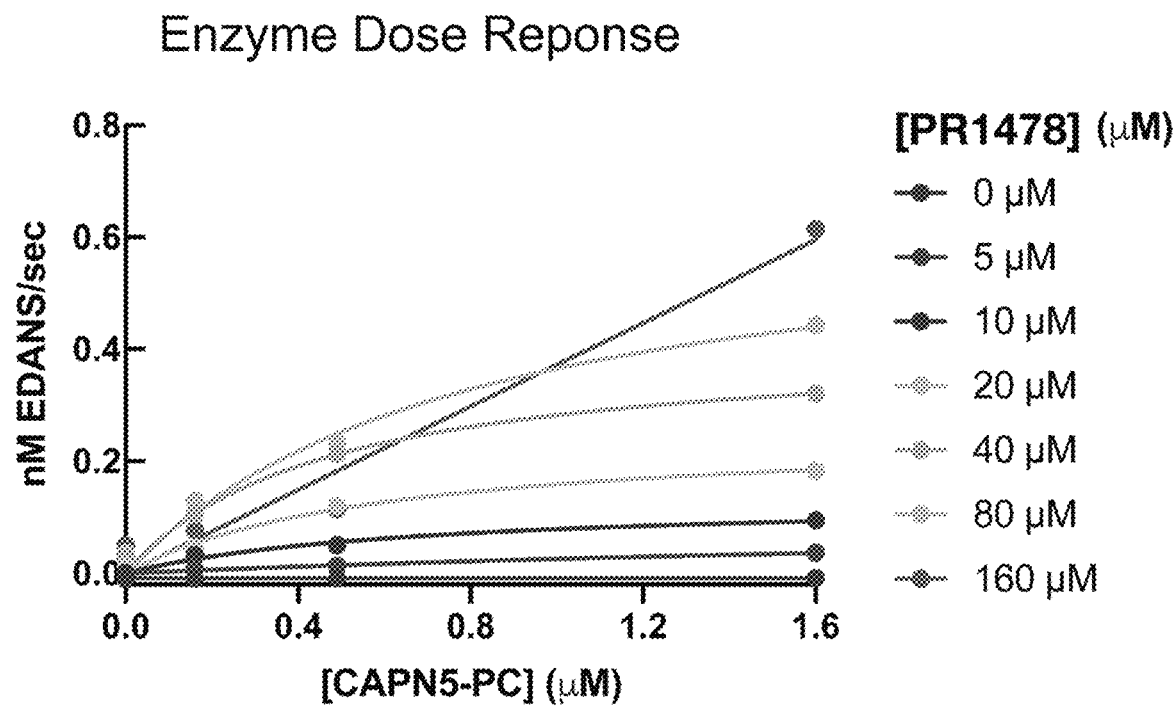

Kinetics were also performed using the PR1478 peptide as a substrate with CAPN5 at concentrations of 0 µm (FIG. 5A), 0.16 µm (FIG. 5B), 0.49 µm (FIG. 5C), and 1.6 µm (FIG. 5D). Assays were performed with the PR1478 peptide at concentrations ranging from 0 µM to 160 µM. PR1478 also displays activity in a CAPN5 dose-dependent manner. FIG. 6A shows steady-state kinetics with CAPN5 at 1.6 µm, 0.49 µm, and 0.16 µm. FIG. 6B shows the enzyme dose response to the PR1478 peptide at concentrations ranging from 0 µM to 160 µM of the PR1478 peptide. FIG. 6C shows the kinetics parameters, including $k_{cat}$, $K_m$, and $V_{max}$ determined for CAPN5.

Example 3

FRET-Based Inhibitor Assay

For testing inhibitors. varying concentrations of inhibitors were incubated with 50 nM of enzyme. Inhibitors were diluted in the CAPN5 inhibitor assay buffer (50 mM imidazole, 20 mM CaCl$_2$, 200 mM NaCl, 1 mM EDTA, 0.8% glycerol, 8 mM Lithium-acetate, 4% 1,3-butanediol, 0.19 mM Façade-EPC). A mix of 20 µM custom PDGFB FRET peptide (Biopeptek Pharmaceuticals LLC, Malvern, PA) and 20 µM of FRET peptide Calpain Substrate III (Millipore Sigma, Burlington, MA) was used for measuring activity. Upon addition of the peptide, fluorescence was immediately measured at 25° C. with a Tecan Spark microplate reader (Tecan; Mannedorf, Switzerland). Readings were recorded every minute for 15 minutes.

Example 4

Novel Compounds for Testing CAPN5 Activity and Inhibition

Vitreoretinal degeneration is a common but difficult-to-treat, blinding eye condition, the molecular basis of which is unknown. We linked CAPN5 mutations to an inherited form of vitreoretinal degeneration, implicating calpain-5 (CAPN5) in the molecular pathways that drive the disease. Autosomal neovascular inflammatory vitreoretinopathy (ADNIV; OMIM 193235) has 5 sequential stages, each of which mimics a common eye disease (e.g., uveitis, retinitis pigmentosa, proliferative diabetic retinopathy, and proliferative vitreoretinopathy) that together account for a significant fraction of visual morbidity and blindness (1). CAPN5 is a calcium-activated, cysteine protease expressed in the central nervous system and photoreceptors. Sixteen calpain family members comprise a set of proteases that cleave subdomains from target proteins to irreversibly change their function (2). The calpain family is relatively well-studied; and calpain hyperactivity is implicated in numerous ocular pathologies, e.g., retinal degeneration, neovascularization, and cataracts. Yet, because CAPN5 is divergent (and so termed a non-classical calpain), less is known regarding its structure and mechanism of action. In the case of the disease-causing CAPN5 mutations that we study, they likely are activated at a lower calcium concentration, rendering the mutant CAPN5s hyperactive. Among other better understood members of the calpain family, such hyperactivity is likewise associated with disease states, including neuronal injury and retinal degeneration.

1. High Throughput FRET-Based CAPN5 Inhibition Assay

We have optimized the CAPN5 assay and developed a high throughput CAPN5 inhibition assay which utilizes 384-well plates and uses less than 50 nM protease for each experimental condition. Calpain proteolytic activity was measured by hydrolysis of DABCYL-TPLKSPPPSPR (SEQ ID NO:3)-EDANS (Calpain Substrate III; Calbiochem). Briefly, 50 nM of purified CAPN5-G267S protease core domain was added to a reaction buffer containing 50 mM imidazole (pH 7.0), 200 mM NaCl, 20 mM CaCl$_2$, 1 mM EDTA, 8 mM Li-acetate, 0.19 mM Facade®-EPC, 1 mM TCEP, 0.8% (v/v) glycerol, 4% (v/v) 1,3-butanediol. 8 μL of protease was added to each well of the 384-well plates. Varying concentrations of substrate (final concentration of 0.1 μM to 100 μM; 4 μL in each well) were added and the reaction was incubated at 37° C. for 30 minutes. After incubation, 8 μL of Calpain Substrate III was added to each well (final concentration of 40 μM; total reaction volume was 20 μL) and EDANS signal was measured on a fluorimetric plate reader (Tecan Spark, Mannedorf Switzerland). All experiments were performed in triplicate. Reaction rates were fit to the Hill equation to determine the $IC_{50}$ values in GraphPad Prism 8. This assay condition is compatible with CAPN1 and CAPN5 wild-type. We have chosen CAPN5-G267S for initial inhibitor screening, since it has higher activity than CAPN5 wild-type and the mutation is located at the G2-loop which is away from the active site that is likely to have identical specificity to CAPN5 wild-type specificity.

Figure 7A:
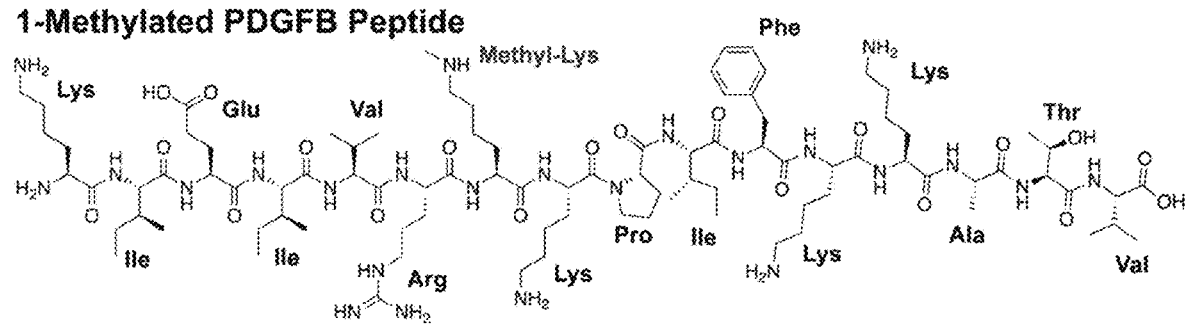
FIGS. 7A-7F show that 1-methylated PDGFB peptide can inhibit CAPN5 in nanomolar range.
Figure 7B:
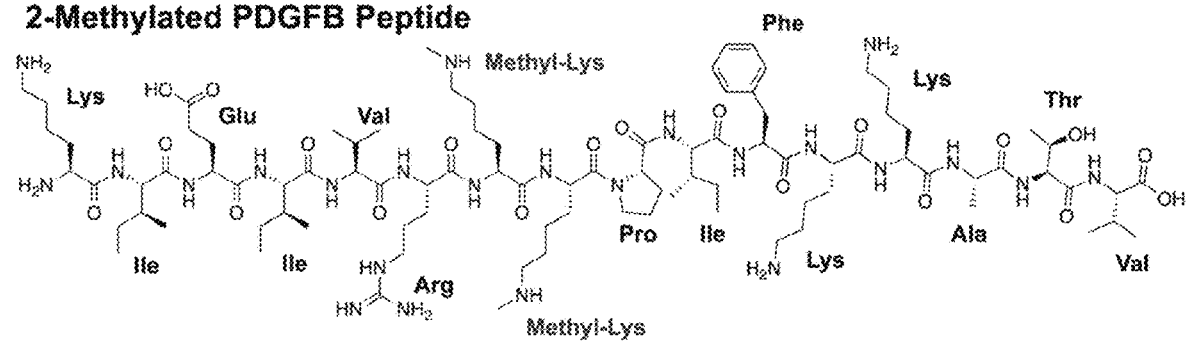
Figure 7C:
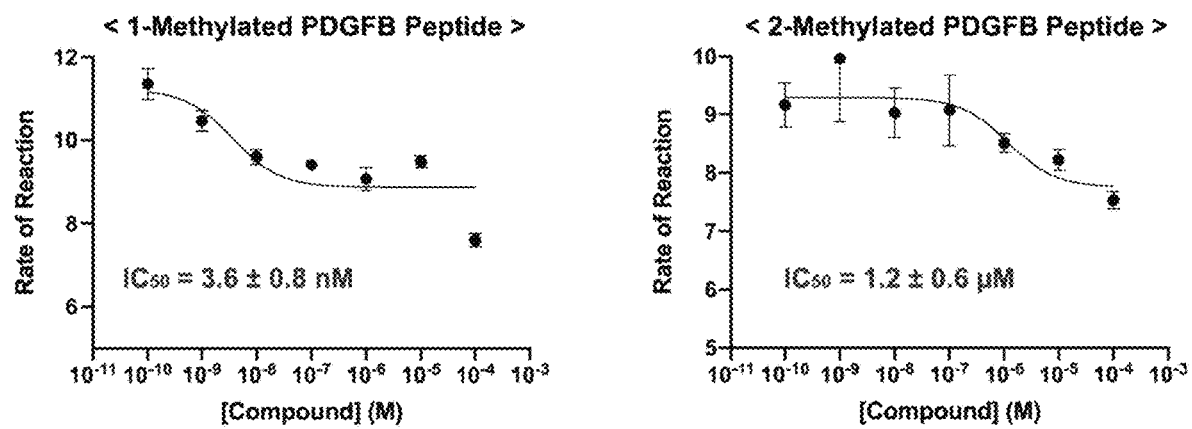
Figure 7D:
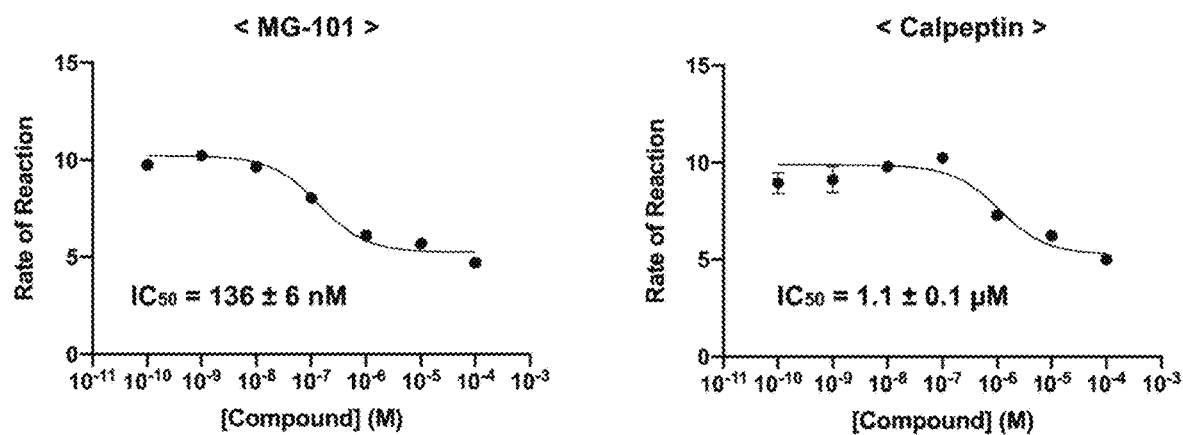
Figure 7E:
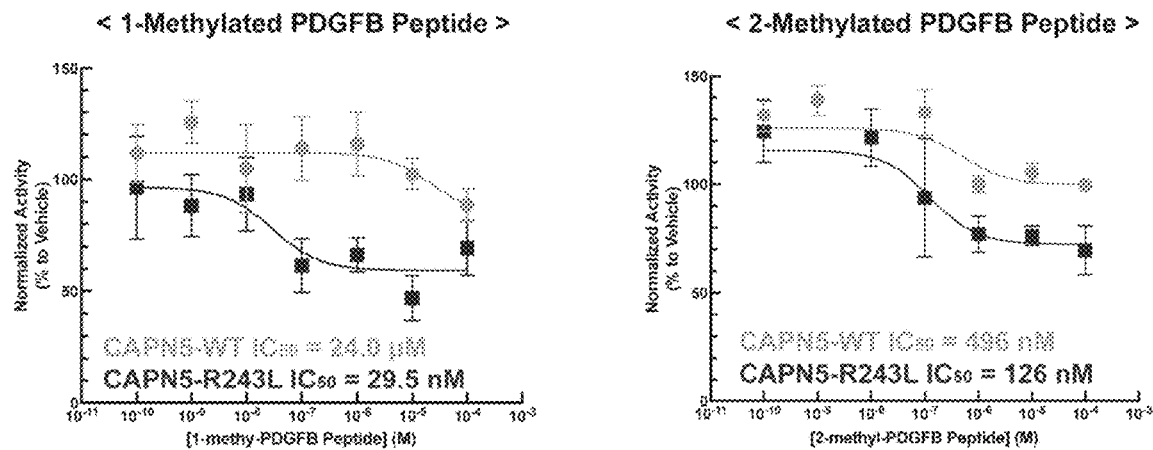
Figure 7F:
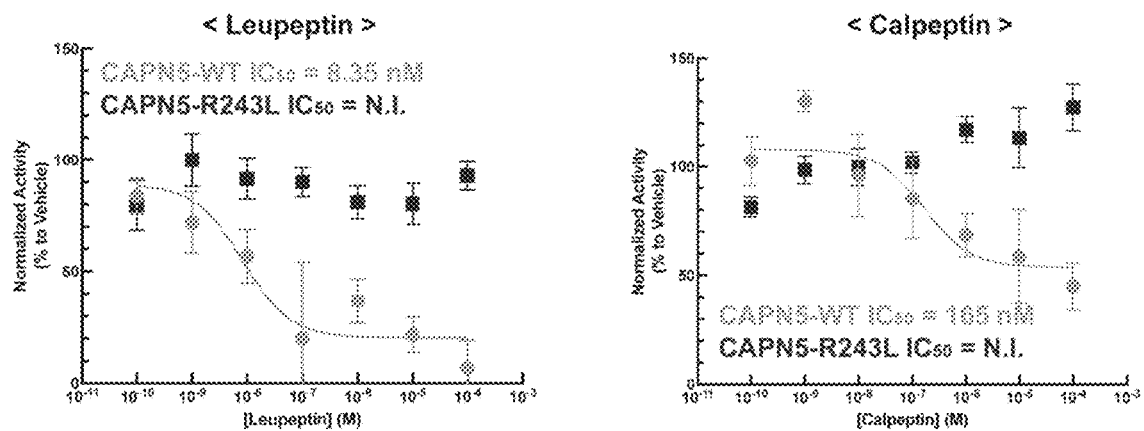

We have identified the PDGFB protein as a substrate. We discovered a likely proteolytic site for CAPN5 on PDGFB, and sought to use this information to inhibit proteolysis assuming the alteration of a robust endogenous substrate of CAPN5 would create an opportunity for more specific inhibition of CAPN5. We generated two artificial peptides by methylating only P1-Lysine (1-Methylated; FIG. 7A) or both P1-Lysine and P1'-Lysine (2-Methylated; FIG. 7B) expecting the methylation would make the PDGFB peptide motif resistant to CAPN5 proteolysis. We tested their inhibitory potential against CAPN5-G267S using our high throughput FRET-based CAPN5 inhibition assay. As expected, both methylated PDGFB peptides inhibited CAPN5 activity (FIG. 7C) and the 1-methylated PDGFB peptide showed a single-digit nanomolar IC50. The inhibitory capacity was even better than the commercially available peptidomimetic small molecules (MG-101 and Calpeptin) that have been used as generic Calpain inhibitors (FIG. 7D). We further tested them with the CAPN5 wild-type and CAPN5-R243L mutant proteases. Both methylated PDGFB peptides inhibited CAPN5-R243L activity at the nanomolar IC50 (FIG. 7E). For the generic calpain inhibitors (Calpeptin and Leupeptin), we found that although they inhibited activity CAPN5 WT with the nanomolar IC50, they did not show any inhibition of the CAPN5-R243L (FIG. 7F). These results suggest that the CAPN5-R243L mutant is resistant to generic inhibitors, but our methylated PDGFB peptides overcome this resistance.

Figure 8:
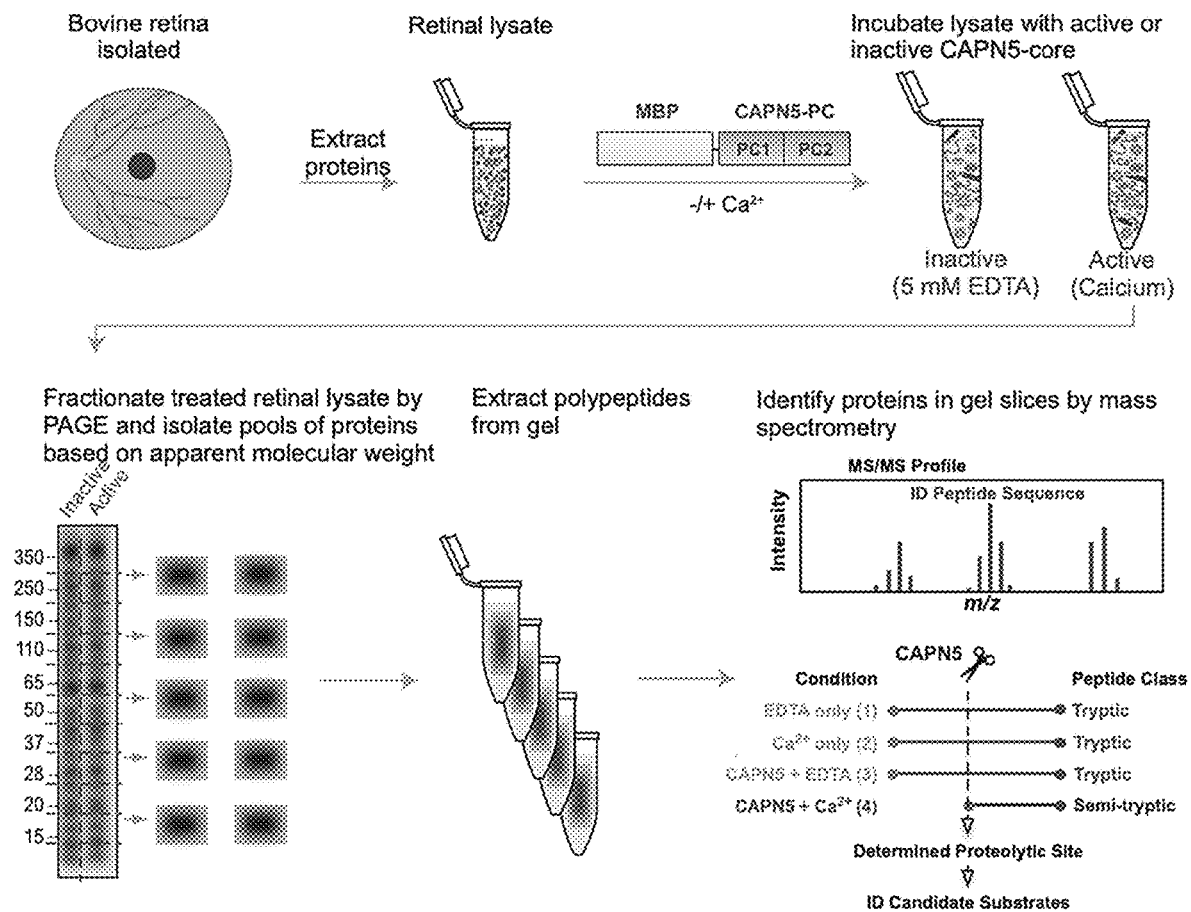
FIG. 8 shows proteomics workflow: Proteins that were extracted from bovine retinas. Retinal lysates were incubated with MBP-CAPN5-PC in the presence or absence of 5 mM EDTA (inactive) or 10 mM $CaCl_2$ (active). Reactions were fractionated by 1D SDS-PAGE to isolate pools of proteins based on apparent molecular weight. Proteins were extracted from gel slices and underwent analysis by mass spectrometry. The MS data were searched for semi-tryptic peptides that had a corresponding tryptic peptide (of the same sequence) in all three control lanes. We identified a total of 276 semi-tryptic peptides belonging to 216 proteins.

2. Understanding the Sequential Determinants of CAPN5 Specificity:

To understand the origins of the complex ADNIV phenotype, active recombinant CAPN5 protease core (CAPN5-PC) was used to screen a retinal protein lysate for proteolytic targets. Briefly, bovine retinal lysates were incubated under four conditions: (1) 5 mM EDTA ($Ca^{2+}$-free control), (2) 10 mM $CaCl_2$ (negative control to observe 'background proteolysis' in the retina), (3) CAPN5-PC+5 mM EDTA (inactive negative control), and (4) CAPN5-PC+10 mM $CaCl_2$ (experimental 'active' condition; FIG. 8). Reactions were fractionated using SDS-PAGE, trypsinized, and underwent analysis by multi-dimensional liquid chromatography-tandem mass spectrometry (LC-MS/MS). There were 7,185 non redundant proteins (125,718 unique spectra) identified in the bovine retinal lysate. The MS data were searched for semi-tryptic peptides that had a corresponding tryptic peptide (of the same sequence) in all three control lanes. We identified a total of 276 semi-tryptic peptides belonging to 216 proteins (Table 1).

Figure 9A:
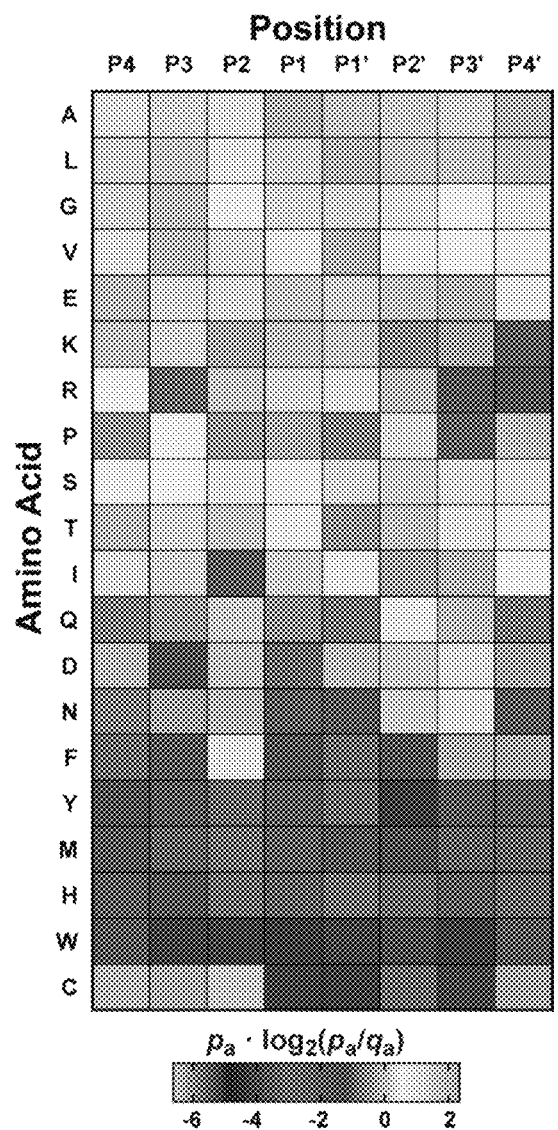
FIGS. 9A-9D show sequential determinants of CAPN5 specificity.

Sequences from the CAPN5 putative substrates were analyzed to identify a consensus sequence across 276 cleavage events. Sequences were aligned (P4-P4' positions in the cleavage site) and analyzed using Seq2Logo (6) to generate a position-specific scoring matrix (PSSM) of putative CAPN5 cleavage sites (FIG. 9A). The PSSM was interpreted to identify residues that were enriched (preferred) or depleted (unfavored) by CAPN5. The resulting heatmap revealed that basic residues (lysine and arginine) were highly represented at P1 and P2. This observation is consistent with the presence of R373 in the CAPN5 autoproteolysis site. Additionally, proline appeared to be enriched at the P2' and P4' positions, suggesting that CAPN5 may not prefer alpha-helical substrates, but rather disordered loops. Additionally, no tyrosine was depleted at the P1' and P2' positions, suggesting that this may be a good criterion for determining CAPN5 specificity. Tryptophan and cysteine were not present in any of the P4-P4' positions of these putative substrate cleavage sites. This was an interesting observation given that these amino acids are critical to regulating the activity of CAPN5 overall (FIG. 9A).

Figure 9B:
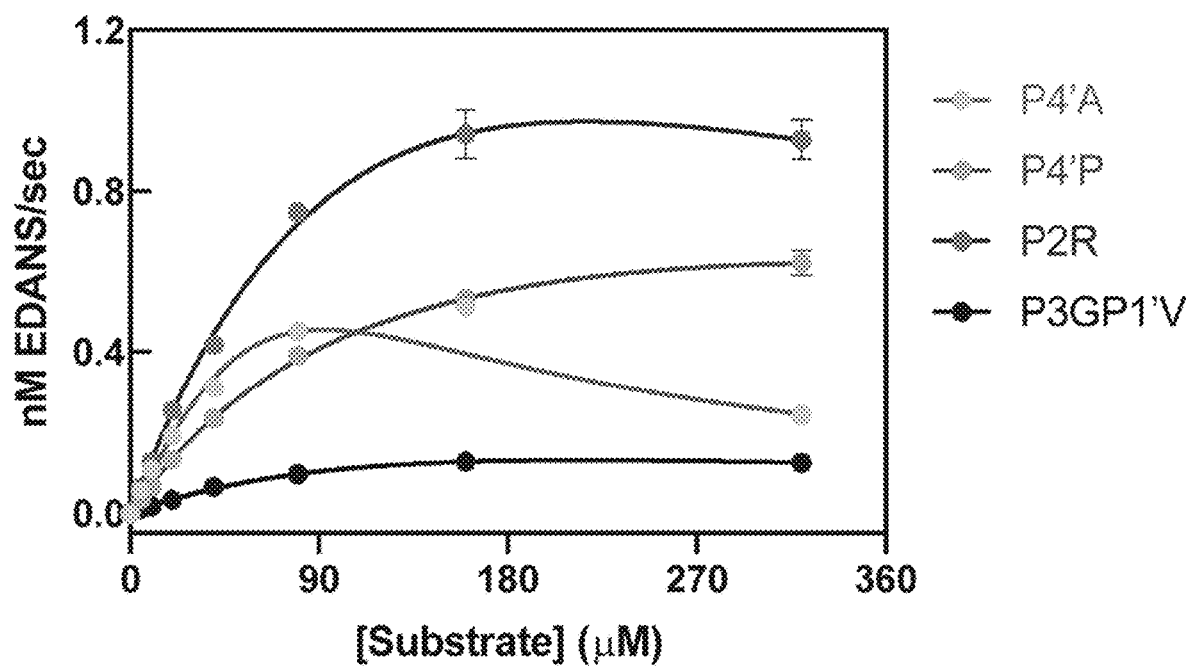
Figure 9C:
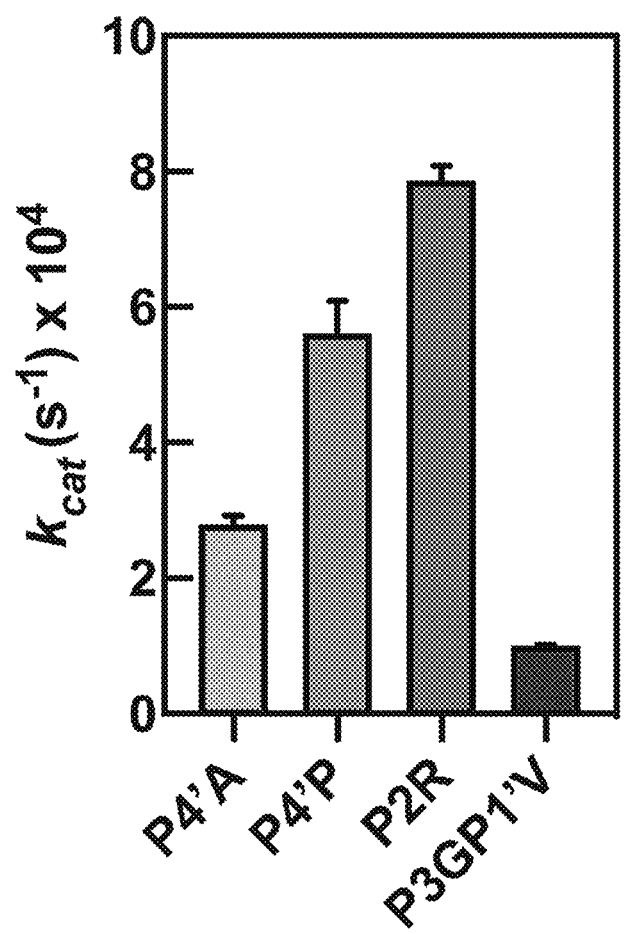
Figure 9D:
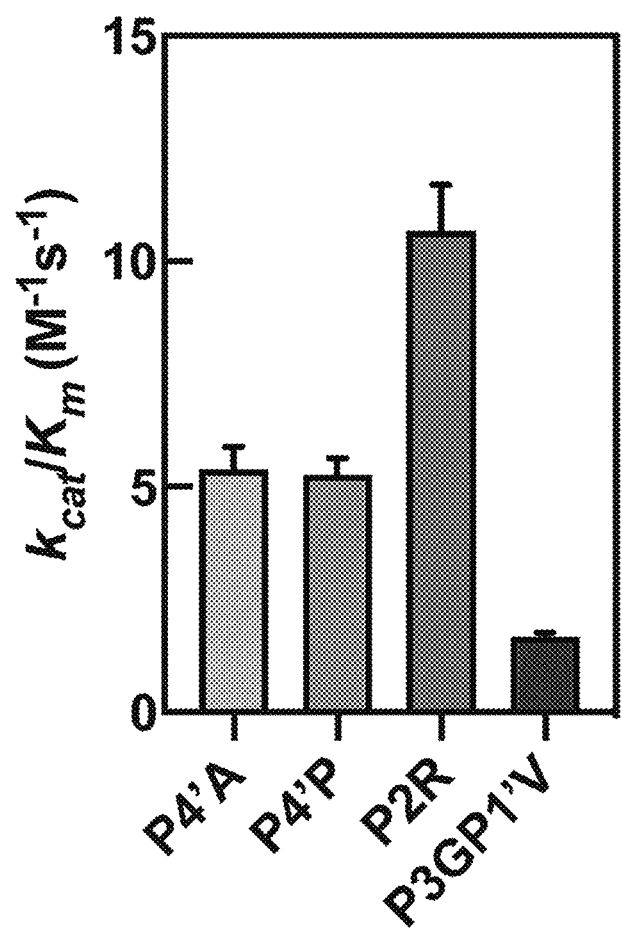

Consensus FRET peptides were synthesized based on the highest scoring amino acids at each position of the PSSM (Peptides P4'A, P4'P, P2R, and P3GP1' V) and were tested in our in vitro CAPN5 activity assay (FIG. 9B). These substrates were hydrolyzed by 1.6 μM CAPN5-PC p.G267S in the presence of 10 mM $Ca^{2+}$. The observed substrate turnover ($k_{cat}$) of these consensus peptides indicated that peptide P2R is preferred by CAPN5-PC and suggests a preference for arginine in the P2 subsite (FIG. 9C). The catalytic efficiency ($k_{cat}/K_m$) of this peptide was higher than the observed $k_{cat}/K_m$ for our previously determined PR1476 peptide (11 vs. 7 $M^{-1}s^{-1}$; FIG. 9D).

TABLE 1

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| N.HITEQIGM[+15.99492]FSFTGLNPK.Q (SEQ ID NO: 5) | P33097 | AATC | 353 |
| N.VAYLAHAIHQVTK.- (SEQ ID NO: 6) | P12344 | AATM | 418 |
| K.QQEVAVAGASSP.T (SEQ ID NO: 7) | F1MRE5 | ACBD3 | 307 |
| L.TEAPLNPK.A (SEQ ID NO: 8) | P63258 | ACTG | 106 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| D.LYANTVLSGGTTM[+15.99492]YPGIADR.M (SEQ ID NO: 9) | P63258 | ACTG | 293 |
| K.IIAPPERKYSVWIGGSIL.A (SEQ ID NO: 10) | P63258 | ACTG | 329 |
| K.QEYDESGPSIVH.R (SEQ ID NO: 11) | P63258 | ACTG | 360 |
| V.SEYMSK.K (SEQ ID NO: 12) | Q3ZC42 | ADHX | 333 |
| E.KDALQEIYNQKGVFPGQQFK.P (SEQ ID NO: 13) | G5E5P6 | AGPAT3 | 281 |
| E.AGTAPGETR.E (SEQ ID NO: 14) | A0A3Q1LV73 | AHNAK2 | 305 |
| K.KDESEGAGESDGAGDHPEP.S (SEQ ID NO: 15) | A0A3Q1MSB2 | AKAP12 | 189 |
| K.AEAEE.T (SEQ ID NO: 16) | A0A3Q1MSB2 | AKAP12 | 406 |
| R.FIELEQEKN[+0.98402]AEL.M (SEQ ID NO: 17) | F1MXF5 | AKAP9 | 1901 |
| K.IGEHTPSSLAIM[+15.99492]EN[+0.98402]AN.V (SEQ ID NO: 18) | A6QLL8 | ALDOA | 154 |
| K.IGEHTPSSLAIMENANVL.A (SEQ ID NO: 19) | A6QLL8 | ALDOA | 154 |
| K.YSPEEIAMATVTAL.R (SEQ ID NO: 20) | A0A3S5ZPB0 | ALDOC | 390 |
| R.EAAAAAAA.A (SEQ ID NO: 21) | A0A452DJ48 | ALKBH5 | 29 |
| K.YVLLNDQPDDNDGSPSENRGAESEA.- (SEQ ID NO: 22) | Q1RMW4 | APPL2 | 638 |
| R.VKATLQALQTLPEENYLVL.R (SEQ ID NO: 23) | F6RWK1 | ARHGAP1 | 350 |
| D.LEPDPGSPGSAR.T (SEQ ID NO: 24) | Q3SYV9 | ARHL2 | 59 |
| L.FTLKEEKPK.M (SEQ ID NO: 25) | A0JN37 | ARL6IP1 | 127 |
| K.LPGLLGNFPGPFEEE.M (SEQ ID NO: 26) | Q17QB3 | ASAHI | 101 |
| K.VTAPQPAATN[+0.98402]G.D (SEQ ID NO: 27) | P57709 | AT2C1 | 232 |
| L.ASILLQDHIR.E (SEQ ID NO: 28) | A5PJD6 | ATL3 | 47 |
| S.VDWVGDHNEPLTGFSWR.G (SEQ ID NO: 29) | Q58D72 | ATLA1 | 97 |
| L.VRDPSRLPSEGPQPAHVVVGDVR.Q (SEQ ID NO: 30) | P52556 | BLVRB | 34 |
| T.ITGHAETK.Q (SEQ ID NO: 31) | Q56JY8 | BTF3 | 90 |
| T.STPNFVVEVTK.D (SEQ ID NO: 32) | Q3T0B6 | C1QBP | 162 |
| V.ILHPTPNSPK.Q (SEQ ID NO: 33) | Q1KZG5 | CADPS | 482 |
| N.DLVEALKR.K (SEQ ID NO: 34) | P79136-2 | CAPZB | 261 |
| M.IEDAEREGTIKPGDTIIEPTSGNTGIGLALAAAVK.G (SEQ ID NO: 35) | F1MEW4 | CBS | 129 |
| K.Q[-17.02655]GILGAQPQLIFQPH.R (SEQ ID NO: 36) | E1B9H3 | CCAR2 | 139 |
| F.SNISAAK.A (SEQ ID NO: 37) | F1N0E5 | CCT4 | 39 |
| D.PATATSVDLR.D (SEQ ID NO: 38) | F1N0E5 | CCT4 | 200 |
| K.IHPVEAFEPGAEH.V (SEQ ID NO: 39) | F1MW33 | CHL1 | 1048 |
| A.LGFPLERPK.S (SEQ ID NO: 40) | Q29RK1 | CISY | 442 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| L.EKPVDLEEEK.K (SEQ ID NO: 41) | Q3SYT6 | CLGN | 527 |
| K.VGEQAQVVIIDM[+15.99492]ND.P (SEQ ID NO: 42) | P49951 | CLH1 | 44 |
| R.KVSQPIEGHAA.S (SEQ ID NO: 43) | P49951 | CLH1 | 189 |
| R.KFNALFAQGN.Y (SEQ ID NO: 44) | P49951 | CLH1 | 367 |
| A.LFAQGNYSEAAK.V (SEQ ID NO: 45) | P49951 | CLH1 | 371 |
| N.NRPSEGPLQTR.L (SEQ ID NO: 46) | P49951 | CLH1 | 573 |
| A.STLVHLGEYQAAVDGAR.K (SEQ ID NO: 47) | P49951 | CLH1 | 1229 |
| K.LDASESLRKEEEQATETQPIVYGQPQLM[+15.99492]LT.A (SEQ ID NO: 48) | P49951 | CLH1 | 1613 |
| P.QQVFSAEFEVK.E (SEQ ID NO: 49) | Q2UVX4 | CO3 | 214 |
| A.NC[+71.03711]YEEVKDR.C (SEQ ID NO: 50) | Q5E9F7 | COF1 | 138 |
| L.GDVIEVHGK.H (SEQ ID NO: 51) | P02510 | CRYAB | 95 |
| E.AEVTN[+0.98402]IKK.T (SEQ ID NO: 52) | Q2KI56 | CSN7B | 211 |
| Q.LQTELVEILK.N (SEQ ID NO: 53) | F1N7B5 | CUL5 | 709 |
| R.VDLPSGTTPGTQ.V (SEQ ID NO: 54) | E1B969 | DCHS1 | 1005 |
| R.ELDAEEAEASSTEGEEAGVGN[+0.98402]GTSAPVRLPF.S (SEQ ID NO: 55) | G5E535 | DCPS | 14 |
| L.TAEHLPLLR.N (SEQ ID NO: 56) | G5E535 | DCPS | 234 |
| M.[+42.01056]ELGELLYNKSEYIETASGNK.V (SEQ ID NO: 57) | Q58D67 | DCTN5 | 2 |
| V.RALPESLAQQALR.R (SEQ ID NO: 58) | P56965 | DDAH1 | 19 |
| S.SVVLQDEGQN[+0.98402]EDDIEKEEER.E (SEQ ID NO: 59) | F1N1R4 | DIS3 | 307 |
| A.TSDDIKK.S (SEQ ID NO: 60) | Q29455 | DNJC5 | 27 |
| R.VLLEAGEGLV.T (SEQ ID NO: 61) | F2Z4F5 | DPP3 | 597 |
| S.VIWDK.A (SEQ ID NO: 62) | A0A3Q1MF15 | DPYSL2 | 469 |
| R.NLHQSGFSLSGTQVD.E (SEQ ID NO: 63) | A7MBI5 | DPYSL3 | 646 |
| R.DLHESSFSLSG.S (SEQ ID NO: 64) | A8E641 | DPYSL5 | 527 |
| L.DADKPVSSQLR.V (SEQ ID NO: 65) | E1BDX8 | DYNC1H1 | 125 |
| K.VTDFGDKVED.P (SEQ ID NO: 66) | E1BDX8 | DYNC1H1 | 228 |
| T.AVAQQN[+0.98402]QGEVPEPQDM[+15.99492]K.V (SEQ ID NO: 67) | E1BDX8 | DYNC1H1 | 489 |
| I.ESLHDKFK.V (SEQ ID NO: 68) | E1BDX8 | DYNC1H1 | 616 |
| Q.VIYLNPPIEEC[+71.03711]R.Y (SEQ ID NO: 69) | E1BDX8 | DYNC1H1 | 967 |
| V.PQIEVETHK.V (SEQ ID NO: 70) | E1BDX8 | DYNC1H1 | 2552 |
| M.AQPKEDEEEEDDVVTPKPPIEPEEEK.T (SEQ ID NO: 71) | F1N7H7 | DYNC1I2 | 140 |
| K.E[−18.01056]YLLGSTAEEKA.V (SEQ ID NO: 72) | Q3SZ15 | EEF1E1 | 58 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| R.VETGVLKPGMVVTF.A (SEQ ID NO: 73) | P68103 | EF1A1 | 267 |
| K.IGYNPATVPFVPISGW.H (SEQ ID NO: 74) | Q32PH8 | EF1A2 | 181 |
| M.SVIAHVDHGK.S (SEQ ID NO: 75) | Q3SYU2 | EF2 | 23 |
| W.C[+71.03711]FGPDGTGPNILTDITK.G (SEQ ID NO: 76) | Q3SYU2 | EF2 | 651 |
| D.NNSGTLN[+0.98402]SSSVSPGDGSR.N (SEQ ID NO: 77) | A0JNE6 | EIF2AK2 | 211 |
| P.QTAETDAIR.F (SEQ ID NO: 78) | G3N094 | EIPR1 | 21 |
| K.NVALLSQLY.H (SEQ ID NO: 79) | Q3ZCE2 | ELAVL1 | 192 |
| L.GTLQLTHNR.L (SEQ ID NO: 80) | Q3ZC32 | ELAVL1 | 381 |
| S.HVPNGESLR.K (SEQ ID NO: 81) | E1BBQ3 | ELP1 | 761 |
| R.HIADLAGNAEVILPVPAFN[+0.98402]VIN.G (SEQ ID NO: 82) | F1MB08 | ENO1 | 199 |
| M.QEFM[+15.99492]ILPVGAENFR.E (SEQ ID NO: 83) | F1MB08 | ENO1 | 232 |
| T.ASAGIQVVGDDLTVTNPK.R (SEQ ID NO: 84) | F1MB08 | ENO1 | 375 |
| K.VNQIGSVTESLQ.A (SEQ ID NO: 85) | F1MB08 | ENO1 | 410 |
| D.ATNVGDEGGFAPNILENSEALELVK.E (SEQ ID NO: 86) | A6QR19 | ENO2 | 204 |
| K.VDVKEEKPLQLVEEVS.K (SEQ ID NO: 87) | A0A3Q1LWK1 | EPB41L2 | 142 |
| V.ELPGAEMGK.V (SEQ ID NO: 88) | G3X6L9 | EPRS1 | 189 |
| E.ETTADGRK.T (SEQ ID NO: 89) | P55052 | FABP5 | 75 |
| E.SALEPMNGEIIDDTLK.T (SEQ ID NO: 90) | F1N5F9 | FAM169A | 422 |
| T.ITLAHLLAAR.E (SEQ ID NO: 91) | F1MH61 | FAM98B | 266 |
| L.EYESSFSDEDAEK.A (SEQ ID NO: 92) | Q9TRY0 | FKBP4 | 301 |
| K.LINRPIIVF.R (SEQ ID NO: 93) | Q3MHK9 | FSCN1 | 380 |
| G.KFESLDLAELAK.K (SEQ ID NO: 94) | Q8MJN0 | FUND2 | 51 |
| V.SFDDPPSAK.A (SEQ ID NO: 95) | Q28009 | FUS | 327 |
| R.VIISAPSADAPM[+15.99492]FVM[+15.99492].G (SEQ ID NO: 96) | P10096 | G3P | 117 |
| R.VPTPNVSVVDLT.C (SEQ ID NO: 97) | P10096 | G3P | 233 |
| V.VDLM[+15.99492]VHM[+15.99492]ASK.E (SEQ ID NO: 98) | P10096 | G3P | 323 |
| V.PTPDVSVVDLTC[+71.03711]R.L (SEQ ID NO: 99) | Q2KJE5 | G3PT | 295 |
| R.VNYQTGPIVWGEPGTN[+0.98402]GQHAF.Y (SEQ ID NO: 100) | Q3ZBD7 | G6PI | 371 |
| K.KIEPELDGSSPVTSHD.S (SEQ ID NO: 101) | Q3ZBD7 | G6PI | 524 |
| L.SQITN[+0.98402]NIDPVGR.I (SEQ ID NO: 102) | P62871 | GBB1 | 31 |
| R.ELSSFIQ.K (SEQ ID NO: 103) | F1N5M2 | GC | 394 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
| --- | --- | --- | --- |
| K.QVYMALPQGDKVQA.M (SEQ ID NO: 104) | P15103 | GLNA | 15 |
| R.IMDM[+15.99492]VSN.Q (SEQ ID NO: 105) | P15103 | GLNA | 120 |
| D.IVEAHYR.A (SEQ ID NO: 106) | P15103 | GLNA | 175 |
| R.LTGFHETSN[+0.98402]INDFSAGVAN.R (SEQ ID NO: 107) | P15103 | GLNA | 300 |
| L.DFPTMK.F (SEQ ID NO: 108) | A4FUZ1 | GLO1 | 62 |
| P.DAIPESGVEPPPLDTAWVEATR.K (SEQ ID NO: 109) | A0A3Q1ME43 | GPS1 | 110 |
| G.LVESQSSFGTLR.K (SEQ ID NO: 110) | E1BFC3 | GSDME | 108 |
| M.ENQIM[+15.99492]DFR.M (SEQ ID NO: 111) | Q2KIV8 | GSTM3 | 105 |
| M.QSWLQGPLK.A (SEQ ID NO: 112) | P28801 | GSTP1 | 37 |
| A.PDLFPTDFK.F (SEQ ID NO: 113) | F2Z4J6 | GTF2B | 297 |
| K.HAVSEGTKAVT.K (SEQ ID NO: 114) | Q2M2T1 | H2B1K | 110 |
| R.DNIQGITKPA.I (SEQ ID NO: 115) | P62803 | H4 | 25 |
| K.VGGHAAEY.G (SEQ ID NO: 116) | P01966 | HBA | 18 |
| G.ALSELSDLHAHK.L (SEQ ID NO: 117) | P01966 | HBA | 80 |
| K.VLDSFSN.G (SEQ ID NO: 118) | P02070 | HBB | 66 |
| A.LSELHC[+71.03711]DKLHVDPENFK.L (SEQ ID NO: 119) | P02070 | HBB | 87 |
| R.SSGSPYGGGYGSGGGSGGYG.S (SEQ ID NO: 120) | E1BEG2 | HNRNPA3 | 357 |
| G.HPPPPPPPEYGPHADSPVLM[+15.99492]VYGLDQSK.M (SEQ ID NO: 121) | E1BIB4 | HNRNPL | 364 |
| K.TDAVEALTALNHYQ.I (SEQ ID NO: 122) | F1N7G0 | HNRNPLL | 506 |
| V.LIVEDIIDTGK.T (SEQ ID NO: 123) | Q3SZI8 | HPRT | 131 |
| R.YESLTD.P (SEQ ID NO: 124) | Q76LV2 | HS90A | 61 |
| K.HN[+0.98402]DDEQYAWESSAGGSF.T (SEQ ID NO: 125) | Q76LV2 | HS90A | 154 |
| V.E[-18.01056]GQLEFR.A (SEQ ID NO: 126) | Q76LV2 | HS90A | 333 |
| D.PTADDSSAAVTEEM[+15.99492]PPLEGDDDTSR.M (SEQ ID NO: 127) | Q76LV2 | HS90A | 704 |
| V.VNDAGRPK.V (SEQ ID NO: 128) | P19120 | HSP7C | 95 |
| M.KEIAEAYLGK.T (SEQ ID NO: 129) | P19120 | HSP7C | 128 |
| I.NEPTAAAIAYGLDKK.V (SEQ ID NO: 130) | P19120 | HSP7C | 174 |
| H.LGGEDFDNR.M (SEQ ID NO: 131) | P19120 | HSP7C | 228 |
| V.SEGGKPK.V (SEQ ID NO: 132) | A7E3Q2 | HSPA2 | 97 |
| S.AVITVPAYFNDSQR.Q (SEQ ID NO: 133) | A7E3Q2 | HSPA2 | 143 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| R.E[18.01056]VPYPDPRIGNFTIQNVFPQSDGDSSKV.K (SEQ ID NO: 134) | A0A3Q1M7L5 | HSPA4L | 624 |
| I.SSSLPPDTQK.F (SEQ ID NO: 135) | E1BNY9 | HUWE2 | 3946 |
| R.ENAEVDGDDDAEEMEAKAED.- (SEQ ID NO: 136) | P68102 | IF2A | 296 |
| Q.AEAPHIVVGTPGR.V (SEQ ID NO: 137) | Q3SZ65 | IF4A2 | 150 |
| F.QQIPGSAPR.T (SEQ ID NO: 138) | A0A3Q1LWV8 | Ig-like domain-containing protein | 58 |
| W.AITNATSGGTPEQIR.Y (SEQ ID NO: 139) | Q0V7M0 | IMA7 | 401 |
| V.IADGGIQNVGHIAK.A (SEQ ID NO: 140) | Q3SWY3 | IMDH2 | 362 |
| F.SGIPITETGTM[+15.99492]GSK.L (SEQ ID NO: 141) | A0A140T827 | IMPDH1 | 197 |
| I.HVSGFRPK.K (SEQ ID NO: 142) | F1MY68 | IMPG1 | 276 |
| D.PLSLDSNK.I (SEQ ID NO: 143) | F1MY68 | IMPG1 | 314 |
| K.VENHGLVELDDKPTAVY.T (SEQ ID NO: 144) | E1BBU2 | IMPG2 | 332 |
| F.QLLIEEK.K (SEQ ID NO: 145) | P21327 | INPP | 30 |
| K.SLIINTSPV.E (SEQ ID NO: 146) | F1MTR1 | IQGAP2 | 997 |
| K.VLAFFETDME.R (SEQ ID NO: 147) | Q3SYS9 | KBP | 432 |
| C.N[+0.98402]GLTQIETLFK.S (SEQ ID NO: 148) | Q5EA61 | KCRB | 255 |
| R.GTGGVDTAAVGGVFDVSNAD.R (SEQ ID NO: 149) | Q5EA61 | KCRB | 321 |
| N.EYGSRIGGGIDVPVPR.H (SEQ ID NO: 150) | A0A3Q1NE05 | KHSRP | 319 |
| R.TLTSS.G (SEQ ID NO: 151) | F1MJ53 | KIF21A | 1403 |
| A.NFDKESER.H (SEQ ID NO: 152) | E1BFV0 | KPNB1 | 208 |
| K.VQHQDALQISDVVM[+15.99492]ASLLRMFQSTAG.S (SEQ ID NO: 153) | E1BFV0 | KPNB1 | 595 |
| R.AQYDELAQ.K (SEQ ID NO: 154) | F6S1Q0 | KRT18 | 253 |
| M.[+42.01056]ATLKDQLIQN[+0.98402]LLK.E (SEQ ID NO: 155) | P19858 | LDHA | 2 |
| V.TLTHEEEAC[+71.03711]LKK.S (SEQ ID NO: 156) | P19858 | LDHA | 307 |
| I.APVAEEETRIPNNK.I (SEQ ID NO: 157) | Q5E9B1 | LDHB | 10 |
| G.SPVQADVYFPR.L (SEQ ID NO: 158) | A0A3Q1MR14 | LGALSL | 25 |
| A.ALATALGDKK.S (SEQ ID NO: 159) | A7YY47 | LMNB1 | 148 |
| E.PEN[+0.98402]HEAPAK.G (SEQ ID NO: 160) | Q58DA3 | LYAR | 301 |
| V.DSPGPAGPR.S (SEQ ID NO: 161) | A0A3Q1M2P0 | MACROD1 | 325 |
| K.EMQFLM[+15.99492].Q (SEQ ID NO: 162) | A0A3Q1M9Z4 | MAP1A | 449 |
| G.RGDSALFAVNGFNM[+15.99492]LIN[+0.98402]GGSER.K (SEQ ID NO: 163) | A0A3Q1MTY6 | MAP1B | 269 |
| K.AAEAQYGFLTM.A (SEQ ID NO: 164) | A0A3Q1MTY6 | MAP1B | 1049 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
| --- | --- | --- | --- |
| R.DISLY.A (SEQ ID NO: 165) | A0A3Q1MTY6 | MAP1B | 1753 |
| R.SIMT.E (SEQ ID NO: 166) | F1MEW3 | MAP2 | 1492 |
| R.PSSIL.P (SEQ ID NO: 167) | F1MEW3 | MAP2 | 1695 |
| G.Q[-17.02655]ETAMAPSLVAPALN[+0.98402]K.P (SEQ ID NO: 168) | Q3ZBD9 | MARE1 | 133 |
| L.PWLRPDSK.T (SEQ ID NO: 169) | A7E3T7 | MAT2A | 174 |
| K.ITPENLPQ.I (SEQ ID NO: 170) | F1MXI4 | MATR3 | 133 |
| S.AMSAAK.A (SEQ ID NO: 171) | Q3T145 | MDHC | 243 |
| I.QYLAHVASSHK.S (SEQ ID NO: 172) | F1MQ37 | MYH9 | 189 |
| A.QNLQLPPEAR.I (SEQ ID NO: 173) | A0A3Q1LUB6 | MYO5A | 1389 |
| K.LSIWAIPSLKQQ.G (SEQ ID NO: 174) | A0A3Q1MF39 | NBAS | 332 |
| R.MFDYTDDPEGPVMPGSHSV.E (SEQ ID NO: 175) | E1BMM0 | NCBP1 | 291 |
| I.IHGSDSVESAEK.E (SEQ ID NO: 176) | P52175 | NDKA2 | 117 |
| L.PEGLPK.I (SEQ ID NO: 177) | F1MSQ6 | NEFH | 416 |
| Y.SSSSGSLM[+15.99492]PSLESLDLSQVAAISNDLK.S (SEQ ID NO: 178) | P02548 | NFL | 58 |
| T.TGYTQSSQVFGR.S (SEQ ID NO: 179) | P02548 | NFL | 411 |
| K.VLDLETKTV.S (SEQ ID NO: 180) | A4IF69 | NHLC2 | 558 |
| R.SYQFWDTQPVPKLGEVVNTHG.P (SEQ ID NO: 181) | F1MZK0 | NMT1 | 116 |
| R.THPSVVPGSIAF.S (SEQ ID NO: 182) | A0A3Q1MR04 | NSF | 51 |
| G.STAPQILNTSSPAQQAENEAK.A (SEQ ID NO: 183) | Q3SZC4 | NSF1C | 262 |
| E.PEEEPGTAAVR.E (SEQ ID NO: 184) | A2VE79 | NUDT3 | 55 |
| G.PGPATMAAPGGGGAGPPGVGGGGAGGR.G (SEQ ID NO: 185) | E1BPW1 | OSBP | 12 |
| M.AAPGGGGAGPPGVGGGGAGGR.G (SEQ ID NO: 186) | E1BPW1 | OSBP | 18 |
| N.PSPVVAQVPSVLQALQGEGALAHR.E (SEQ ID NO: 187) | Q58D08 | P5CR3 | 277 |
| G.QHATGEEQR.S (SEQ ID NO: 188) | A0JBZ9 | p97bcnt2 | 199 |
| K.GKPQANVPSNVS.S (SEQ ID NO: 189) | A0JBZ9 | p97bcnt2 | 522 |
| S.GGASHSELIHNLR.K (SEQ ID NO: 190) | G3MZZ6 | PCMT1 | 64 |
| D.GN[+0.98402]RDLEHLSK.F (SEQ ID NO: 191) | Q29RV1 | PDIA4 | 618 |
| L.LTEGPHLYYVDPVN[+0.98402]K.V (SEQ ID NO: 192) | F1MQJ7 | PDPK1 | 479 |
| D.PSEDPGAAPR.V (SEQ ID NO: 193) | F1MW60 | PDXP | 133 |
| M.KGN[+0.98402]NISSGTVLSDYVGSGPPK.G (SEQ ID NO: 194) | P13696 | PEBP1 | 93 |
| S.PAGHEEAKR.G (SEQ ID NO: 195) | Q3SZ62 | PGAM1 | 32 |
| A.MEAVAAQGK.A (SEQ ID NO: 196) | Q3SZ62 | PGAM1 | 243 |
| H.SSM[+15.99492]VGVNLPK.K (SEQ ID NO: 197) | Q3T0P6 | PGK1 | 174 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| K.IQLISNM[+15.99492]LDKVNEMIIGGGM[+15.99492]AF.T (SEQ ID NO: 198) | Q3T0P6 | PGK1 | 221 |
| K.FYGPEGPYGVF.A (SEQ ID NO: 199) | G5E5M5 | PGRMC1 | 141 |
| V.ETLKEMIK.S (SEQ ID NO: 200) | A5D984 | PKM | 59 |
| R.EATESFASD.P (SEQ ID NO: 201) | A5D984 | PKM | 93 |
| N.VDM[+15.99492]VFASFIR.K (SEQ ID NO: 202) | A5D984 | PKM | 237 |
| R.YVPGSASM[+15.99492]GTTM[+15.99492]AGVDPFTGNSAYQS.A (SEQ ID NO: 203) | A7Z055 | PLAA | 501 |
| L.AQAEAEKQK.E (SEQ ID NO: 204) | A0A3Q1LVA4 | PLEC | 1710 |
| R.SYID.P (SEQ ID NO: 205) | A0A3Q1LVA4 | PLEC | 3895 |
| I.IDDKGILR.Q (SEQ ID NO: 206) | Q5E947 | PRDX1 | 133 |
| L.NIPLLADVTR.K (SEQ ID NO: 207) | Q9BGI3 | PRDX2 | 101 |
| L.SIDSVEDHLAWSK.D (SEQ ID NO: 208) | O77834 | PRDX6 | 72 |
| K.YSPL.H (SEQ ID NO: 209) | A5D7C6 | PREP | 614 |
| K.SQGGEPTYN.V (SEQ ID NO: 210) | Q09430 | PROF2 | 92 |
| K.ETPKEEAPQLTGP.E (SEQ ID NO: 211) | E1BAF6 | PRRC2A | 887 |
| S.SDNVADLHDK.Y (SEQ ID NO: 212) | Q32KL2 | PSB5 | 248 |
| H.ELQAM[+15.99492]KDK.I (SEQ ID NO: 213) | F1MWE0 | PSMC3 | 66 |
| Q.E[-18.01056]PPPPPAPQDVEM[+15.99492]KEEAAAGGGSTGETAGK.T (SEQ ID NO: 214) | Q2KJ46 | PSMD3 | 25 |
| G.SLGHPGSGSGGGGGGGGGGGSGGGGGGAPGGLQHETQELASK.R (SEQ ID NO: 215) | E1BMW9 | PURA | 20 |
| K.QLLDLPLD.A (SEQ ID NO: 216) | Q0P5L6 | Q0P5L6 | 306 |
| S.PEEQHKR.L (SEQ ID NO: 217) | Q0VCQ9 | RCN2 | 59 |
| V.DIPHM[+15.99492]DIEALKK.L (SEQ ID NO: 218) | Q5E9E6 | RL10A | 81 |
| K.AFLADPSAFVAAAPVAAAPAAAPAATT.A (SEQ ID NO: 219) | Q95140 | RLA0 | 267 |
| Q.AEAASGQELAVAVAER.V (SEQ ID NO: 220) | P10123 | RLBP1 | 72 |
| K.LFIGGLSFE.T (SEQ ID NO: 221) | Q2HJ60 | ROA2 | 11 |
| R.GGGGNFGPGPGSNFRGGSDGYGSGRGFGDG.Y (SEQ ID NO: 222) | Q2HJ60 | ROA2 | 202 |
| K.KAEAGAGSATEF.Q (SEQ ID NO: 223) | Q3T0F4 | RS10 | 139 |
| K.GPLQSVQVF.G (SEQ ID NO: 224) | Q3T0X6 | RS16 | 5 |
| E.LAPYDENWFYTR.A (SEQ ID NO: 225) | Q32PD5 | RS19 | 45 |
| V.EQHVVDGK.E (SEQ ID NO: 226) | Q5E9T9 | RTCB | 359 |
| A.ATPASAPLVDFGN[+0.98402]DFVPPAPR.G (SEQ ID NO: 227) | F1N405 | RTN4 | 77 |
| A.ATPASAPLVDFGN[+0.98402]DFVPPAPRGPLPAAPLAAPER.Q (SEQ ID NO: 228) | F1N405 | RTN4 | 77 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| A.ATPASAPLVDFGNDFVPPAPR.G (SEQ ID NO: 229) | F1N4O5 | RTN4 | 77 |
| T.FSDSSPIEIIDEFPTFVSSK.A (SEQ ID NO: 230) | F1N4O5 | RTN4 | 869 |
| A.FSPTTIN[+0.98402]TGR.G (SEQ ID NO: 231) | Q2KHX4 | S61A2 | 196 |
| K.ANKPAPN[+0.98402]HVIF.K (SEQ ID NO: 232) | P08168 | SAG | 3 |
| S.Q[-17.02655]VQVFPPVGASGATTR.L (SEQ ID NO: 233) | P08168 | SAG | 87 |
| A.FATHSTDVEEDKIPKK.S (SEQ ID NO: 234) | P08168 | SAG | 152 |
| K.ESFQDENFVFEEF.A (SEQ ID NO: 235) | P08168 | SAG | 368 |
| E.Q[-17.02655]QVDGDLLLR.L (SEQ ID NO: 236) | E1BIR9 | SARM1 | 436 |
| L.AASAVTQVAK.V (SEQ ID NO: 237) | E1BG76 | SCFD1 | 199 |
| R.NISNQLSIMTKLD (SEQ ID NO: 238) | Q17QS0 | SCRN3 | 185 |
| K.LGAVFNQVAFPLQY.T (SEQ ID NO: 239) | A0JN52 | SF3B3 | 770 |
| LELNPANAVYFC[+71.03711]N[+0.98402]R.A (SEQ ID NO: 240) | Q32LM2 | SGTA | 119 |
| E.E[-18.01056]QLISSSEN[+0.98402]R.L (SEQ ID NO: 241) | G3X696 | SLK | 623 |
| A.GHPLAQNER.C (SEQ ID NO: 242) | A0A3Q1LVA8 | SNX12 | 132 |
| R.FTTYEIRVKT.N (SEQ ID NO: 243) | Q1RMH8 | SNX3 | 46 |
| K.IAALQSFADQLIAGGHY.A (SEQ ID NO: 244) | A0A3Q1LNC8 | SPTAN1 | 1513 |
| Q.VLAAAHELQR.F (SEQ ID NO: 245) | E1BMN5 | SPTBN2 | 1796 |
| A.SLQSQSPER.L (SEQ ID NO: 246) | E1BB38 | SRP72 | 329 |
| S.QTPLQDGSR.T (SEQ ID NO: 247) | E1BC98 | SUPT5H | 786 |
| R.E[-18.01056]GIDPTPY.Y (SEQ ID NO: 248) | Q2KJG3 | SYNC | 503 |
| L.HSTFFPALQGAQTK.M (SEQ ID NO: 249) | P17248 | SYWC | 341 |
| Y.RQLFHPEQLITGKEDAANNYAR.G (SEQ ID NO: 250) | P81947 | TBA1B | 84 |
| A.C[+71.03711]FEPANQM[+15.99492]VK.C (SEQ ID NO: 251) | P81947 | TBA1B | 295 |
| H.LQAGQC[+71.03711]GNQIGAK.F (SEQ ID NO: 252) | Q3MHM5 | TBB4B | 7 |
| E.GAELVDSVLDVVRK.E (SEQ ID NO: 253) | Q3MHM5 | TBB4B | 109 |
| K.EAESC[+71.03711]DC[+71.03711]LQGFQLTHSLGGGTGSGMGTLLIS.K (SEQ ID NO: 254) | Q3MHM5 | TBB4B | 123 |
| K.IREEYPDRIM[+15.99492]N[+0.98402]TF.S (SEQ ID NO: 255) | Q3MHM5 | TBB4B | 155 |
| R.IM[+15.99492]NTF.S (SEQ ID NO: 256) | Q3MHM5 | TBB4B | 163 |
| R.YLTVAAVF.R (SEQ ID NO: 257) | Q3MHM5 | TBB4B | 310 |
| K.MAVTF.I (SEQ ID NO: 258) | Q2KJD0 | TBB5 | 363 |
| K.MDSAIPDLG.P (SEQ ID NO: 259) | Q29RJ2 | TBC24 | 15 |
| L.PEAAASADLK.I (SEQ ID NO: 260) | F1N7N3 | TCAF1 | 562 |

TABLE 1-continued

Tryptic and semi-tryptic peptides identified in CAPN5 retinal proteomics screen: Bovine retinal lysates were incubated in four conditions: (A) 5 mM EDTA ($Ca^{2+}$-free control), (B) 10 mM $CaCl_2$ (negative control to observe 'background proteolysis' in the retina), (C) CAPN5-PC + 5 mM EDTA (inactive negative control), and (D) CAPN5-PC + 10 mM $CaCl_2$ (experimental 'active' condition). The MS data were searched for semi-tryptic peptides that had a corresponding tryptic peptide (of the same sequence) in all three control lanes.

| Peptide | UniProt ID | Protein | Position* |
|---|---|---|---|
| K.SSLGP.V (SEQ ID NO: 261) | G5E531 | TCP1 | 34 |
| K.VATAQDDITGDGTTSN[+0.98402]VLIIGELLKQA.D (SEQ ID NO: 262) | Q3MHL7 | TCPZ | 80 |
| K.LTLF.V (SEQ ID NO: 263) | Q3SX36 | TFG | 86 |
| V.GEFSGANKEK.L (SEQ ID NO: 264) | O97680 | THIO | 87 |
| Q.HIQSAQSQR.S (SEQ ID NO: 265) | A0A3Q1NI32 | THRAP3 | 617 |
| V.LDPFTIKPLDK.K (SEQ ID NO: 266) | A7Z014 | TKT | 532 |
| V.QEMVTKSN[+0.98402]TSPEELGPLANQLTSDYGR.L (SEQ ID NO: 267) | A0A3Q1MLQ7 | TLN1 | 1878 |
| G.EVPGSHQGSDPYHQLR.G (SEQ ID NO: 268) | Q32L10 | TM205 | 129 |
| K.AGDKIPEEQPVA.A (SEQ ID NO: 269) | Q2TBU2 | TMX2 | 270 |
| I.NTLNAAK.V (SEQ ID NO: 270) | Q5E956 | TPIS | 27 |
| F.TGEISPGMIK.D (SEQ ID NO: 271) | Q5E956 | TPIS | 76 |
| L.DEREAGITEK.V (SEQ ID NO: 272) | Q5E956 | TPIS | 133 |
| F.SVM[+15.99492]PSPK.V (SEQ ID NO: 273) | E1BJB1 | TUBB2A | 168 |
| K.QHLENDPGSNEDTDIPKGYMDLM[+15.99492]P.F (SEQ ID NO: 274) | A0A3Q1ME81 | TXNL1 | 105 |
| R.ELAEAVAGGRVLVVGAGGIGC[+71.03711]ELLKNLVLTGFSHID.L (SEQ ID NO: 275) | A4FV12 | UBA2 | 10 |
| K.LC[+71.03711]TFTIT.Q (SEQ ID NO: 276) | E1BHT5 | UBR4 | 1660 |
| E.ELKGQEVSPK.V (SEQ ID NO: 277) | A0A3Q1LK04 | UCHL1 | 185 |
| H.AVANNQDKLEFEDGSVLK.Q (SEQ ID NO: 278) | A0A3Q1LK04 | UCHL1 | 214 |
| L.EEVGLPLHR.A (SEQ ID NO: 279) | P31754 | UMPS | 355 |
| K.TPTPLM[+15.99492]ANDSTETSEAGE EEEDHEGDSENKERM[+15.99492]PFIQ.- (SEQ ID NO: 280) | Q29RL6 | VAT1L | 383 |
| V.FNGSGKPIDR.G (SEQ ID NO: 281) | P31408 | VATB2 | 132 |
| L.DAFVEGVVKK.V (SEQ ID NO: 282) | P21282 | VATC1 | 62 |
| A.DKEEMNR.L (SEQ ID NO: 283) | P21282 | VATC1 | 261 |
| S.EAANRNN[+0.98402]DALR.Q (SEQ ID NO: 284) | P48616 | VIM | 300 |
| R.ISLP.L (SEQ ID NO: 285) | P48616 | VIM | 411 |
| M.IDNVYNPAAIAVDWYK.T (SEQ ID NO: 286) | A0A3Q1M988 | VLDLR | 509 |
| I.PDSHEITIK.H (SEQ ID NO: 287) | Q32LB0 | WDR70 | 169 |

*refers to the position the protein primary sequence

TABLE 2

Peptide Substrates of Calpain-5

| Peptide | SEQ ID NO |
|---|---|
| EVKALEEA (P4'A) | SEQ ID NO: 291 |
| EVKALEEP (P4'P) | SEQ ID NO: 292 |
| EVRALEEA (P2R) | SEQ ID NO: 293 |
| EGKAVLEA (P3GP1'V) | SEQ ID NO: 294 |
| *Testing P1 site* | |
| EVRKLEEA | SEQ ID NO: 295 |
| EVRRLEEA | SEQ ID NO: 296 |
| EVRWLEEA | SEQ ID NO: 297 |
| EVRCLEEA | SEQ ID NO: 298 |
| *Testing P2 site* | |
| EVWALEEA | SEQ ID NO: 299 |
| EVCALEEA | SEQ ID NO: 300 |
| *Testing P3 site* | |
| EGRALEEA | SEQ ID NO: 301 |
| ELRALEEA | SEQ ID NO: 302 |
| EWRALEEA | SEQ ID NO: 303 |
| *Testing P1' site* | |
| EVRAVEEA | SEQ ID NO: 304 |
| EVRAAEEA | SEQ ID NO: 305 |
| EVRAYEEA | SEQ ID NO: 306 |
| *Testing P2' site* | |
| EVRALLEA | SEQ ID NO: 307 |
| EVRALAEA | SEQ ID NO: 308 |
| EVRALYEA | SEQ ID NO: 309 |
| *Testing P3' site* | |
| EVRALEAA | SEQ ID NO: 310 |
| EVRALELA | SEQ ID NO: 311 |
| EVRALEWA | SEQ ID NO: 312 |
| *Testing length* | |
| VRALEE (6-mer) | SEQ ID NO: 313 |
| RALE (4-mer) | SEQ ID NO: 314 |
| KALE (4-mer) | SEQ ID NO: 315 |
| RAL (3-mer) | |
| KAL (3-mer) | |
| AL (2-mer) | |

REFERENCES

1. Mahajan V B, Skeie J M, Bassuk A G, Fingert J H, Braun T A, Daggett H T, Folk J C, Sheffield V C, Stone E M. Calpain-5 mutations cause autoimmune uveitis, retinal neovascularization, and photoreceptor degeneration. PLoS Genet. 2012; 8(10):e1003001. Epub 2012/10/12. doi: 10.1371/journal.pgen.1003001. PubMed PMID: 23055945; PMCID: PMC3464205.
2. Campbell R L, Davies P L. Structure-function relationships in calpains. Biochem J. 2012; 447(3):335-51. Epub 2012/10/06. doi: 10.1042/BJ20120921. PubMed PMID: 23035980.
3. Praidou A, Klangas I, Papakonstantinou E, Androudi S, Georgiadis N, Karakiulakis G, Dimitrakos S. Vitreous and serum levels of platelet-derived growth factor and their correlation in patients with proliferative diabetic retinopathy. Curr Eye Res. 2009; 34(2):152-61. Epub 2009/02/17. doi: 10.1080/02713680802585920. PubMed PMID: 19219687.
4. Freyberger H, Brocker M, Yakut H, Hammer J, Effert R, Schifferdecker E, Schatz H, Derwahl M. Increased levels of platelet-derived growth factor in vitreous fluid of patients with proliferative diabetic retinopathy. Exp Clin Endocrinol Diabetes. 2000; 108(2):106-9. Epub 2000/05/29. doi: 10.1055/s-2000-5803. PubMed PMID: 10826517.
5. Klaassen I, de Vries E W, Vogels IMC, van Kampen AHC, Bosscha M I, Steel D H W, Van Noorden C J F, Lesnik-Oberstein S Y, Schlingemann R O. Identification of proteins associated with clinical and pathological features of proliferative diabetic retinopathy in vitreous and fibrovascular membranes. PLoS One. 2017; 12(11):e0187304. Epub 2017/11/03. doi: 10.1371/journal.pone.0187304. PubMed PMID: 29095861; PMCID: PMC5667868.
6. Thomsen M C, Nielsen M. Seq2Logo: a method for construction and visualization of amino acid binding motifs and sequence profiles including sequence weighting, pseudo counts and two-sided representation of amino acid enrichment and depletion. Nucleic Acids Res. 2012; 40(Web Server issue):W281-7. Epub 2012/05/29. doi: 10.1093/nar/gks469. PubMed PMID: 22638583; PMCID: PMC3394285.

What is claimed is:

1. A calpain-5 inhibitor selected from the group consisting of:
   a) a calpain-5 inhibitor comprising the amino acid sequence of SEQ ID NO:288 or SEQ ID NO:289, wherein the calpain-5 inhibitor comprises a lysine having a methylated epsilon amino group at position 7 of SEQ ID NO:288, or the calpain-5 inhibitor comprises a lysine having a methylated epsilon amino group at position 7 and position 8 of SEQ ID NO:289; and
   b) a calpain-5 inhibitor comprising an amino acid sequence having at least 90% identity to the sequence of SEQ ID NO:288 or SEQ ID NO:289, wherein the calpain-5 inhibitor comprises a lysine having a methylated epsilon amino group at position 7 of SEQ ID NO:288, or the calpain-5 inhibitor comprises a lysine having a methylated epsilon amino group at position 7 and position 8 of SEQ ID NO:289.

2. The calpain-5 inhibitor of claim 1, further comprising a detectable label.

3. The calpain-5 inhibitor of claim 2, wherein the detectable label is a fluorescent label, a chemiluminescent label, or an isotopic label.

4. A composition comprising the calpain-5 inhibitor of claim 1 and a pharmaceutically acceptable excipient.

5. A method of treating a subject for a retinal disease associated with calpain-5 hyperactivity, the method comprising administering a therapeutically effective amount of the composition of claim 4 to the subject.

* * * * *

SEQUENCE LISTING

<160> NUMBER OF SEQ ID NOS: 315

<210> SEQ ID NO 1
<211> LENGTH: 11
<212> TYPE: PRT
<213> ORGANISM: Artificial Sequence -continued

```
<220> FEATURE:
<223> OTHER INFORMATION: calpain-5 peptide substrate

<400> SEQUENCE: 1

Arg Gln Asn Arg Gly Gly Gly Cys Ile Asn His
1               5                   10

<210> SEQ ID NO 2
<211> LENGTH: 12
<212> TYPE: PRT
<213> ORGANISM: Artificial Sequence
<220> FEATURE:
<223> OTHER INFORMATION: calpain-5 peptide substrate

<400> SEQUENCE: 2

Trp Arg Gln Asn Arg Gly Gly Gly Cys Ile Asn His
1               5                   10

<210> SEQ ID NO 3
<211> LENGTH: 11
<212> TYPE: PRT
<213> ORGANISM: Artificial Sequence
<220> FEATURE:
<223> OTHER INFORMATION: Calpain Substrate III

<400> SEQUENCE: 3

Thr Pro Leu Lys Ser Pro Pro Ser Pro Arg
1               5                   10

<210> SEQ ID NO 4
<211> LENGTH: 16
<212> TYPE: PRT
<213> ORGANISM: Artificial Sequence
<220> FEATURE:
<223> OTHER INFORMATION: platelet-derived growth factor B (PDGFB) motif

<400> SEQUENCE: 4

Lys Ile Glu Ile Val Arg Lys Lys Pro Ile Phe Lys Lys Ala Thr Val
1               5                   10                  15

<210> SEQ ID NO 5
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 5

Asn His Ile Thr Glu Gln Ile Gly Met Phe Ser Phe Thr Gly Leu Asn
1               5                   10                  15

Pro Lys Gln

<210> SEQ ID NO 6
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 6

Asn Val Ala Tyr Leu Ala His Ala Ile His Gln Val Thr Lys
1               5                   10

<210> SEQ ID NO 7
<211> LENGTH: 14
<212> TYPE: PRT
```

-continued

```
<213> ORGANISM: Artificial Sequence
<220> FEATURE:
<223> OTHER INFORMATION: semi-tryptic peptide

<400> SEQUENCE: 7

Lys Gln Gln Glu Val Ala Val Ala Gly Ala Ser Ser Pro Thr
1               5                   10

<210> SEQ ID NO 8
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 8

Leu Thr Glu Ala Pro Leu Asn Pro Lys Ala
1               5                   10

<210> SEQ ID NO 9
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 9

Asp Leu Tyr Ala Asn Thr Val Leu Ser Gly Gly Thr Thr Met Tyr Pro
1               5                   10                  15

Gly Ile Ala Asp Arg Met
            20

<210> SEQ ID NO 10
<211> LENGTH: 20
<212> TYPE: PRT
<213> ORGANISM: Artificial Sequence
<220> FEATURE:
<223> OTHER INFORMATION: semi-tryptic peptide

<400> SEQUENCE: 10

Lys Ile Ile Ala Pro Pro Glu Arg Lys Tyr Ser Val Trp Ile Gly Gly
1               5                   10                  15

Ser Ile Leu Ala
            20

<210> SEQ ID NO 11
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 11

Lys Gln Glu Tyr Asp Glu Ser Gly Pro Ser Ile Val His Arg
1               5                   10

<210> SEQ ID NO 12
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 12

Val Ser Glu Tyr Met Ser Lys Lys
1               5
```

<210> SEQ ID NO 13
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 13

Glu Lys Asp Ala Leu Gln Glu Ile Tyr Asn Gln Lys Gly Val Phe Pro
1               5                   10                  15

Gly Gln Gln Phe Lys Pro
            20

<210> SEQ ID NO 14
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 14

Glu Ala Gly Thr Ala Pro Gly Glu Thr Arg Glu
1               5                   10

<210> SEQ ID NO 15
<211> LENGTH: 21
<212> TYPE: PRT
<213> ORGANISM: Artificial Sequence
<220> FEATURE:
<223> OTHER INFORMATION: semi-tryptic peptide

<400> SEQUENCE: 15

Lys Lys Asp Glu Ser Glu Gly Ala Gly Glu Ser Asp Gly Ala Gly Asp
1               5                   10                  15

His Pro Glu Pro Ser
            20

<210> SEQ ID NO 16
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 16

Lys Ala Glu Ala Glu Glu Thr
1               5

<210> SEQ ID NO 17
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 17

Arg Phe Ile Glu Leu Glu Gln Glu Lys Asn Ala Glu Leu Met
1               5                   10

<210> SEQ ID NO 18
<211> LENGTH: 18
<212> TYPE: PRT
<213> ORGANISM: Artificial Sequence
<220> FEATURE:
<223> OTHER INFORMATION: semi-tryptic peptide

```
<400> SEQUENCE: 18

Lys Ile Gly Glu His Thr Pro Ser Ser Leu Ala Ile Met Glu Asn Ala
1               5                   10                  15

Asn Val

<210> SEQ ID NO 19
<211> LENGTH: 20
<212> TYPE: PRT
<213> ORGANISM: Artificial Sequence
<220> FEATURE:
<223> OTHER INFORMATION: semi-tryptic peptide

<400> SEQUENCE: 19

Lys Ile Gly Glu His Thr Pro Ser Ser Leu Ala Ile Met Glu Asn Ala
1               5                   10                  15

Asn Val Leu Ala
            20

<210> SEQ ID NO 20
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 20

Lys Tyr Ser Pro Glu Glu Ile Ala Met Ala Thr Val Thr Ala Leu Arg
1               5                   10                  15

<210> SEQ ID NO 21
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 21

Arg Glu Ala Ala Ala Ala Ala Ala Ala
1               5

<210> SEQ ID NO 22
<211> LENGTH: 26
<212> TYPE: PRT
<213> ORGANISM: Artificial Sequence
<220> FEATURE:
<223> OTHER INFORMATION: semi-tryptic peptide

<400> SEQUENCE: 22

Lys Tyr Val Leu Leu Asn Asp Gln Pro Asp Asp Asn Asp Gly Ser Pro
1               5                   10                  15

Ser Glu Asn Arg Gly Ala Glu Ser Glu Ala
            20                  25

<210> SEQ ID NO 23
<211> LENGTH: 21
<212> TYPE: PRT
<213> ORGANISM: Artificial Sequence
<220> FEATURE:
<223> OTHER INFORMATION: semi-tryptic peptide

<400> SEQUENCE: 23

Arg Val Lys Ala Thr Leu Gln Ala Leu Gln Thr Leu Pro Glu Glu Asn
1               5                   10                  15
```

Tyr Leu Val Leu Arg
            20

<210> SEQ ID NO 24
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 24

Asp Leu Glu Pro Asp Pro Gly Ser Pro Gly Ser Ala Arg Thr
1               5                   10

<210> SEQ ID NO 25
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 25

Leu Phe Thr Leu Lys Glu Glu Lys Pro Lys Met
1               5                   10

<210> SEQ ID NO 26
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 26

Lys Leu Pro Gly Leu Leu Gly Asn Phe Pro Gly Pro Phe Glu Glu Glu
1               5                   10                  15
Met

<210> SEQ ID NO 27
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 27

Lys Val Thr Ala Pro Gln Pro Ala Ala Thr Asn Gly Asp
1               5                   10

<210> SEQ ID NO 28
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 28

Leu Ala Ser Ile Leu Leu Gln Asp His Ile Arg Glu
1               5                   10

<210> SEQ ID NO 29
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 29

Ser Val Asp Trp Val Gly Asp His Asn Glu Pro Leu Thr Gly Phe Ser
1               5                   10                  15

Trp Arg Gly

<210> SEQ ID NO 30
<211> LENGTH: 25
<212> TYPE: PRT
<213> ORGANISM: Artificial Sequence
<220> FEATURE:
<223> OTHER INFORMATION: semi-tryptic peptide

<400> SEQUENCE: 30

Leu Val Arg Asp Pro Ser Arg Leu Pro Ser Glu Gly Pro Gln Pro Ala
1               5                   10                  15

His Val Val Val Gly Asp Val Arg Gln
            20                  25

<210> SEQ ID NO 31
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 31

Thr Ile Thr Gly His Ala Glu Thr Lys Gln
1               5                   10

<210> SEQ ID NO 32
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 32

Thr Ser Thr Pro Asn Phe Val Val Glu Val Thr Lys Asp
1               5                   10

<210> SEQ ID NO 33
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 33

Val Ile Leu His Pro Thr Pro Asn Ser Pro Lys Gln
1               5                   10

<210> SEQ ID NO 34
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 34

Asn Asp Leu Val Glu Ala Leu Lys Arg Lys
1               5                   10

<210> SEQ ID NO 35
<211> LENGTH: 37
<212> TYPE: PRT
<213> ORGANISM: Artificial Sequence

```
<220> FEATURE:
<223> OTHER INFORMATION: semi-tryptic peptide

<400> SEQUENCE: 35

Met Ile Glu Asp Ala Glu Arg Glu Gly Thr Ile Lys Pro Gly Asp Thr
1               5                   10                  15

Ile Ile Glu Pro Thr Ser Gly Asn Thr Gly Ile Gly Leu Ala Leu Ala
                20                  25                  30

Ala Ala Val Lys Gly
            35

<210> SEQ ID NO 36
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 36

Lys Gln Gly Ile Leu Gly Ala Gln Pro Gln Leu Ile Phe Gln Pro His
1               5                   10                  15

Arg

<210> SEQ ID NO 37
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 37

Phe Ser Asn Ile Ser Ala Ala Lys Ala
1               5

<210> SEQ ID NO 38
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 38

Asp Pro Ala Thr Ala Thr Ser Val Asp Leu Arg Asp
1               5                   10

<210> SEQ ID NO 39
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 39

Lys Ile His Pro Val Glu Ala Phe Glu Pro Gly Ala Glu His Val
1               5                   10                  15

<210> SEQ ID NO 40
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 40

Ala Leu Gly Phe Pro Leu Glu Arg Pro Lys Ser
```

```
<210> SEQ ID NO 41
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 41

Leu Glu Lys Pro Val Asp Leu Glu Glu Glu Lys Lys
1               5                   10

<210> SEQ ID NO 42
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 42

Lys Val Gly Glu Gln Ala Gln Val Val Ile Ile Asp Met Asn Asp Pro
1               5                   10                  15

<210> SEQ ID NO 43
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 43

Arg Lys Val Ser Gln Pro Ile Glu Gly His Ala Ala Ser
1               5                   10

<210> SEQ ID NO 44
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 44

Arg Lys Phe Asn Ala Leu Phe Ala Gln Gly Asn Tyr
1               5                   10

<210> SEQ ID NO 45
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 45

Ala Leu Phe Ala Gln Gly Asn Tyr Ser Glu Ala Ala Lys Val
1               5                   10

<210> SEQ ID NO 46
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 46

Asn Asn Arg Pro Ser Glu Gly Pro Leu Gln Thr Arg Leu
1               5                   10
```

```
<210> SEQ ID NO 47
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 47

Ala Ser Thr Leu Val His Leu Gly Glu Tyr Gln Ala Ala Val Asp Gly
1               5                   10                  15

Ala Arg Lys

<210> SEQ ID NO 48
<211> LENGTH: 32
<212> TYPE: PRT
<213> ORGANISM: Artificial Sequence
<220> FEATURE:
<223> OTHER INFORMATION: semi-tryptic peptide

<400> SEQUENCE: 48

Lys Leu Asp Ala Ser Glu Ser Leu Arg Lys Glu Glu Glu Gln Ala Thr
1               5                   10                  15

Glu Thr Gln Pro Ile Val Tyr Gly Gln Pro Gln Leu Met Leu Thr Ala
                20                  25                  30

<210> SEQ ID NO 49
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 49

Pro Gln Gln Val Phe Ser Ala Glu Phe Glu Val Lys Glu
1               5                   10

<210> SEQ ID NO 50
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 50

Ala Asn Cys Tyr Glu Glu Val Lys Asp Arg Cys
1               5                   10

<210> SEQ ID NO 51
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 51

Leu Gly Asp Val Ile Glu Val His Gly Lys His
1               5                   10

<210> SEQ ID NO 52
<211> LENGTH: 10
<212> TYPE: PRT
<213> ORGANISM: Artificial Sequence
<220> FEATURE:
<223> OTHER INFORMATION: semi-tryptic peptide
```

```
<400> SEQUENCE: 52

Glu Ala Glu Val Thr Asn Ile Lys Lys Thr
1               5                   10

<210> SEQ ID NO 53
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 53

Gln Leu Gln Thr Glu Leu Val Glu Ile Leu Lys Asn
1               5                   10

<210> SEQ ID NO 54
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 54

Arg Val Asp Leu Pro Ser Gly Thr Thr Pro Gly Thr Gln Val
1               5                   10

<210> SEQ ID NO 55
<211> LENGTH: 33
<212> TYPE: PRT
<213> ORGANISM: Artificial Sequence
<220> FEATURE:
<223> OTHER INFORMATION: semi-tryptic peptide

<400> SEQUENCE: 55

Arg Glu Leu Asp Ala Glu Glu Ala Glu Ala Ser Ser Thr Glu Gly Glu
1               5                   10                  15

Glu Ala Gly Val Gly Asn Gly Thr Ser Ala Pro Val Arg Leu Pro Phe
            20                  25                  30

Ser

<210> SEQ ID NO 56
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 56

Leu Thr Ala Glu His Leu Pro Leu Leu Arg Asn
1               5                   10

<210> SEQ ID NO 57
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 57

Met Glu Leu Gly Glu Leu Leu Tyr Asn Lys Ser Glu Tyr Ile Glu Thr
1               5                   10                  15

Ala Ser Gly Asn Lys Val
            20
```

```
<210> SEQ ID NO 58
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 58

Val Arg Ala Leu Pro Glu Ser Leu Ala Gln Gln Ala Leu Arg Arg
1               5                   10                  15

<210> SEQ ID NO 59
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 59

Ser Ser Val Val Leu Gln Asp Glu Gly Gln Asn Glu Asp Ile Glu
1               5                   10                  15

Lys Glu Glu Glu Arg Glu
            20

<210> SEQ ID NO 60
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 60

Ala Thr Ser Asp Asp Ile Lys Lys Ser
1               5

<210> SEQ ID NO 61
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 61

Arg Val Leu Leu Glu Ala Gly Glu Gly Leu Val Thr
1               5                   10

<210> SEQ ID NO 62
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 62

Ser Val Ile Trp Asp Lys Ala
1               5

<210> SEQ ID NO 63
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 63

Arg Asn Leu His Gln Ser Gly Phe Ser Leu Ser Gly Thr Gln Val Asp
1               5                   10                  15
```

Glu

<210> SEQ ID NO 64
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 64

Arg Asp Leu His Glu Ser Ser Phe Ser Leu Ser Gly Ser
1               5                   10

<210> SEQ ID NO 65
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 65

Ile Asp Ala Asp Lys Pro Val Ser Ser Gln Leu Arg Val
1               5                   10

<210> SEQ ID NO 66
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 66

Lys Val Thr Asp Phe Gly Asp Lys Val Glu Asp Pro
1               5                   10

<210> SEQ ID NO 67
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 67

Thr Ala Val Ala Gln Gln Asn Gln Gly Glu Val Pro Glu Pro Gln Asp
1               5                   10                  15

Met Lys Val

<210> SEQ ID NO 68
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 68

Ile Glu Ser Leu His Asp Lys Phe Lys Val
1               5                   10

<210> SEQ ID NO 69
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 69

```
Gln Val Ile Tyr Leu Asn Pro Pro Ile Glu Glu Cys Arg Tyr
1               5                   10

<210> SEQ ID NO 70
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 70

Val Pro Gln Ile Glu Val Glu Thr His Lys Val
1               5                   10

<210> SEQ ID NO 71
<211> LENGTH: 28
<212> TYPE: PRT
<213> ORGANISM: Artificial Sequence
<220> FEATURE:
<223> OTHER INFORMATION: semi-tryptic peptide

<400> SEQUENCE: 71

Met Ala Gln Pro Lys Glu Asp Glu Glu Glu Asp Asp Val Val Thr
1               5                   10                  15

Pro Lys Pro Pro Ile Glu Pro Glu Glu Glu Lys Thr
            20                  25

<210> SEQ ID NO 72
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 72

Lys Glu Tyr Leu Leu Gly Ser Thr Ala Glu Glu Lys Ala Val
1               5                   10

<210> SEQ ID NO 73
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 73

Arg Val Glu Thr Gly Val Leu Lys Pro Gly Met Val Val Thr Phe Ala
1               5                   10                  15

<210> SEQ ID NO 74
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 74

Lys Ile Gly Tyr Asn Pro Ala Thr Val Pro Phe Val Pro Ile Ser Gly
1               5                   10                  15

Trp His

<210> SEQ ID NO 75
<211> LENGTH: 12
<212> TYPE: PRT
<213> ORGANISM: Artificial Sequence
```

```
<220> FEATURE:
<223> OTHER INFORMATION: semi-tryptic peptide

<400> SEQUENCE: 75

Met Ser Val Ile Ala His Val Asp His Gly Lys Ser
1               5                   10

<210> SEQ ID NO 76
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 76

Trp Cys Phe Gly Pro Asp Gly Thr Gly Pro Asn Ile Leu Thr Asp Ile
1               5                   10                  15

Thr Lys Gly

<210> SEQ ID NO 77
<211> LENGTH: 20
<212> TYPE: PRT
<213> ORGANISM: Artificial Sequence
<220> FEATURE:
<223> OTHER INFORMATION: semi-tryptic peptide

<400> SEQUENCE: 77

Asp Asn Asn Ser Gly Thr Leu Asn Ser Ser Val Ser Pro Gly Asp
1               5                   10                  15

Gly Ser Arg Asn
            20

<210> SEQ ID NO 78
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 78

Pro Gln Thr Ala Glu Thr Asp Ala Ile Arg Phe
1               5                   10

<210> SEQ ID NO 79
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 79

Lys Asn Val Ala Leu Leu Ser Gln Leu Tyr His
1               5                   10

<210> SEQ ID NO 80
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 80

Leu Gly Thr Leu Gln Leu Thr His Asn Arg Leu
1               5                   10
```

```
<210> SEQ ID NO 81
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 81

Ser His Val Pro Asn Gly Glu Ser Leu Arg Lys
1               5                   10

<210> SEQ ID NO 82
<211> LENGTH: 24
<212> TYPE: PRT
<213> ORGANISM: Artificial Sequence
<220> FEATURE:
<223> OTHER INFORMATION: semi-tryptic peptide

<400> SEQUENCE: 82

Arg His Ile Ala Asp Leu Ala Gly Asn Ala Glu Val Ile Leu Pro Val
1               5                   10                  15

Pro Ala Phe Asn Val Ile Asn Gly
            20

<210> SEQ ID NO 83
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 83

Met Gln Glu Phe Met Ile Leu Pro Val Gly Ala Glu Asn Phe Arg Glu
1               5                   10                  15

<210> SEQ ID NO 84
<211> LENGTH: 20
<212> TYPE: PRT
<213> ORGANISM: Artificial Sequence
<220> FEATURE:
<223> OTHER INFORMATION: semi-tryptic peptide

<400> SEQUENCE: 84

Thr Ala Ser Ala Gly Ile Gln Val Val Gly Asp Asp Leu Thr Val Thr
1               5                   10                  15

Asn Pro Lys Arg
            20

<210> SEQ ID NO 85
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 85

Lys Val Asn Gln Ile Gly Ser Val Thr Glu Ser Leu Gln Ala
1               5                   10

<210> SEQ ID NO 86
<211> LENGTH: 27
<212> TYPE: PRT
<213> ORGANISM: Artificial Sequence
<220> FEATURE:
<223> OTHER INFORMATION: semi-tryptic peptide

<400> SEQUENCE: 86
```

Asp Ala Thr Asn Val Gly Asp Glu Gly Gly Phe Ala Pro Asn Ile Leu
1               5                   10                  15

Glu Asn Ser Glu Ala Leu Glu Leu Val Lys Glu
            20                  25

<210> SEQ ID NO 87
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 87

Lys Val Asp Val Lys Glu Glu Lys Pro Leu Gln Leu Val Glu Glu Val
1               5                   10                  15

Ser Lys

<210> SEQ ID NO 88
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 88

Val Glu Leu Pro Gly Ala Glu Met Gly Lys Val
1               5                   10

<210> SEQ ID NO 89
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 89

Glu Glu Thr Thr Ala Asp Gly Arg Lys Thr
1               5                   10

<210> SEQ ID NO 90
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 90

Glu Ser Ala Leu Glu Pro Met Asn Gly Glu Ile Ile Asp Asp Thr Leu
1               5                   10                  15

Lys Thr

<210> SEQ ID NO 91
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 91

Thr Ile Thr Leu Ala His Leu Leu Ala Ala Arg Glu
1               5                   10

<210> SEQ ID NO 92
<211> LENGTH: 15

```
<212> TYPE: PRT
<213> ORGANISM: Artificial Sequence
<220> FEATURE:
<223> OTHER INFORMATION: semi-tryptic peptide

<400> SEQUENCE: 92

Leu Glu Tyr Glu Ser Ser Phe Ser Asp Glu Asp Ala Glu Lys Ala
1               5                   10                  15

<210> SEQ ID NO 93
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 93

Lys Leu Ile Asn Arg Pro Ile Ile Val Phe Arg
1               5                   10

<210> SEQ ID NO 94
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 94

Gly Lys Phe Glu Ser Leu Asp Leu Ala Glu Leu Ala Lys Lys
1               5                   10

<210> SEQ ID NO 95
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 95

Val Ser Phe Asp Asp Pro Pro Ser Ala Lys Ala
1               5                   10

<210> SEQ ID NO 96
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 96

Arg Val Ile Ile Ser Ala Pro Ser Ala Asp Ala Pro Met Phe Val Met
1               5                   10                  15

Gly

<210> SEQ ID NO 97
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 97

Arg Val Pro Thr Pro Asn Val Ser Val Val Asp Leu Thr Cys
1               5                   10

<210> SEQ ID NO 98
```

```
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 98

Val Val Asp Leu Met Val His Met Ala Ser Lys Glu
1               5                   10

<210> SEQ ID NO 99
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 99

Val Pro Thr Pro Asp Val Ser Val Val Asp Leu Thr Cys Arg Leu
1               5                   10                  15

<210> SEQ ID NO 100
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 100

Arg Val Asn Tyr Gln Thr Gly Pro Ile Val Trp Gly Glu Pro Gly Thr
1               5                   10                  15

Asn Gly Gln His Ala Phe Tyr
            20

<210> SEQ ID NO 101
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 101

Lys Lys Ile Glu Pro Glu Leu Asp Gly Ser Ser Pro Val Thr Ser His
1               5                   10                  15

Asp Ser

<210> SEQ ID NO 102
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 102

Leu Ser Gln Ile Thr Asn Asn Ile Asp Pro Val Gly Arg Ile
1               5                   10

<210> SEQ ID NO 103
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 103

Arg Glu Leu Ser Ser Phe Ile Gln Lys
```

```
1               5

<210> SEQ ID NO 104
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 104

Lys Gln Val Tyr Met Ala Leu Pro Gln Gly Asp Lys Val Gln Ala Met
1               5                  10                  15

<210> SEQ ID NO 105
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 105

Arg Ile Met Asp Met Val Ser Asn Gln
1               5

<210> SEQ ID NO 106
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 106

Asp Ile Val Glu Ala His Tyr Arg Ala
1               5

<210> SEQ ID NO 107
<211> LENGTH: 21
<212> TYPE: PRT
<213> ORGANISM: Artificial Sequence
<220> FEATURE:
<223> OTHER INFORMATION: semi-tryptic peptide

<400> SEQUENCE: 107

Arg Leu Thr Gly Phe His Glu Thr Ser Asn Ile Asn Asp Phe Ser Ala
1               5                  10                  15

Gly Val Ala Asn Arg
            20

<210> SEQ ID NO 108
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 108

Leu Asp Phe Pro Thr Met Lys Phe
1               5

<210> SEQ ID NO 109
<211> LENGTH: 24
<212> TYPE: PRT
<213> ORGANISM: Artificial Sequence
<220> FEATURE:
<223> OTHER INFORMATION: semi-tryptic peptide

<400> SEQUENCE: 109
```

```
Pro Asp Ala Ile Pro Glu Ser Gly Val Glu Pro Pro Leu Asp Thr
1               5                   10                  15

Ala Trp Val Glu Ala Thr Arg Lys
            20

<210> SEQ ID NO 110
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 110

Gly Leu Val Glu Ser Gln Ser Ser Phe Gly Thr Leu Arg Lys
1               5                   10

<210> SEQ ID NO 111
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 111

Met Glu Asn Gln Ile Met Asp Phe Arg Met
1               5                   10

<210> SEQ ID NO 112
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 112

Met Gln Ser Trp Leu Gln Gly Pro Leu Lys Ala
1               5                   10

<210> SEQ ID NO 113
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 113

Ala Pro Asp Leu Phe Pro Thr Asp Phe Lys Phe
1               5                   10

<210> SEQ ID NO 114
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 114

Lys His Ala Val Ser Glu Gly Thr Lys Ala Val Thr Lys
1               5                   10

<210> SEQ ID NO 115
<211> LENGTH: 12
<212> TYPE: PRT
<213> ORGANISM: Artificial Sequence
<220> FEATURE:
<223> OTHER INFORMATION: semi-tryptic peptide
```

```
<400> SEQUENCE: 115

Arg Asp Asn Ile Gln Gly Ile Thr Lys Pro Ala Ile
1               5                   10

<210> SEQ ID NO 116
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 116

Lys Val Gly Gly His Ala Ala Glu Tyr Gly
1               5                   10

<210> SEQ ID NO 117
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 117

Gly Ala Leu Ser Glu Leu Ser Asp Leu His Ala His Lys Leu
1               5                   10

<210> SEQ ID NO 118
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 118

Lys Val Leu Asp Ser Phe Ser Asn Gly
1               5

<210> SEQ ID NO 119
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 119

Ala Leu Ser Glu Leu His Cys Asp Lys Leu His Val Asp Pro Glu Asn
1               5                   10                  15

Phe Lys Leu

<210> SEQ ID NO 120
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 120

Arg Ser Ser Gly Ser Pro Tyr Gly Gly Gly Tyr Gly Ser Gly Gly Gly
1               5                   10                  15

Ser Gly Gly Tyr Gly Ser
                20

<210> SEQ ID NO 121
<211> LENGTH: 31
```

```
<212> TYPE: PRT
<213> ORGANISM: Artificial Sequence
<220> FEATURE:
<223> OTHER INFORMATION: semi-tryptic peptide

<400> SEQUENCE: 121

Gly His Pro Pro Pro Pro Pro Pro Glu Tyr Gly Pro His Ala
1               5                   10                  15

Asp Ser Pro Val Leu Met Val Tyr Gly Leu Asp Gln Ser Lys Met
            20                  25                  30

<210> SEQ ID NO 122
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 122

Lys Thr Asp Ala Val Glu Ala Leu Thr Ala Leu Asn His Tyr Gln Ile
1               5                   10                  15

<210> SEQ ID NO 123
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 123

Val Leu Ile Val Glu Asp Ile Ile Asp Thr Gly Lys Thr
1               5                   10

<210> SEQ ID NO 124
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 124

Arg Tyr Glu Ser Leu Thr Asp Pro
1               5

<210> SEQ ID NO 125
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 125

Lys His Asn Asp Asp Glu Gln Tyr Ala Trp Glu Ser Ser Ala Gly Gly
1               5                   10                  15

Ser Phe Thr

<210> SEQ ID NO 126
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 126

Val Glu Gly Gln Leu Glu Phe Arg Ala
1               5
```

<210> SEQ ID NO 127
<211> LENGTH: 27
<212> TYPE: PRT
<213> ORGANISM: Artificial Sequence
<220> FEATURE:
<223> OTHER INFORMATION: semi-tryptic peptide

<400> SEQUENCE: 127

Asp Pro Thr Ala Asp Ser Ser Ala Ala Val Thr Glu Glu Met Pro
1               5                   10                  15

Pro Leu Glu Gly Asp Asp Asp Thr Ser Arg Met
            20                  25

<210> SEQ ID NO 128
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 128

Val Val Asn Asp Ala Gly Arg Pro Lys Val
1               5                   10

<210> SEQ ID NO 129
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 129

Met Lys Glu Ile Ala Glu Ala Tyr Leu Gly Lys Thr
1               5                   10

<210> SEQ ID NO 130
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 130

Ile Asn Glu Pro Thr Ala Ala Ala Ile Ala Tyr Gly Leu Asp Lys Lys
1               5                   10                  15

Val

<210> SEQ ID NO 131
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 131

His Leu Gly Gly Glu Asp Phe Asp Asn Arg Met
1               5                   10

<210> SEQ ID NO 132
<211> LENGTH: 9
<212> TYPE: PRT
<213> ORGANISM: Artificial Sequence
<220> FEATURE:
<223> OTHER INFORMATION: semi-tryptic peptide

```
<400> SEQUENCE: 132

Val Ser Glu Gly Gly Lys Pro Lys Val
1               5

<210> SEQ ID NO 133
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 133

Ser Ala Val Ile Thr Val Pro Ala Tyr Phe Asn Asp Ser Gln Arg Gln
1               5                   10                  15

<210> SEQ ID NO 134
<211> LENGTH: 30
<212> TYPE: PRT
<213> ORGANISM: Artificial Sequence
<220> FEATURE:
<223> OTHER INFORMATION: semi-tryptic peptide

<400> SEQUENCE: 134

Arg Glu Val Pro Tyr Pro Asp Pro Arg Ile Gly Asn Phe Thr Ile Gln
1               5                   10                  15

Asn Val Phe Pro Gln Ser Asp Gly Asp Ser Ser Lys Val Lys
            20                  25                  30

<210> SEQ ID NO 135
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 135

Ile Ser Ser Ser Leu Pro Pro Asp Thr Gln Lys Phe
1               5                   10

<210> SEQ ID NO 136
<211> LENGTH: 21
<212> TYPE: PRT
<213> ORGANISM: Artificial Sequence
<220> FEATURE:
<223> OTHER INFORMATION: semi-tryptic peptide

<400> SEQUENCE: 136

Arg Glu Asn Ala Glu Val Asp Gly Asp Asp Ala Glu Glu Met Glu
1               5                   10                  15

Ala Lys Ala Glu Asp
            20

<210> SEQ ID NO 137
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 137

Gln Ala Glu Ala Pro His Ile Val Val Gly Thr Pro Gly Arg Val
1               5                   10                  15

<210> SEQ ID NO 138
<211> LENGTH: 11
```

```
<212> TYPE: PRT
<213> ORGANISM: Artificial Sequence
<220> FEATURE:
<223> OTHER INFORMATION: semi-tryptic peptide

<400> SEQUENCE: 138

Phe Gln Gln Ile Pro Gly Ser Ala Pro Arg Thr
1               5                   10

<210> SEQ ID NO 139
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 139

Trp Ala Ile Thr Asn Ala Thr Ser Gly Gly Thr Pro Glu Gln Ile Arg
1               5                   10                  15

Tyr

<210> SEQ ID NO 140
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 140

Val Ile Ala Asp Gly Gly Ile Gln Asn Val Gly His Ile Ala Lys Ala
1               5                   10                  15

<210> SEQ ID NO 141
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 141

Phe Ser Gly Ile Pro Ile Thr Glu Thr Gly Thr Met Gly Ser Lys Leu
1               5                   10                  15

<210> SEQ ID NO 142
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 142

Ile His Val Ser Gly Phe Arg Pro Lys Lys
1               5                   10

<210> SEQ ID NO 143
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 143

Asp Pro Leu Ser Leu Asp Ser Asn Lys Ile
1               5                   10

<210> SEQ ID NO 144
```

```
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 144

Lys Val Glu Asn His Gly Leu Val Glu Leu Asp Asp Lys Pro Thr Ala
1               5                   10                  15

Val Tyr Thr

<210> SEQ ID NO 145
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 145

Phe Gln Leu Leu Ile Glu Glu Lys Lys
1               5

<210> SEQ ID NO 146
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 146

Lys Ser Leu Ile Ile Asn Thr Ser Pro Val Glu
1               5                   10

<210> SEQ ID NO 147
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 147

Lys Val Leu Ala Phe Phe Glu Thr Asp Met Glu Arg
1               5                   10

<210> SEQ ID NO 148
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 148

Cys Asn Gly Leu Thr Gln Ile Glu Thr Leu Phe Lys Ser
1               5                   10

<210> SEQ ID NO 149
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 149

Arg Gly Thr Gly Gly Val Asp Thr Ala Ala Val Gly Gly Val Phe Asp
1               5                   10                  15

Val Ser Asn Ala Asp Arg
```

<210> SEQ ID NO 150
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 150

Asn Glu Tyr Gly Ser Arg Ile Gly Gly Gly Ile Asp Val Pro Val Pro
1               5                   10                  15

Arg His

<210> SEQ ID NO 151
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 151

Arg Thr Leu Thr Ser Ser Gly
1               5

<210> SEQ ID NO 152
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 152

Ala Asn Phe Asp Lys Glu Ser Glu Arg His
1               5                   10

<210> SEQ ID NO 153
<211> LENGTH: 28
<212> TYPE: PRT
<213> ORGANISM: Artificial Sequence
<220> FEATURE:
<223> OTHER INFORMATION: semi-tryptic peptide

<400> SEQUENCE: 153

Lys Val Gln His Gln Asp Ala Leu Gln Ile Ser Asp Val Val Met Ala
1               5                   10                  15

Ser Leu Leu Arg Met Phe Gln Ser Thr Ala Gly Ser
            20                  25

<210> SEQ ID NO 154
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 154

Arg Ala Gln Tyr Asp Glu Leu Ala Gln Lys
1               5                   10

<210> SEQ ID NO 155
<211> LENGTH: 15
<212> TYPE: PRT
<213> ORGANISM: Artificial Sequence
<220> FEATURE:
<223> OTHER INFORMATION: semi-tryptic peptide

```
<400> SEQUENCE: 155

Met Ala Thr Leu Lys Asp Gln Leu Ile Gln Asn Leu Leu Lys Glu
1               5                   10                  15

<210> SEQ ID NO 156
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 156

Val Thr Leu Thr His Glu Glu Glu Ala Cys Leu Lys Lys Ser
1               5                   10

<210> SEQ ID NO 157
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 157

Ile Ala Pro Val Ala Glu Glu Glu Thr Arg Ile Pro Asn Asn Lys Ile
1               5                   10                  15

<210> SEQ ID NO 158
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 158

Gly Ser Pro Val Gln Ala Asp Val Tyr Phe Pro Arg Leu
1               5                   10

<210> SEQ ID NO 159
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 159

Ala Ala Leu Ala Thr Ala Leu Gly Asp Lys Lys Ser
1               5                   10

<210> SEQ ID NO 160
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 160

Glu Pro Glu Asn His Glu Ala Pro Ala Lys Gly
1               5                   10

<210> SEQ ID NO 161
<211> LENGTH: 11
<212> TYPE: PRT
<213> ORGANISM: Artificial Sequence
<220> FEATURE:
<223> OTHER INFORMATION: semi-tryptic peptide
```

<400> SEQUENCE: 161

Val Asp Ser Pro Gly Pro Ala Gly Pro Arg Ser
1               5                   10

<210> SEQ ID NO 162
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 162

Lys Glu Met Gln Phe Leu Met Gln
1               5

<210> SEQ ID NO 163
<211> LENGTH: 24
<212> TYPE: PRT
<213> ORGANISM: Artificial Sequence
<220> FEATURE:
<223> OTHER INFORMATION: semi-tryptic peptide

<400> SEQUENCE: 163

Gly Arg Gly Asp Ser Ala Leu Phe Ala Val Asn Gly Phe Asn Met Leu
1               5                   10                  15

Ile Asn Gly Gly Ser Glu Arg Lys
            20

<210> SEQ ID NO 164
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 164

Lys Ala Ala Glu Ala Gln Tyr Gly Phe Leu Thr Met Ala
1               5                   10

<210> SEQ ID NO 165
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 165

Arg Asp Ile Ser Leu Tyr Ala
1               5

<210> SEQ ID NO 166
<211> LENGTH: 6
<212> TYPE: PRT
<213> ORGANISM: Artificial Sequence
<220> FEATURE:
<223> OTHER INFORMATION: semi-tryptic peptide

<400> SEQUENCE: 166

Arg Ser Ile Met Thr Glu
1               5

<210> SEQ ID NO 167
<211> LENGTH: 7
<212> TYPE: PRT
<213> ORGANISM: Artificial Sequence
<220> FEATURE:

-continued

<223> OTHER INFORMATION: semi-tryptic peptide

<400> SEQUENCE: 167

Arg Pro Ser Ser Ile Leu Pro
1               5

<210> SEQ ID NO 168
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 168

Gly Gln Glu Thr Ala Met Ala Pro Ser Leu Val Ala Pro Ala Leu Asn
1               5                   10                  15

Lys Pro

<210> SEQ ID NO 169
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 169

Leu Pro Trp Leu Arg Pro Asp Ser Lys Thr
1               5                   10

<210> SEQ ID NO 170
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 170

Lys Ile Thr Pro Glu Asn Leu Pro Gln Ile
1               5                   10

<210> SEQ ID NO 171
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 171

Ser Ala Met Ser Ala Ala Lys Ala
1               5

<210> SEQ ID NO 172
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 172

Ile Gln Tyr Leu Ala His Val Ala Ser Ser His Lys Ser
1               5                   10

<210> SEQ ID NO 173
<211> LENGTH: 12
<212> TYPE: PRT
<213> ORGANISM: Artificial Sequence

```
<220> FEATURE:
<223> OTHER INFORMATION: semi-tryptic peptide

<400> SEQUENCE: 173

Ala Gln Asn Leu Gln Leu Pro Pro Glu Ala Arg Ile
1               5                   10

<210> SEQ ID NO 174
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 174

Lys Leu Ser Ile Trp Ala Ile Pro Ser Leu Lys Gln Gln Gly
1               5                   10

<210> SEQ ID NO 175
<211> LENGTH: 21
<212> TYPE: PRT
<213> ORGANISM: Artificial Sequence
<220> FEATURE:
<223> OTHER INFORMATION: semi-tryptic peptide

<400> SEQUENCE: 175

Arg Met Phe Asp Tyr Thr Asp Asp Pro Glu Gly Pro Val Met Pro Gly
1               5                   10                  15

Ser His Ser Val Glu
            20

<210> SEQ ID NO 176
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 176

Ile Ile His Gly Ser Asp Ser Val Glu Ser Ala Glu Lys Glu
1               5                   10

<210> SEQ ID NO 177
<211> LENGTH: 8
<212> TYPE: PRT
<213> ORGANISM: Artificial Sequence
<220> FEATURE:
<223> OTHER INFORMATION: semi-tryptic peptide

<400> SEQUENCE: 177

Leu Pro Glu Gly Leu Pro Lys Ile
1               5

<210> SEQ ID NO 178
<211> LENGTH: 29
<212> TYPE: PRT
<213> ORGANISM: Artificial Sequence
<220> FEATURE:
<223> OTHER INFORMATION: semi-tryptic peptide

<400> SEQUENCE: 178

Tyr Ser Ser Ser Ser Gly Ser Leu Met Pro Ser Leu Glu Ser Leu Asp
1               5                   10                  15

Leu Ser Gln Val Ala Ala Ile Ser Asn Asp Leu Lys Ser
            20                  25
```

<210> SEQ ID NO 179
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 179

Thr Thr Gly Tyr Thr Gln Ser Ser Gln Val Phe Gly Arg Ser
1               5                   10

<210> SEQ ID NO 180
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 180

Lys Val Leu Asp Leu Glu Thr Lys Thr Val Ser
1               5                   10

<210> SEQ ID NO 181
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 181

Arg Ser Tyr Gln Phe Trp Asp Thr Gln Pro Val Pro Lys Leu Gly Glu
1               5                   10                  15

Val Val Asn Thr His Gly Pro
            20

<210> SEQ ID NO 182
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 182

Arg Thr His Pro Ser Val Val Pro Gly Ser Ile Ala Phe Ser
1               5                   10

<210> SEQ ID NO 183
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 183

Gly Ser Thr Ala Pro Gln Ile Leu Asn Thr Ser Ser Pro Ala Gln Gln
1               5                   10                  15

Ala Glu Asn Glu Ala Lys Ala
            20

<210> SEQ ID NO 184
<211> LENGTH: 13
<212> TYPE: PRT
<213> ORGANISM: Artificial Sequence
<220> FEATURE:
<223> OTHER INFORMATION: semi-tryptic peptide

```
<400> SEQUENCE: 184

Glu Pro Glu Glu Glu Pro Gly Thr Ala Ala Val Arg Glu
1               5                   10

<210> SEQ ID NO 185
<211> LENGTH: 29
<212> TYPE: PRT
<213> ORGANISM: Artificial Sequence
<220> FEATURE:
<223> OTHER INFORMATION: semi-tryptic peptide

<400> SEQUENCE: 185

Gly Pro Gly Pro Ala Thr Met Ala Ala Pro Gly Gly Gly Gly Ala Gly
1               5                   10                  15

Pro Pro Gly Val Gly Gly Gly Gly Ala Gly Gly Arg Gly
            20                  25

<210> SEQ ID NO 186
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 186

Met Ala Ala Pro Gly Gly Gly Gly Ala Gly Pro Pro Gly Val Gly Gly
1               5                   10                  15

Gly Gly Ala Gly Gly Arg Gly
            20

<210> SEQ ID NO 187
<211> LENGTH: 26
<212> TYPE: PRT
<213> ORGANISM: Artificial Sequence
<220> FEATURE:
<223> OTHER INFORMATION: semi-tryptic peptide

<400> SEQUENCE: 187

Asn Pro Ser Pro Val Val Ala Gln Val Pro Ser Val Leu Gln Ala Leu
1               5                   10                  15

Gln Gly Glu Gly Ala Leu Ala His Arg Glu
            20                  25

<210> SEQ ID NO 188
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 188

Gly Gln His Ala Thr Gly Glu Glu Gln Arg Ser
1               5                   10

<210> SEQ ID NO 189
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 189

Lys Gly Lys Pro Gln Ala Asn Val Pro Ser Asn Val Ser Ser
1               5                   10
```

```
<210> SEQ ID NO 190
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 190

Ser Gly Gly Ala Ser His Ser Glu Leu Ile His Asn Leu Arg Lys
1               5                   10                  15

<210> SEQ ID NO 191
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 191

Asp Gly Asn Arg Asp Leu Glu His Leu Ser Lys Phe
1               5                   10

<210> SEQ ID NO 192
<211> LENGTH: 17
<212> TYPE: PRT
<213> ORGANISM: Artificial Sequence
<220> FEATURE:
<223> OTHER INFORMATION: semi-tryptic peptide

<400> SEQUENCE: 192

Leu Leu Thr Glu Gly Pro His Leu Tyr Tyr Val Asp Pro Val Asn Lys
1               5                   10                  15

Val

<210> SEQ ID NO 193
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 193

Asp Pro Ser Glu Asp Pro Gly Ala Ala Pro Arg Val
1               5                   10

<210> SEQ ID NO 194
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 194

Met Lys Gly Asn Asn Ile Ser Ser Gly Thr Val Leu Ser Asp Tyr Val
1               5                   10                  15

Gly Ser Gly Pro Pro Lys Gly
                20

<210> SEQ ID NO 195
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 195
```

```
Ser Pro Ala Gly His Glu Ala Lys Arg Gly
1               5                   10

<210> SEQ ID NO 196
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 196

Ala Met Glu Ala Val Ala Ala Gln Gly Lys Ala
1               5                   10

<210> SEQ ID NO 197
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 197

His Ser Ser Met Val Gly Val Asn Leu Pro Lys Lys
1               5                   10

<210> SEQ ID NO 198
<211> LENGTH: 24
<212> TYPE: PRT
<213> ORGANISM: Artificial Sequence
<220> FEATURE:
<223> OTHER INFORMATION: semi-tryptic peptide

<400> SEQUENCE: 198

Lys Ile Gln Leu Ile Ser Asn Met Leu Asp Lys Val Asn Glu Met Ile
1               5                   10                  15

Ile Gly Gly Gly Met Ala Phe Thr
            20

<210> SEQ ID NO 199
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 199

Lys Phe Tyr Gly Pro Glu Gly Pro Tyr Gly Val Phe Ala
1               5                   10

<210> SEQ ID NO 200
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 200

Val Glu Thr Leu Lys Glu Met Ile Lys Ser
1               5                   10

<210> SEQ ID NO 201
<211> LENGTH: 11
<212> TYPE: PRT
<213> ORGANISM: Artificial Sequence
<220> FEATURE:
<223> OTHER INFORMATION: semi-tryptic peptide
```

```
<400> SEQUENCE: 201

Arg Glu Ala Thr Glu Ser Phe Ala Ser Asp Pro
1               5                   10

<210> SEQ ID NO 202
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 202

Asn Val Asp Met Val Phe Ala Ser Phe Ile Arg Lys
1               5                   10

<210> SEQ ID NO 203
<211> LENGTH: 28
<212> TYPE: PRT
<213> ORGANISM: Artificial Sequence
<220> FEATURE:
<223> OTHER INFORMATION: semi-tryptic peptide

<400> SEQUENCE: 203

Arg Tyr Val Pro Gly Ser Ala Ser Met Gly Thr Thr Met Ala Gly Val
1               5                   10                  15

Asp Pro Phe Thr Gly Asn Ser Ala Tyr Gln Ser Ala
            20                  25

<210> SEQ ID NO 204
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 204

Leu Ala Gln Ala Glu Ala Glu Lys Gln Lys Glu
1               5                   10

<210> SEQ ID NO 205
<211> LENGTH: 6
<212> TYPE: PRT
<213> ORGANISM: Artificial Sequence
<220> FEATURE:
<223> OTHER INFORMATION: semi-tryptic peptide

<400> SEQUENCE: 205

Arg Ser Tyr Ile Asp Pro
1               5

<210> SEQ ID NO 206
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 206

Ile Ile Asp Asp Lys Gly Ile Leu Arg Gln
1               5                   10

<210> SEQ ID NO 207
<211> LENGTH: 12
<212> TYPE: PRT
<213> ORGANISM: Artificial Sequence
```

```
<220> FEATURE:
<223> OTHER INFORMATION: semi-tryptic peptide

<400> SEQUENCE: 207

Leu Asn Ile Pro Leu Leu Ala Asp Val Thr Arg Lys
1               5                   10

<210> SEQ ID NO 208
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 208

Leu Ser Ile Asp Ser Val Glu Asp His Leu Ala Trp Ser Lys Asp
1               5                   10                  15

<210> SEQ ID NO 209
<211> LENGTH: 6
<212> TYPE: PRT
<213> ORGANISM: Artificial Sequence
<220> FEATURE:
<223> OTHER INFORMATION: semi-tryptic peptide

<400> SEQUENCE: 209

Lys Tyr Ser Pro Leu His
1               5

<210> SEQ ID NO 210
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 210

Lys Ser Gln Gly Gly Glu Pro Thr Tyr Asn Val
1               5                   10

<210> SEQ ID NO 211
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 211

Lys Glu Thr Pro Lys Glu Glu Ala Pro Gln Leu Thr Gly Pro Glu
1               5                   10                  15

<210> SEQ ID NO 212
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 212

Ser Ser Asp Asn Val Ala Asp Leu His Asp Lys Tyr
1               5                   10

<210> SEQ ID NO 213
<211> LENGTH: 10
<212> TYPE: PRT
<213> ORGANISM: Artificial Sequence
<220> FEATURE:
```

```
<223> OTHER INFORMATION: semi-tryptic peptide

<400> SEQUENCE: 213

His Glu Leu Gln Ala Met Lys Asp Lys Ile
1               5                   10

<210> SEQ ID NO 214
<211> LENGTH: 32
<212> TYPE: PRT
<213> ORGANISM: Artificial Sequence
<220> FEATURE:
<223> OTHER INFORMATION: semi-tryptic peptide

<400> SEQUENCE: 214

Gln Glu Pro Pro Pro Pro Ala Pro Gln Asp Val Glu Met Lys Glu
1               5                   10                  15

Glu Ala Ala Ala Gly Gly Gly Ser Thr Gly Glu Thr Ala Gly Lys Thr
            20                  25                  30

<210> SEQ ID NO 215
<211> LENGTH: 47
<212> TYPE: PRT
<213> ORGANISM: Artificial Sequence
<220> FEATURE:
<223> OTHER INFORMATION: semi-tryptic peptide

<400> SEQUENCE: 215

Gly Ser Leu Gly His Pro Gly Ser Gly Ser Gly Gly Gly Gly Gly
1               5                   10                  15

Gly Gly Gly Gly Gly Gly Gly Ser Gly Gly Gly Gly Gly Gly Gly Ala
            20                  25                  30

Pro Gly Gly Leu Gln His Glu Thr Gln Glu Leu Ala Ser Lys Arg
        35                  40                  45

<210> SEQ ID NO 216
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 216

Lys Gln Leu Leu Asp Leu Pro Leu Asp Ala
1               5                   10

<210> SEQ ID NO 217
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 217

Ser Pro Glu Glu Gln His Lys Arg Leu
1               5

<210> SEQ ID NO 218
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 218

Val Asp Ile Pro His Met Asp Ile Glu Ala Leu Lys Lys Leu
```

```
<210> SEQ ID NO 219
<211> LENGTH: 29
<212> TYPE: PRT
<213> ORGANISM: Artificial Sequence
<220> FEATURE:
<223> OTHER INFORMATION: semi-tryptic peptide

<400> SEQUENCE: 219

Lys Ala Phe Leu Ala Asp Pro Ser Ala Phe Val Ala Ala Ala Pro Val
1               5                   10                  15

Ala Ala Ala Pro Ala Ala Ala Pro Ala Ala Thr Thr Ala
            20                  25

<210> SEQ ID NO 220
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 220

Gln Ala Glu Ala Ala Ser Gly Gln Glu Leu Ala Val Ala Val Ala Glu
1               5                   10                  15

Arg Val

<210> SEQ ID NO 221
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 221

Lys Leu Phe Ile Gly Gly Leu Ser Phe Glu Thr
1               5                   10

<210> SEQ ID NO 222
<211> LENGTH: 32
<212> TYPE: PRT
<213> ORGANISM: Artificial Sequence
<220> FEATURE:
<223> OTHER INFORMATION: semi-tryptic peptide

<400> SEQUENCE: 222

Arg Gly Gly Gly Gly Asn Phe Gly Pro Gly Pro Gly Ser Asn Phe Arg
1               5                   10                  15

Gly Gly Ser Asp Gly Tyr Gly Ser Gly Arg Gly Phe Gly Asp Gly Tyr
            20                  25                  30

<210> SEQ ID NO 223
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 223

Lys Lys Ala Glu Ala Gly Ala Gly Ser Ala Thr Glu Phe Gln
1               5                   10

<210> SEQ ID NO 224
<211> LENGTH: 11
<212> TYPE: PRT
```

<210> SEQ ID NO 224
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 224

Lys Gly Pro Leu Gln Ser Val Gln Val Phe Gly
1               5                   10

<210> SEQ ID NO 225
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 225

Glu Leu Ala Pro Tyr Asp Glu Asn Trp Phe Tyr Thr Arg Ala
1               5                   10

<210> SEQ ID NO 226
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 226

Val Glu Gln His Val Val Asp Gly Lys Glu
1               5                   10

<210> SEQ ID NO 227
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 227

Ala Ala Thr Pro Ala Ser Ala Pro Leu Val Asp Phe Gly Asn Asp Phe
1               5                   10                  15

Val Pro Pro Ala Pro Arg Gly
            20

<210> SEQ ID NO 228
<211> LENGTH: 36
<212> TYPE: PRT
<213> ORGANISM: Artificial Sequence
<220> FEATURE:
<223> OTHER INFORMATION: semi-tryptic peptide

<400> SEQUENCE: 228

Ala Ala Thr Pro Ala Ser Ala Pro Leu Val Asp Phe Gly Asn Asp Phe
1               5                   10                  15

Val Pro Pro Ala Pro Arg Gly Pro Leu Pro Ala Ala Pro Leu Ala Ala
            20                  25                  30

Pro Glu Arg Gln
        35

<210> SEQ ID NO 229
<211> LENGTH: 23
<212> TYPE: PRT
<213> ORGANISM: Artificial Sequence
<220> FEATURE:
<223> OTHER INFORMATION: semi-tryptic peptide

<400> SEQUENCE: 229

Ala Ala Thr Pro Ala Ser Ala Pro Leu Val Asp Phe Gly Asn Asp Phe
1               5                   10                  15

Val Pro Pro Ala Pro Arg Gly
            20

<210> SEQ ID NO 230
<211> LENGTH: 22
<212> TYPE: PRT
<213> ORGANISM: Artificial Sequence
<220> FEATURE:
<223> OTHER INFORMATION: semi-tryptic peptide

<400> SEQUENCE: 230

Thr Phe Ser Asp Ser Ser Pro Ile Glu Ile Ile Asp Glu Phe Pro Thr
1               5                   10                  15

Phe Val Ser Ser Lys Ala
            20

<210> SEQ ID NO 231
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 231

Ala Phe Ser Pro Thr Thr Ile Asn Thr Gly Arg Gly
1               5                   10

<210> SEQ ID NO 232
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 232

Lys Ala Asn Lys Pro Ala Pro Asn His Val Ile Phe Lys
1               5                   10

<210> SEQ ID NO 233
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 233

Ser Gln Val Gln Val Phe Pro Pro Val Gly Ala Ser Gly Ala Thr Thr
1               5                   10                  15

Arg Leu

<210> SEQ ID NO 234
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 234

Ala Phe Ala Thr His Ser Thr Asp Val Glu Glu Asp Lys Ile Pro Lys
1               5                   10                  15

Lys Ser

<210> SEQ ID NO 235
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 235

Lys Glu Ser Phe Gln Asp Glu Asn Phe Val Phe Glu Glu Phe Ala
1               5                   10                  15

<210> SEQ ID NO 236
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 236

Glu Gln Gln Val Asp Gly Asp Leu Leu Leu Arg Leu
1               5                   10

<210> SEQ ID NO 237
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 237

Leu Ala Ala Ser Ala Val Thr Gln Val Ala Lys Val
1               5                   10

<210> SEQ ID NO 238
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 238

Arg Asn Ile Ser Asn Gln Leu Ser Ile Met Thr Lys Ile Asp
1               5                   10

<210> SEQ ID NO 239
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 239

Lys Leu Gly Ala Val Phe Asn Gln Val Ala Phe Pro Leu Gln Tyr Thr
1               5                   10                  15

<210> SEQ ID NO 240
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 240

Ile Glu Leu Asn Pro Ala Asn Ala Val Tyr Phe Cys Asn Arg Ala
1               5                   10                  15

```
<210> SEQ ID NO 241
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 241

Glu Glu Gln Leu Ile Ser Ser Ser Glu Asn Arg Leu
1               5                   10

<210> SEQ ID NO 242
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 242

Ala Gly His Pro Leu Ala Gln Asn Glu Arg Cys
1               5                   10

<210> SEQ ID NO 243
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 243

Arg Phe Thr Thr Tyr Glu Ile Arg Val Lys Thr Asn
1               5                   10

<210> SEQ ID NO 244
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 244

Lys Ile Ala Ala Leu Gln Ser Phe Ala Asp Gln Leu Ile Ala Gly Gly
1               5                   10                  15

His Tyr Ala

<210> SEQ ID NO 245
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 245

Gln Val Leu Ala Ala Ala His Glu Leu Gln Arg Phe
1               5                   10

<210> SEQ ID NO 246
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 246

Ala Ser Leu Gln Ser Gln Ser Pro Glu Arg Leu
1               5                   10
```

<210> SEQ ID NO 247
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 247

Ser Gln Thr Pro Leu Gln Asp Gly Ser Arg Thr
1               5                   10

<210> SEQ ID NO 248
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 248

Arg Glu Gly Ile Asp Pro Thr Pro Tyr Tyr
1               5                   10

<210> SEQ ID NO 249
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 249

Leu His Ser Thr Phe Phe Pro Ala Leu Gln Gly Ala Gln Thr Lys Met
1               5                   10                  15

<210> SEQ ID NO 250
<211> LENGTH: 24
<212> TYPE: PRT
<213> ORGANISM: Artificial Sequence
<220> FEATURE:
<223> OTHER INFORMATION: semi-tryptic peptide

<400> SEQUENCE: 250

Tyr Arg Gln Leu Phe His Pro Glu Gln Leu Ile Thr Gly Lys Glu Asp
1               5                   10                  15

Ala Ala Asn Asn Tyr Ala Arg Gly
            20

<210> SEQ ID NO 251
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 251

Ala Cys Phe Glu Pro Ala Asn Gln Met Val Lys Cys
1               5                   10

<210> SEQ ID NO 252
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 252

His Leu Gln Ala Gly Gln Cys Gly Asn Gln Ile Gly Ala Lys Phe

```
1               5                  10                  15
```

<210> SEQ ID NO 253
<211> LENGTH: 16
<212> TYPE: PRT
<213> ORGANISM: Artificial Sequence
<220> FEATURE:
<223> OTHER INFORMATION: semi-tryptic peptide

<400> SEQUENCE: 253

```
Glu Gly Ala Glu Leu Val Asp Ser Val Leu Asp Val Val Arg Lys Glu
1               5                  10                  15
```

<210> SEQ ID NO 254
<211> LENGTH: 33
<212> TYPE: PRT
<213> ORGANISM: Artificial Sequence
<220> FEATURE:
<223> OTHER INFORMATION: semi-tryptic peptide

<400> SEQUENCE: 254

```
Lys Glu Ala Glu Ser Cys Asp Cys Leu Gln Gly Phe Gln Leu Thr His
1               5                  10                  15

Ser Leu Gly Gly Gly Thr Gly Ser Gly Met Gly Thr Leu Leu Ile Ser
            20                  25                  30

Lys
```

<210> SEQ ID NO 255
<211> LENGTH: 15
<212> TYPE: PRT
<213> ORGANISM: Artificial Sequence
<220> FEATURE:
<223> OTHER INFORMATION: semi-tryptic peptide

<400> SEQUENCE: 255

```
Lys Ile Arg Glu Glu Tyr Pro Asp Arg Ile Met Asn Thr Phe Ser
1               5                  10                  15
```

<210> SEQ ID NO 256
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 256

```
Arg Ile Met Asn Thr Phe Ser
1               5
```

<210> SEQ ID NO 257
<211> LENGTH: 10
<212> TYPE: PRT
<213> ORGANISM: Artificial Sequence
<220> FEATURE:
<223> OTHER INFORMATION: semi-tryptic peptide

<400> SEQUENCE: 257

```
Arg Tyr Leu Thr Val Ala Ala Val Phe Arg
1               5                  10
```

<210> SEQ ID NO 258
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 258

Lys Met Ala Val Thr Phe Ile
1               5

<210> SEQ ID NO 259
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 259

Lys Met Asp Ser Ala Ile Pro Asp Leu Gly Pro
1               5                   10

<210> SEQ ID NO 260
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 260

Leu Pro Glu Ala Ala Ala Ser Ala Asp Leu Lys Ile
1               5                   10

<210> SEQ ID NO 261
<211> LENGTH: 7
<212> TYPE: PRT
<213> ORGANISM: Artificial Sequence
<220> FEATURE:
<223> OTHER INFORMATION: semi-tryptic peptide

<400> SEQUENCE: 261

Lys Ser Ser Leu Gly Pro Val
1               5

<210> SEQ ID NO 262
<211> LENGTH: 29
<212> TYPE: PRT
<213> ORGANISM: Artificial Sequence
<220> FEATURE:
<223> OTHER INFORMATION: semi-tryptic peptide

<400> SEQUENCE: 262

Lys Val Ala Thr Ala Gln Asp Asp Ile Thr Gly Asp Gly Thr Thr Ser
1               5                   10                  15

Asn Val Leu Ile Ile Gly Glu Leu Leu Lys Gln Ala Asp
            20                  25

<210> SEQ ID NO 263
<211> LENGTH: 6
<212> TYPE: PRT
<213> ORGANISM: Artificial Sequence
<220> FEATURE:
<223> OTHER INFORMATION: semi-tryptic peptide

<400> SEQUENCE: 263

Lys Leu Thr Leu Phe Val
1               5

<210> SEQ ID NO 264
<211> LENGTH: 12
<212> TYPE: PRT
<213> ORGANISM: Artificial Sequence

```
<220> FEATURE:
<223> OTHER INFORMATION: semi-tryptic peptide

<400> SEQUENCE: 264

Val Gly Glu Phe Ser Gly Ala Asn Lys Glu Lys Leu
1               5                   10

<210> SEQ ID NO 265
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 265

Gln His Ile Gln Ser Ala Gln Ser Gln Arg Ser
1               5                   10

<210> SEQ ID NO 266
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 266

Val Leu Asp Pro Phe Thr Ile Lys Pro Leu Asp Lys Lys
1               5                   10

<210> SEQ ID NO 267
<211> LENGTH: 29
<212> TYPE: PRT
<213> ORGANISM: Artificial Sequence
<220> FEATURE:
<223> OTHER INFORMATION: semi-tryptic peptide

<400> SEQUENCE: 267

Val Gln Glu Met Val Thr Lys Ser Asn Thr Ser Pro Glu Glu Leu Gly
1               5                   10                  15

Pro Leu Ala Asn Gln Leu Thr Ser Asp Tyr Gly Arg Leu
            20                  25

<210> SEQ ID NO 268
<211> LENGTH: 18
<212> TYPE: PRT
<213> ORGANISM: Artificial Sequence
<220> FEATURE:
<223> OTHER INFORMATION: semi-tryptic peptide

<400> SEQUENCE: 268

Gly Glu Val Pro Gly Ser His Gln Gly Ser Asp Pro Tyr His Gln Leu
1               5                   10                  15

Arg Gly

<210> SEQ ID NO 269
<211> LENGTH: 14
<212> TYPE: PRT
<213> ORGANISM: Artificial Sequence
<220> FEATURE:
<223> OTHER INFORMATION: semi-tryptic peptide

<400> SEQUENCE: 269

Lys Ala Gly Asp Lys Ile Pro Glu Glu Gln Pro Val Ala Ala
1               5                   10
```

```
<210> SEQ ID NO 270
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 270

Ile Asn Thr Leu Asn Ala Ala Lys Val
1               5

<210> SEQ ID NO 271
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 271

Phe Thr Gly Glu Ile Ser Pro Gly Met Ile Lys Asp
1               5                   10

<210> SEQ ID NO 272
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 272

Leu Asp Glu Arg Glu Ala Gly Ile Thr Glu Lys Val
1               5                   10

<210> SEQ ID NO 273
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 273

Phe Ser Val Met Pro Ser Pro Lys Val
1               5

<210> SEQ ID NO 274
<211> LENGTH: 26
<212> TYPE: PRT
<213> ORGANISM: Artificial Sequence
<220> FEATURE:
<223> OTHER INFORMATION: semi-tryptic peptide

<400> SEQUENCE: 274

Lys Gln His Leu Glu Asn Asp Pro Gly Ser Asn Glu Asp Thr Asp Ile
1               5                   10                  15

Pro Lys Gly Tyr Met Asp Leu Met Pro Phe
            20                  25

<210> SEQ ID NO 275
<211> LENGTH: 38
<212> TYPE: PRT
<213> ORGANISM: Artificial Sequence
<220> FEATURE:
<223> OTHER INFORMATION: semi-tryptic peptide

<400> SEQUENCE: 275

Arg Glu Leu Ala Glu Ala Val Ala Gly Gly Arg Val Leu Val Val Gly
1               5                   10                  15
```

Ala Gly Gly Ile Gly Cys Glu Leu Leu Lys Asn Leu Val Leu Thr Gly
            20                  25                  30

Phe Ser His Ile Asp Leu
        35

<210> SEQ ID NO 276
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 276

Lys Leu Cys Thr Phe Thr Ile Thr Gln
1               5

<210> SEQ ID NO 277
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 277

Glu Glu Leu Lys Gly Gln Glu Val Ser Pro Lys Val
1               5                   10

<210> SEQ ID NO 278
<211> LENGTH: 20
<212> TYPE: PRT
<213> ORGANISM: Artificial Sequence
<220> FEATURE:
<223> OTHER INFORMATION: semi-tryptic peptide

<400> SEQUENCE: 278

His Ala Val Ala Asn Asn Gln Asp Lys Leu Glu Phe Glu Asp Gly Ser
1               5                   10                  15

Val Leu Lys Gln
            20

<210> SEQ ID NO 279
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 279

Leu Glu Glu Val Gly Leu Pro Leu His Arg Ala
1               5                   10

<210> SEQ ID NO 280
<211> LENGTH: 38
<212> TYPE: PRT
<213> ORGANISM: Artificial Sequence
<220> FEATURE:
<223> OTHER INFORMATION: semi-tryptic peptide

<400> SEQUENCE: 280

Lys Thr Pro Thr Pro Leu Met Ala Asn Asp Ser Thr Glu Thr Ser Glu
1               5                   10                  15

Ala Gly Glu Glu Glu Glu Asp His Gly Asp Ser Glu Asn Lys Glu
            20                  25                  30

Arg Met Pro Phe Ile Gln

```
<210> SEQ ID NO 281
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 281

Val Phe Asn Gly Ser Gly Lys Pro Ile Asp Arg Gly
1               5                   10

<210> SEQ ID NO 282
<211> LENGTH: 12
<212> TYPE: PRT
<213> ORGANISM: Artificial Sequence
<220> FEATURE:
<223> OTHER INFORMATION: semi-tryptic peptide

<400> SEQUENCE: 282

Leu Asp Ala Phe Val Glu Gly Val Val Lys Lys Val
1               5                   10

<210> SEQ ID NO 283
<211> LENGTH: 9
<212> TYPE: PRT
<213> ORGANISM: Artificial Sequence
<220> FEATURE:
<223> OTHER INFORMATION: semi-tryptic peptide

<400> SEQUENCE: 283

Ala Asp Lys Glu Glu Met Asn Arg Leu
1               5

<210> SEQ ID NO 284
<211> LENGTH: 13
<212> TYPE: PRT
<213> ORGANISM: Artificial Sequence
<220> FEATURE:
<223> OTHER INFORMATION: semi-tryptic peptide

<400> SEQUENCE: 284

Ser Glu Ala Ala Asn Arg Asn Asn Asp Ala Leu Arg Gln
1               5                   10

<210> SEQ ID NO 285
<211> LENGTH: 6
<212> TYPE: PRT
<213> ORGANISM: Artificial Sequence
<220> FEATURE:
<223> OTHER INFORMATION: semi-tryptic peptide

<400> SEQUENCE: 285

Arg Ile Ser Leu Pro Leu
1               5

<210> SEQ ID NO 286
<211> LENGTH: 19
<212> TYPE: PRT
<213> ORGANISM: Artificial Sequence
<220> FEATURE:
<223> OTHER INFORMATION: semi-tryptic peptide

<400> SEQUENCE: 286

Met Ile Asp Asn Val Tyr Asn Pro Ala Ala Ile Ala Val Asp Trp Val
1               5                   10                  15
```

Tyr Lys Thr

<210> SEQ ID NO 287
<211> LENGTH: 11
<212> TYPE: PRT
<213> ORGANISM: Artificial Sequence
<220> FEATURE:
<223> OTHER INFORMATION: semi-tryptic peptide

<400> SEQUENCE: 287

Ile Pro Asp Ser His Glu Ile Thr Ile Lys His
1               5                   10

<210> SEQ ID NO 288
<211> LENGTH: 16
<212> TYPE: PRT
<213> ORGANISM: Artificial Sequence
<220> FEATURE:
<223> OTHER INFORMATION: methylated PDGFB peptide
<220> FEATURE:
<221> NAME/KEY: MOD_RES
<222> LOCATION: (7)..(7)
<223> OTHER INFORMATION: METHYLATION, MeLys

<400> SEQUENCE: 288

Lys Ile Glu Ile Val Arg Lys Lys Pro Ile Phe Lys Lys Ala Thr Val
1               5                   10                  15

<210> SEQ ID NO 289
<211> LENGTH: 16
<212> TYPE: PRT
<213> ORGANISM: Artificial Sequence
<220> FEATURE:
<223> OTHER INFORMATION: methylated PDGFB peptide
<220> FEATURE:
<221> NAME/KEY: MOD_RES
<222> LOCATION: (7)..(8)
<223> OTHER INFORMATION: METHYLATION, MeLys

<400> SEQUENCE: 289

Lys Ile Glu Ile Val Arg Lys Lys Pro Ile Phe Lys Lys Ala Thr Val
1               5                   10                  15

<210> SEQ ID NO 290
<211> LENGTH: 8
<212> TYPE: PRT
<213> ORGANISM: Artificial Sequence
<220> FEATURE:
<223> OTHER INFORMATION: consensus calpain-5 peptide substrate
<220> FEATURE:
<221> NAME/KEY: misc_feature
<222> LOCATION: (1)..(1)
<223> OTHER INFORMATION: X is E, L, or G
<220> FEATURE:
<221> NAME/KEY: misc_feature
<222> LOCATION: (2)..(2)
<223> OTHER INFORMATION: X is V, G, or L
<220> FEATURE:
<221> NAME/KEY: misc_feature
<222> LOCATION: (3)..(3)
<223> OTHER INFORMATION: X is K or R
<220> FEATURE:
<221> NAME/KEY: misc_feature
<222> LOCATION: (4)..(4)
<223> OTHER INFORMATION: X is K, R, or A
<220> FEATURE:
<221> NAME/KEY: misc_feature
<222> LOCATION: (5)..(5)
<223> OTHER INFORMATION: X is V. A, or L
<220> FEATURE:
<221> NAME/KEY: misc_feature

```
<222> LOCATION: (6)..(6)
<223> OTHER INFORMATION: X is E, L, or A
<220> FEATURE:
<221> NAME/KEY: misc_feature
<222> LOCATION: (7)..(7)
<223> OTHER INFORMATION: X is E, A, or L
<220> FEATURE:
<221> NAME/KEY: misc_feature
<222> LOCATION: (8)..(8)
<223> OTHER INFORMATION: X is P, A, or L

<400> SEQUENCE: 290

Xaa Xaa Xaa Xaa Xaa Xaa Xaa Xaa
1               5

<210> SEQ ID NO 291
<211> LENGTH: 8
<212> TYPE: PRT
<213> ORGANISM: Artificial Sequence
<220> FEATURE:
<223> OTHER INFORMATION: P4'A peptide substrate

<400> SEQUENCE: 291

Glu Val Lys Ala Leu Glu Glu Ala
1               5

<210> SEQ ID NO 292
<211> LENGTH: 8
<212> TYPE: PRT
<213> ORGANISM: Artificial Sequence
<220> FEATURE:
<223> OTHER INFORMATION: P4'P peptide substrate

<400> SEQUENCE: 292

Glu Val Lys Ala Leu Glu Glu Pro
1               5

<210> SEQ ID NO 293
<211> LENGTH: 8
<212> TYPE: PRT
<213> ORGANISM: Artificial Sequence
<220> FEATURE:
<223> OTHER INFORMATION: P2R peptide substrate

<400> SEQUENCE: 293

Glu Val Arg Ala Leu Glu Glu Ala
1               5

<210> SEQ ID NO 294
<211> LENGTH: 8
<212> TYPE: PRT
<213> ORGANISM: Artificial Sequence
<220> FEATURE:
<223> OTHER INFORMATION: P3GP1'V peptide substrate

<400> SEQUENCE: 294

Glu Gly Lys Ala Val Leu Glu Ala
1               5

<210> SEQ ID NO 295
<211> LENGTH: 8
<212> TYPE: PRT
<213> ORGANISM: Artificial Sequence
<220> FEATURE:
<223> OTHER INFORMATION: peptide substrate

<400> SEQUENCE: 295

Glu Val Arg Lys Leu Glu Glu Ala
```

```
1               5
```

<210> SEQ ID NO 296
<211> LENGTH: 8
<212> TYPE: PRT
<213> ORGANISM: Artificial Sequence
<220> FEATURE:
<223> OTHER INFORMATION: peptide substrate

<400> SEQUENCE: 296

```
Glu Val Arg Arg Leu Glu Glu Ala
1               5
```

<210> SEQ ID NO 297
<211> LENGTH: 8
<212> TYPE: PRT
<213> ORGANISM: Artificial Sequence
<220> FEATURE:
<223> OTHER INFORMATION: peptide substrate

<400> SEQUENCE: 297

```
Glu Val Arg Trp Leu Glu Glu Ala
1               5
```

<210> SEQ ID NO 298
<211> LENGTH: 8
<212> TYPE: PRT
<213> ORGANISM: Artificial Sequence
<220> FEATURE:
<223> OTHER INFORMATION: peptide substrate

<400> SEQUENCE: 298

```
Glu Val Arg Cys Leu Glu Glu Ala
1               5
```

<210> SEQ ID NO 299
<211> LENGTH: 8
<212> TYPE: PRT
<213> ORGANISM: Artificial Sequence
<220> FEATURE:
<223> OTHER INFORMATION: peptide substrate

<400> SEQUENCE: 299

```
Glu Val Trp Ala Leu Glu Glu Ala
1               5
```

<210> SEQ ID NO 300
<211> LENGTH: 8
<212> TYPE: PRT
<213> ORGANISM: Artificial Sequence
<220> FEATURE:
<223> OTHER INFORMATION: peptide substrate

<400> SEQUENCE: 300

```
Glu Val Cys Ala Leu Glu Glu Ala
1               5
```

<210> SEQ ID NO 301
<211> LENGTH: 8
<212> TYPE: PRT
<213> ORGANISM: Artificial Sequence
<220> FEATURE:
<223> OTHER INFORMATION: peptide substrate

<400> SEQUENCE: 301

```
Glu Gly Arg Ala Leu Glu Glu Ala
1               5
```

```
<210> SEQ ID NO 302
<211> LENGTH: 8
<212> TYPE: PRT
<213> ORGANISM: Artificial Sequence
<220> FEATURE:
<223> OTHER INFORMATION: peptide substrate

<400> SEQUENCE: 302

Glu Leu Arg Ala Leu Glu Glu Ala
1               5

<210> SEQ ID NO 303
<211> LENGTH: 8
<212> TYPE: PRT
<213> ORGANISM: Artificial Sequence
<220> FEATURE:
<223> OTHER INFORMATION: peptide substrate

<400> SEQUENCE: 303

Glu Trp Arg Ala Leu Glu Glu Ala
1               5

<210> SEQ ID NO 304
<211> LENGTH: 8
<212> TYPE: PRT
<213> ORGANISM: Artificial Sequence
<220> FEATURE:
<223> OTHER INFORMATION: peptide substrate

<400> SEQUENCE: 304

Glu Val Arg Ala Val Glu Glu Ala
1               5

<210> SEQ ID NO 305
<211> LENGTH: 8
<212> TYPE: PRT
<213> ORGANISM: Artificial Sequence
<220> FEATURE:
<223> OTHER INFORMATION: peptide substrate

<400> SEQUENCE: 305

Glu Val Arg Ala Ala Glu Glu Ala
1               5

<210> SEQ ID NO 306
<211> LENGTH: 8
<212> TYPE: PRT
<213> ORGANISM: Artificial Sequence
<220> FEATURE:
<223> OTHER INFORMATION: peptide substrate

<400> SEQUENCE: 306

Glu Val Arg Ala Tyr Glu Glu Ala
1               5

<210> SEQ ID NO 307
<211> LENGTH: 8
<212> TYPE: PRT
<213> ORGANISM: Artificial Sequence
<220> FEATURE:
<223> OTHER INFORMATION: peptide substrate

<400> SEQUENCE: 307

Glu Val Arg Ala Leu Leu Glu Ala
1               5
```

<210> SEQ ID NO 308
<211> LENGTH: 8
<212> TYPE: PRT
<213> ORGANISM: Artificial Sequence
<220> FEATURE:
<223> OTHER INFORMATION: peptide substrate

<400> SEQUENCE: 308

Glu Val Arg Ala Leu Ala Glu Ala
1               5

<210> SEQ ID NO 309
<211> LENGTH: 8
<212> TYPE: PRT
<213> ORGANISM: Artificial Sequence
<220> FEATURE:
<223> OTHER INFORMATION: peptide substrate

<400> SEQUENCE: 309

Glu Val Arg Ala Leu Tyr Glu Ala
1               5

<210> SEQ ID NO 310
<211> LENGTH: 8
<212> TYPE: PRT
<213> ORGANISM: Artificial Sequence
<220> FEATURE:
<223> OTHER INFORMATION: peptide substrate

<400> SEQUENCE: 310

Glu Val Arg Ala Leu Glu Ala Ala
1               5

<210> SEQ ID NO 311
<211> LENGTH: 8
<212> TYPE: PRT
<213> ORGANISM: Artificial Sequence
<220> FEATURE:
<223> OTHER INFORMATION: peptide substrate

<400> SEQUENCE: 311

Glu Val Arg Ala Leu Glu Leu Ala
1               5

<210> SEQ ID NO 312
<211> LENGTH: 8
<212> TYPE: PRT
<213> ORGANISM: Artificial Sequence
<220> FEATURE:
<223> OTHER INFORMATION: peptide substrate

<400> SEQUENCE: 312

Glu Val Arg Ala Leu Glu Trp Ala
1               5

<210> SEQ ID NO 313
<211> LENGTH: 6
<212> TYPE: PRT
<213> ORGANISM: Artificial Sequence
<220> FEATURE:
<223> OTHER INFORMATION: peptide substrate

<400> SEQUENCE: 313

Val Arg Ala Leu Glu Glu
1               5

```
<210> SEQ ID NO 314
<211> LENGTH: 4
<212> TYPE: PRT
<213> ORGANISM: Artificial Sequence
<220> FEATURE:
<223> OTHER INFORMATION: peptide substrate

<400> SEQUENCE: 314

Arg Ala Leu Glu
1

<210> SEQ ID NO 315

<400> SEQUENCE: 315

000
```